United States Patent [19]

Okabe

[11] Patent Number: 5,555,205
[45] Date of Patent: Sep. 10, 1996

[54] METHOD DEVICE FOR RECORDING INFORMATION, AND METHOD FOR MEASURING THE TRANSMITTANCE OF LIQUID CRYSTALS, WHICH IS APPLIED TO RECORDING INFORMATION

[75] Inventor: Masato Okabe, Tokyo, Japan

[73] Assignee: Dai Nippon Printing Co., Ltd., Tokyo, Japan

[21] Appl. No.: 233,812

[22] Filed: Apr. 26, 1994

[30] Foreign Application Priority Data

| Apr. 27, 1993 | [JP] | Japan | 5-101277 |
| Apr. 30, 1993 | [JP] | Japan | 5-104225 |
| Sep. 3, 1993 | [JP] | Japan | 5-220072 |
| Sep. 3, 1993 | [JP] | Japan | 5-220074 |
| Nov. 26, 1993 | [JP] | Japan | 5-296921 |

[51] Int. Cl.[6] .................. G03G 15/00; G11C 13/04
[52] U.S. Cl. .................. 365/108; 365/112; 369/120; 359/45; 359/72
[58] Field of Search .................. 359/45, 72, 71, 359/67, 43; 365/112, 108; 428/1; 369/120; 430/20, 31, 48

[56] References Cited

U.S. PATENT DOCUMENTS

| 4,965,591 | 10/1990 | Kurabayashi et al. | 359/43 |
| 5,141,785 | 8/1992 | Yoshinada et al. | 428/1 |
| 5,161,007 | 11/1992 | Takanashi et al. | 365/112 |
| 5,319,461 | 6/1994 | Takanashi et al. | 365/112 |
| 5,418,096 | 5/1995 | Iijima et al. | 430/20 |
| 5,488,601 | 1/1996 | Sakano et al. | 369/120 |

*Primary Examiner*—Georgia Y. Epps
*Assistant Examiner*—Kim-Kwok Chu
*Attorney, Agent, or Firm*—Morgan & Finnegan, L.L.P.

[57] ABSTRACT

The invention provides a system in which a photoelectric sensor having a transparent electrode and a photoconductive layer formed on a transparent substrate in this order is opposed to a liquid crystal recording medium having a transparent electrode and a polymer dispersion type of liquid crystal layer formed on a transparent substrate in this order, and voltage is applied between both the electrodes for exposure to image-carrying light, so that the liquid crystals are oriented to record the information. In this system, the transmittance of the liquid crystal recording medium, the current flowing through the photoelectric sensor or liquid crystal recording medium, the conductivity of the unexposed portion of the photoelectric sensor, and the transmittance of the liquid crystal layer at a dark portion are measured, or the voltage applied on the liquid crystal recording medium is estimated by monitoring the current flowing through the liquid crystal recording medium, so that the applied voltage and the duration of the applied voltage can be controlled. Before recording the information, the optimal applied voltage and the optimal duration of the applied voltage can thus be preset to make it possible to obtain images of high quality.

36 Claims, 44 Drawing Sheets

FIG. 1
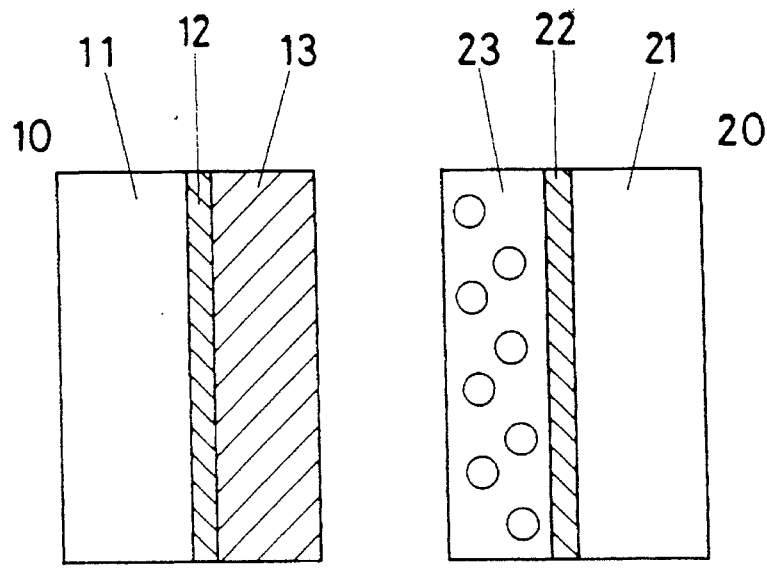
PRIOR ART
FIG. 2-A
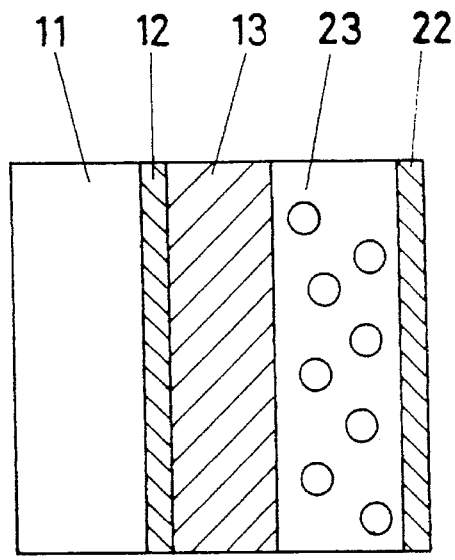
FIG. 2-B
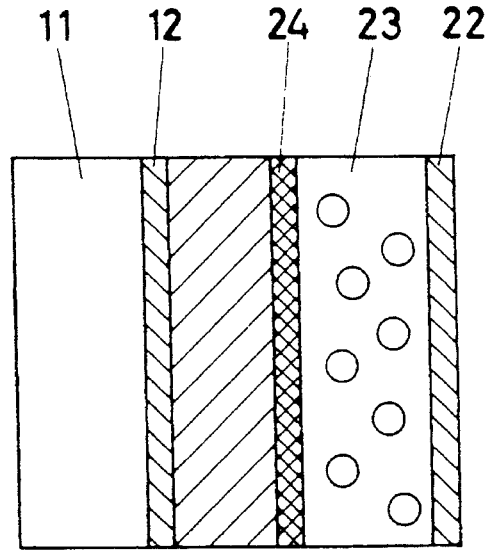
PRIOR ART

PRIOR ART

Time at which the application of voltage is put off

METHOD DEVICE FOR RECORDING INFORMATION, AND METHOD FOR MEASURING THE TRANSMITTANCE OF LIQUID CRYSTALS, WHICH IS APPLIED TO RECORDING INFORMATION

BACKGROUND OF THE INVENTION

This invention relates to a method and device for recording information on an information recording medium built up of a photoelectric sensor and a liquid crystal layer at a preset optimum applied voltage, and a method for measuring the transmittance of a liquid crystal recording medium which is applied to recording information.

So far, an arrangement wherein a polymer dispersion type of liquid crystal recording medium—in which a liquid crystal layer having liquid crystals dispersed and fixed in resin is formed on an electrode—is located in opposition to a photoelectric sensor having a photoconductive layer formed on an electrode layer has been known so as to record images by exposure to light at an applied voltage.

A typical construction of an image recorder used with such a polymer dispersion type of liquid crystal recording medium is illustrated in FIG. 1, in which reference numerals 10 and 20 stand for a photoelectric sensor and a liquid crystal recording medium, respectively. In the photoelectric sensor 10 a transparent electrode 12 and a photoconductive layer 13 are successively coated or otherwise formed on a transparent supporting substrate 11, and in the liquid crystal recording medium 20 a transparent electrode 22 and a polymer dispersion type of liquid crystal layer 23 are successively formed on a transparent supporting substrate 21. The photoconductive layer 13 used, for instance, may have a single-layer structure in which trinitrofluorenone is added to amorphous selenium or amorphous silicon for an inorganic photoconductive layer or to polyvinylcarbazole for an organic photoconductive layer, a formed structure in which a carrier generation layer obtained by dispersing an azo type pigment in a resin such as polyvinyl butyral is formed on a carrier transport layer obtained by mixing a hydrazone derivative with a resin such as polycarbonate, or other structures.

An arrangement in which, as shown in FIG. 1, a photoelectric sensor is opposed to a liquid crystal recording medium for exposure to light at an applied voltage, while a gap of about 10 μm is maintained between them by a spacer of polyethylene, polyimide or other polymer, and an arrangement in which, as shown in FIGS. 2(a) and 2(b), a photoelectric sensor and a liquid crystal recording medium are stacked together, have been put forward in the art. The stacked form of recording medium is broken down into two types, one in which a liquid crystal recording layer is stacked directly on a photoelectric sensor, as shown in FIG. 2(a), and the other in which an middle layer 24 of a transparent dielectric material is interposed between them, as shown in FIG. 2(b).

When such an arrangement built up of the photoelectric sensor 10 and the liquid crystal recording medium 20 located in opposition thereto is irradiated with visible write light, while voltage is applied between both the electrodes 12 and 22 by a power source 30, the conductivity of the photoconductive layer 13 changes depending on the intensity of the light, resulting in a change in the electric field applied on the liquid crystal layer 23 and so a change in the orientation of the liquid crystal layer. This orientation, even when the applied voltage is put off for removal of the electric field, is maintained so that images can be recorded.

The thus recorded image information can be read by irradiating the liquid crystal recording medium 20 with read light from a light source 40 and reading the transmitted light with a photoelectric conversion element 60 to convert it to electrical signals, as shown in FIG. 4 by way of example. For the light source 40 a white light source such as a xenon or halogen lamp or a laser light source may be used. For the read light with which the liquid crystal recording medium is irradiated, it is preferable to select light of suitable wavelength by a filter 50. The incident light is modulated by the orientation of the liquid crystal layer of the liquid crystal recording medium, and the transmitted light is converted to electrical signals through the photoelectric conversion element 60 made up of diodes, etc. The resulting electrical signals may be processed by a printer or otherwise displayed on a CRT, if required.

The orientation of the liquid crystal layer of a liquid crystal recording medium depends on the magnitude of an applied voltage, the duration of an applied voltage, etc., and for recording images of a high contrast it is required to measure the degree of orientation of the liquid crystal layer. The degree of orientation of the liquid crystal layer may be found by monitoring the transmittance.

One typical method for measuring the transmittance is illustrated in FIG. 5. As illustrated, a photoelectric sensor 10 having a transparent electrode 12 and a photoconductive layer 13 successively formed on a transparent supporting substrate 11 and a liquid crystal medium 20 having a transparent electrode 22 and a liquid crystal layer 23 successively formed on a transparent supporting substrate 21 are opposed to each other with an air gap of about 10 μm between them. At the same time as the supporting substrate of the photoelectric sensor 10 is irradiated with white light, voltage is applied by a power source 30 between the electrodes 12 and 22 with such a polarity that the electrode 12 becomes positive. As illustrated, black paper 43 is put on the surface of the supporting substrate of the photoelectric sensor 10, so that half the photoelectric sensor can be shielded light. Two sets of infrared light-emitting LEDs 41 and photoelectric conversion elements 42 are located on the side of the supporting substrate of the liquid crystal medium 20 in such a way that infrared light from the LEDs passes through the liquid crystal medium, and is then reflected by the surface of the photoconductive layer of the photoelectric sensor so that it can be incident on the photoelectric conversion elements. One set is located at the (light) portion of the photoelectric sensor that is irradiated with light and another is positioned at the (dark) portion of the photoelectric sensor that is shielded from light. As the transmittance of the liquid crystal medium increases upon the application of voltage, there is an increase in the quantity of the light incident on the photoelectric conversion elements 42, the output signals of which are monitored on an oscilloscope 65. A shutter 52 is located between the photoelectric sensor 10 and the light source. This shutter is in synchronism with the power source, and is preset such that it is put down simultaneously with the application of voltage and is put up after the lapse of 1/30 sec (33 msec). The signals of the photoelectric conversion element are monitored on the oscilloscope simultaneously with the application of voltage.

However, this conventional method for measuring the transmittance of a liquid crystal recording medium has a grave problem, because this is designed to detect the light that passes through the liquid crystal recording medium, and is reflected by the surface of the photoelectric sensor; no satisfactory detection signal can be obtained, because the surface reflectivity of the photoelectric sensor is low, and because infrared light is used as monitoring light so as to prevent the sensitization of the photoelectric sensor, and this places some limitation upon the usable wavelength region.

The magnitude, duration, etc., of the voltage applied on the liquid crystal layer may be preset by monitoring the transmittance of the liquid crystal layer. A problem with this method, however, is that an additional function of measuring the transmittance must be added to the information recorder, resulting in an increase in recorder size. Another problem is that the transmittance of the liquid crystal recording layer, because of depending largely on the wavelength of the monitoring light, must be corrected.

Still another problem with image recording according to such a method is that the recorded image becomes too light or too dark due to a slight difference in the magnitude and duration of an applied voltage, and this is true of even when the photoelectric sensor and liquid crystal recording medium having the same characteristics are used. Thus, it is very difficult to determine the conditions for recording images desired for those who record them, because the properties of the image recorded vary considerably depending on the magnitude and duration of an applied voltage.

SUMMARY OF THE INVENTION

An object of the invention is to prevent the sensitization of a photoelectric sensor by monitoring light and to precisely measure the transmittance of a liquid crystal recording medium.

Another object of the invention is to determine the necessary electrical properties of a photoelectric sensor and a liquid crystal recording medium before recording information, thereby making it possible to determine the applied voltage best suited for image recording.

Still another object of the invention is to stop the application of voltage after the lapse of the optimal duration of the applied voltage, thereby enabling information to be recorded with a high-enough contrast.

A further object of the invention is to monitor the transmittance of a liquid crystal recording medium at a region corresponding to the unexposed portion, so that the voltage can be put off when a given transmittance is reached, thereby making it possible to control the tone of the image recorded.

A further object of the invention is to provide a method for recording information, in which an image is recorded while the applied voltage and the duration of the applied voltage best suited for obtaining a good image of a high contrast are preset.

More specifically, the invention provides a method for measuring the transmittance of a liquid crystal recording medium having a transparent electrode and a polymer dispersion type of liquid crystal layer formed on a transparent substrate in this order by locating the liquid crystal recording medium in opposition to a photoelectric sensor having a transparent electrode and a photoconductive layer formed on a transparent substrate in this order and applying voltage between both the electrodes for exposure to image-carrying light, thereby orienting the liquid crystals to record the image, characterized in that a part of the surface of said photoconductive layer or said liquid crystal layer is provided with a reflecting layer, and incident light passing through said liquid crystal recording medium is reflected by said reflecting layer to detect the reflected light, so that the transmittance of said liquid crystal recording medium can be detected.

The invention also provides a method for recording image information by locating a liquid crystal recording medium including on a transparent substrate a polymer dispersion type of liquid crystal recording layer in which liquid crystals are dispersed and fixed in resin in opposition to a photoelectric sensor having a photoconductive layer formed on a transparent electrode and applying voltage between both the electrodes simultaneously with the exposure of an image to light, thereby recording said image information, characterized in that, before recording said information, voltage is applied on said photoelectric sensor and/or said liquid crystal recording medium, and the current flowing therethrough is measured to preset the optimal applied voltage.

Further, the invention is characterized in that the conductivity of an unexposed region of said photoelectric sensor is measured, and the duration of the voltage applied between said photoelectric sensor and said liquid crystal recording medium is predetermined on the basis of the obtained measurements.

Still further, the invention is characterized in that the transmittance of said liquid crystal recording medium is monitored, and the duration of the applied voltage is controlled on the basis of the transmittance of said liquid crystal recording medium.

Still further, the invention provides a method for recording information characterized by the transmittance of a liquid crystal layer at a dark portion is detected, and the duration of the applied voltage is controlled on the basis of the thus detected results, thereby controlling the density gradation.

Still further, the invention is characterized in that the current flowing through a liquid crystal recording medium is monitored to estimate the voltage applied on the liquid crystal recording medium, and the duration of the applied voltage is controlled on the basis of the thus estimated voltage.

Still further, the invention is characterized in that the current flowing through a liquid crystal recording medium is measured to monitor the behavior of the liquid crystal layer, so that the duration of the applied voltage can be controlled.

Still further, the invention provides a method for applying voltage using a polymer dispersion type of liquid crystal recording medium, characterized in that the current of the dark portion is measured to monitor the behavior of the liquid crystal recording layer, and the moment the contrast reaches a maximum is detected to put off the voltage.

BRIEF DESCRIPTION OF THE DRAWINGS

FIG. 1 is a schematic of the structure of the liquid crystal recording medium,

FIGS. 2-A and 2-B are schematics of the structure of the liquid crystal recording medium.

DESCRIPTION OF THE PREFERRED EMBODIMENT

Figure 6:
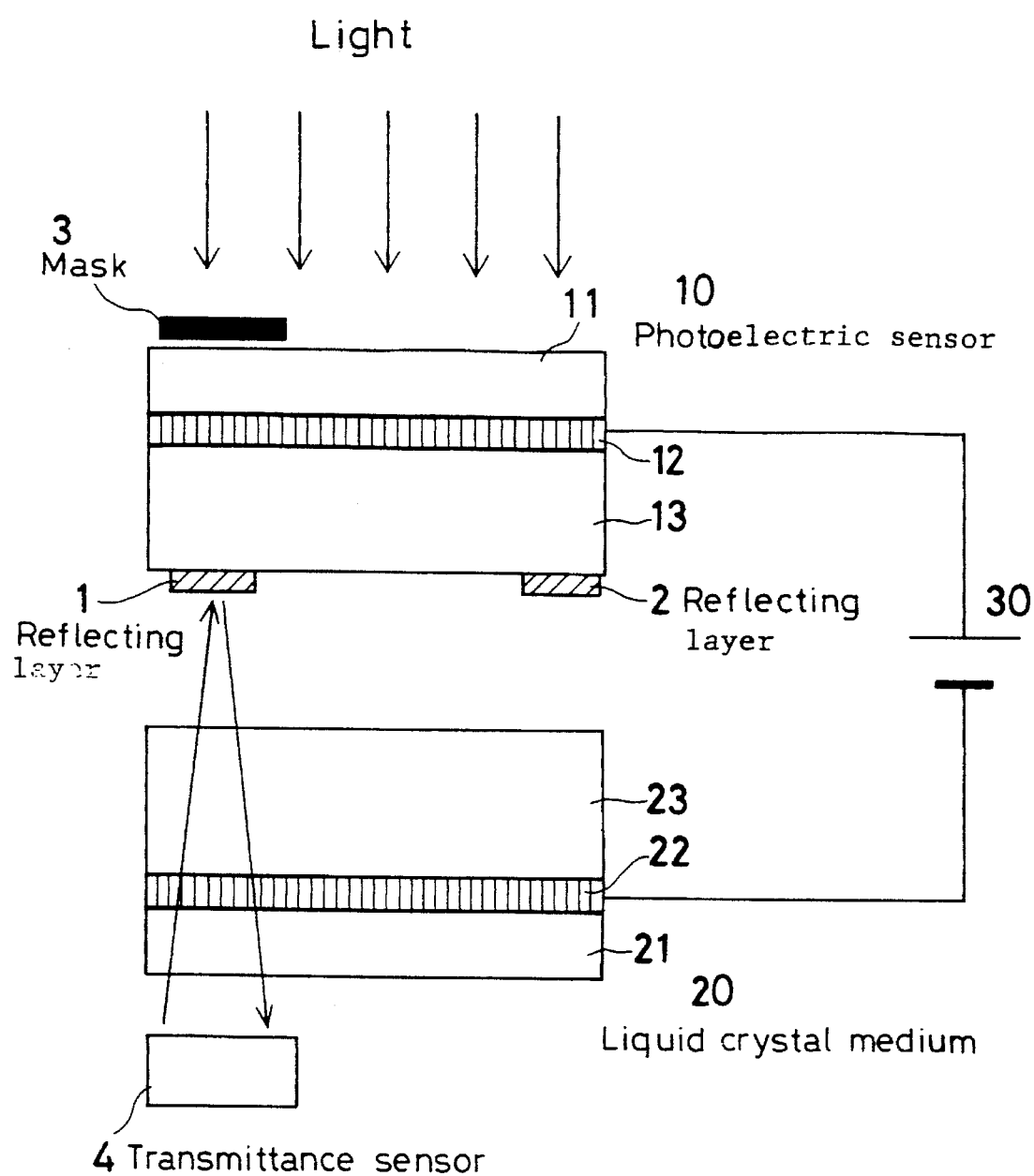
FIG. 6 is a schematic illustrating one example of the method for measuring the transmittance of liquid crystals according to the invention.
Figure 7:
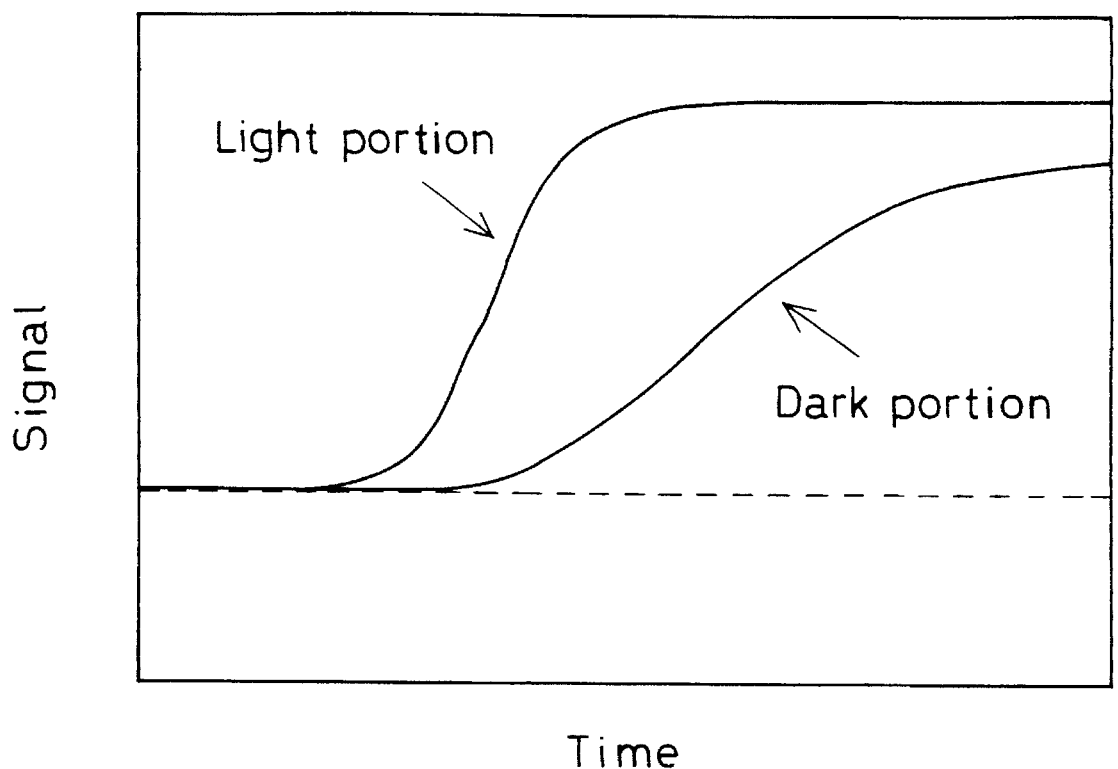
FIG. 7 is a graph representing the change-with-time in transmittance of the light and dark portions.

FIG. 6 illustrates a typical example of the method for measuring the transmittance of a liquid crystal medium according to the invention.

A mask 3 is located on the side of a photoelectric sensor 10 to be exposed to image-carrying light, so that this region can be shielded from the light. A reflecting layer 1 made up of a dielectric mirror layer or Al, by way of example, is formed on the surface of a photoconductive layer 13 in opposition to the shielding mask 3, and a reflecting layer 2 is formed on the surface of the photoconductive layer 13 that is to be exposed to the image-carrying light. The portion of the member 10 provided with the reflecting layer 1 is a dark portion that is shielded by the mask 3 from light and is not exposed to light, where the conductivity of the photoconductive layer 13 is low, while the portion of the member 10 provided with the reflecting layer 2 is a light portion that is exposed to light, where the conductivity of the photoconductive layer 13 is high. The voltage applied on the liquid crystal medium is higher at the light portion than at the dark portion, so that the liquid crystals can be oriented faster at the light portion than at the dark portion, resulting in an increase in transmittance.

A transmittance sensor 4 is made up of a visible LED and a photoelectric conversion element. When the transmittance of the dark portion is measured, the reflecting layer 1 is irradiated with light through a liquid crystal recording medium 20 to detect the light reflected by the film 1. When the transmittance of the light portion is measured, the reflecting layer 2 is irradiated with light to detect the light reflected by the film 2. Since the light reflected by the reflecting layers on the surface of the photoelectric sensor is detected, the photoelectric sensor 10 is most unlikely to be sensitized, even when visible light is used. By use of the reflecting layers it is possible to detect the reflected light at a very high reflectivity.

Figure 8:
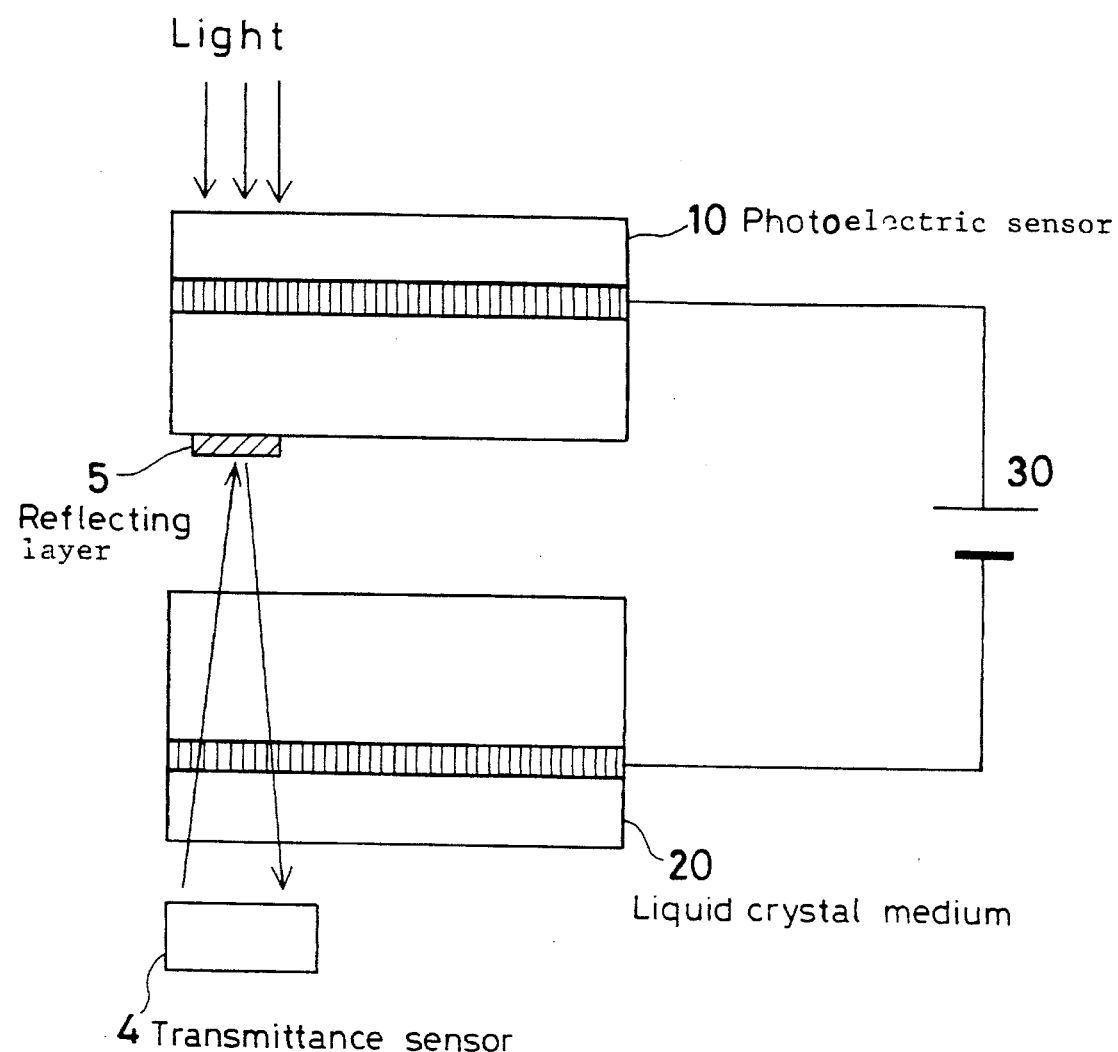
FIG. 8 is a schematic illustrating another example of the method for measuring the transmittance of liquid crystals according to the invention.

FIG. 8 illustrates another example of the method for measuring the transmittance of a liquid crystal medium according to the invention, wherein only a portion of a photoelectric sensor 10 provided with a reflecting layer 5 is exposed to image-carrying light, and no mask is used. The transmittance of the light portion can be monitored by detecting the light reflected by the reflecting layer 5 with the use of a transmittance sensor 4.

Figure 9:
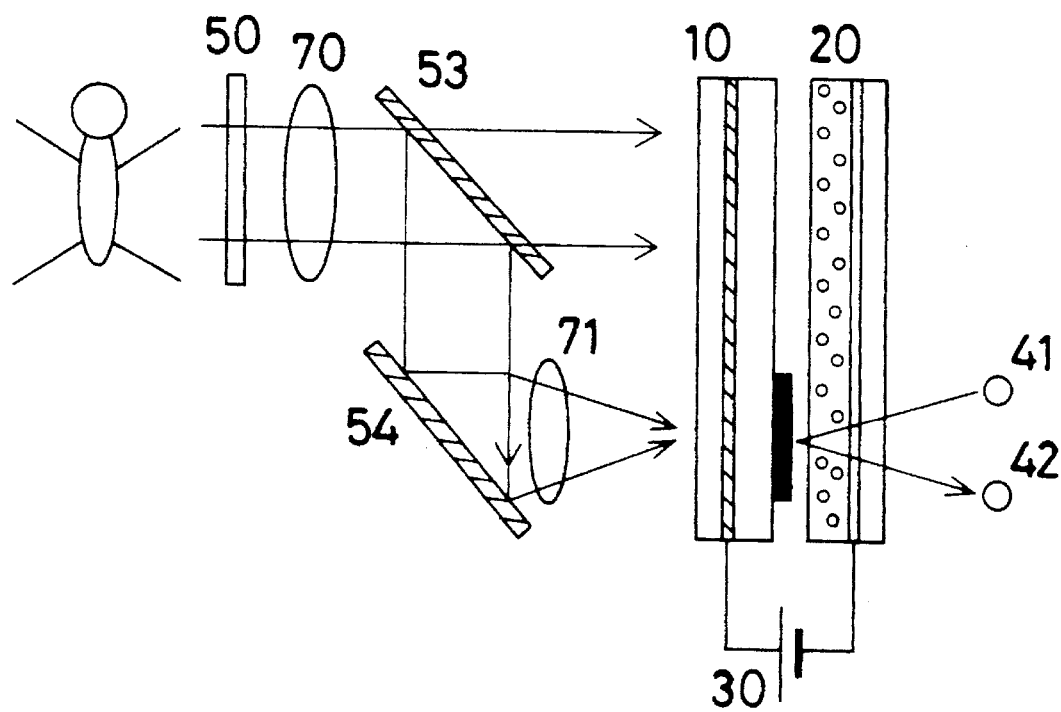
FIG. 9 is a schematic illustrating one example of the method for measuring the transmittance of the light portion.

FIG. 9 illustrates another example of the method for monitoring the transmittance of the light portion. A photoelectric sensor 10 is exposed to image-carrying light through an image formation lens system 70 and a half mirror 53, while an optical shutter 50 is put down for a given time. Then, the half mirror 53 is used to remove a part of the light, with which a portion of the photoelectric sensor provided with a reflecting layer is irradiated through a reflecting mirror 54 and an optical system 71. Then, the reflecting layer is irradiated through a liquid crystal recording medium 20 with monitoring light from an LED 41. The transmittance of the light portion can be monitored by detecting the light reflected by the reflecting layer with the use of a photoelectric conversion element 42.

Figure 10:
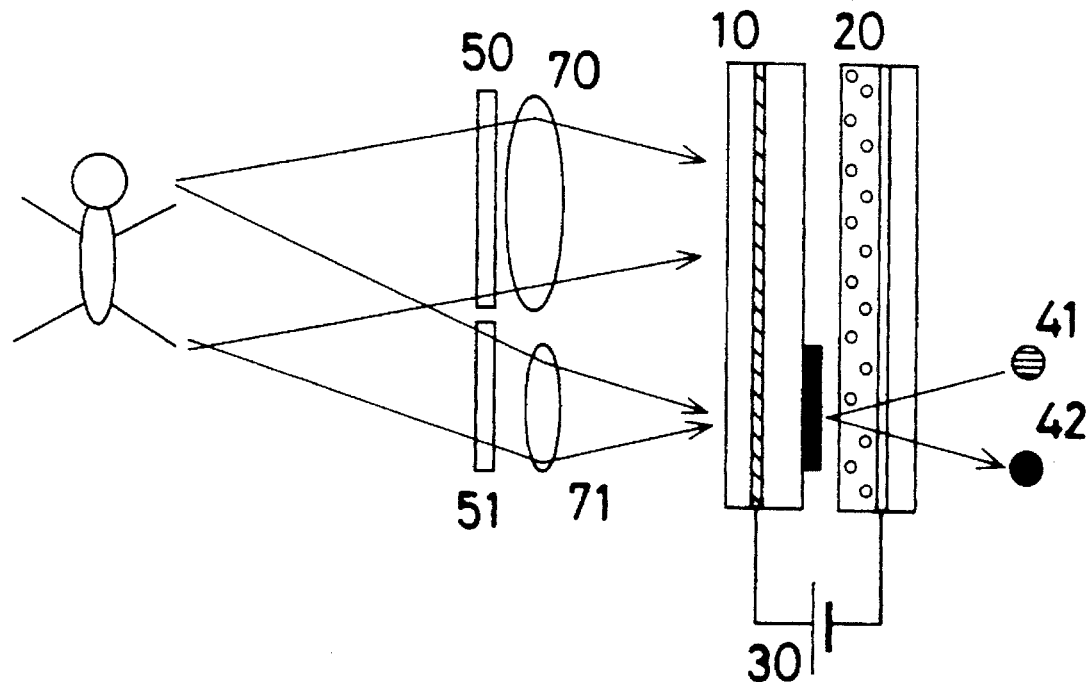
FIG. 10 is a schematic illustrating another example of the method for measuring the transmittance of the light portion.

FIG. 10 illustrates still another example of the method for monitoring the transmittance of the light portion. In this case no half mirror is used; with the use of an optical shutter 51 and an optical system 71 the portion—to be monitored—of a photoelectric sensor provided with a reflecting layer is irradiated with a suitable quantity of light.

The quantity of the light incident on the portion to be monitored may be regulated by the lens system 71. While the invention has been described with reference to some specific arrangements wherein the reflecting layers are formed on the surface of the photoelectric sensor, it is understood that the invention is not limited to such arrangements. According to the invention, for instance, the monitoring of trasmittance can be achieved with reflecting layers that are formed on the surface of the liquid crystal layer opposite to the photoelectric sensor.

EXAMPLES OF MEASURING TRANSMITTANCE (a) Fabrication of photoelectric sensor

Three (3) parts of a carrier generation substance, i.e., a fluorenone azo pigment having the following structural formula and 1 part of polyester resin were mixed with 196 parts of a solvent mixture consisting of dioxane and cyclohexane at 1:1, and the mixture was well kneaded together by means of a mixer to prepare a coating solution.

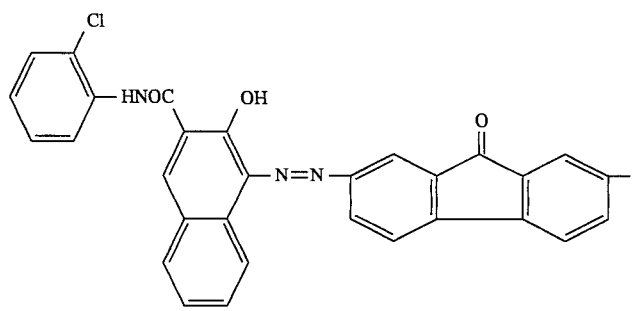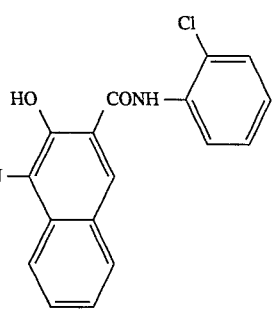

This solution was coated on the surface of an ITO transparent electrode (having a thickness of about 500 Å and a resistance value of 80 Ω/☐) on a glass substrate, and was then dried at 100° C. for 1 hour to form a carrier generation layer having a thickness of 0.3 μm.

Next, 3 parts of a carrier transport substance, i.e., p-dimethylstilbene having the following structural formula and 1 part of polystyrene resin were mixed with, and dissolved in, 170 parts of a solvent mixture consisting of dichloromethane and 1,1,2-trichloroethane at 68:102 to prepare a coating solution.

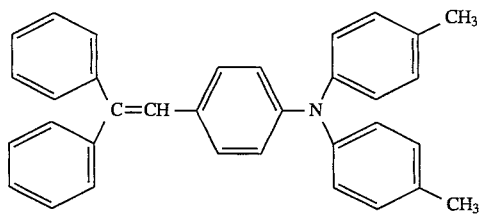

This solution was coated on the above carrier generation layer, and was then dried at 80° C. for 2 hour to form a carrier transport layer having a thickness of 10 μm.

Then, an Al deposited mask was formed on the surface of the glass substrate. Following this, Al was vapor-deposited on the masked surface of the glass substrate at a thickness of about 1,000 Å to form a reflecting layer of 5 mm×5 mm in size, thereby fabricating a photoelectric sensor.

(b) Fabrication of Liquid Crystal Recording Medium

A liquid crystal was extracted from the cross-section of the liquid crystal recording medium using methanol. After it was dried, it was examined under scanning electron microscope (Hitachi; S-800;x 10,000). As a result, it was found that the surface of the layer was covered with a UV-setting resin of 0.6 μm thick, and resin particles with particle size of 0.1 μm were filled inside the layer. Because the liquid crystal recording medium has a skin layer comprising UV-setting resin on the surface of the layer, it has excellent property to retain the liquid crystal in the medium. Also, because no effusion phenomenon of liquid crystal occurs on the surface, no disturbance of information recording occurs due to the liquid crystal on the medium surface when it is used as an information recording medium, and it is possible to record information without unevenness.

Preparation of integrated type information recording medium

On the electric charge transport layer of the optical sensor as already described, disparaxylilene having the following structure was added under vacuum condition by vapor polymerization. Thus, a film of poly-(monochloro-paraxylilene) of 0.6 μm thick was formed as a dielectric intermediate layer. Further, on the dielectric intermediate layer, the solution used in the preparation of the information recording medium was coated by the same procedure. Through UV-setting, the information recording layer was produced. On this information recording layer, ITO was laminated by the sputtering method to thickness of about 200 Angstrom. Thus, the integrated information recording medium of the present invention was prepared.

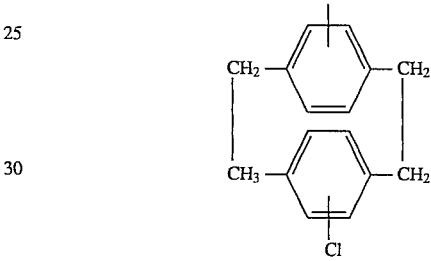

A mixture of 4 parts of dipentaerythritol hexacrylate, 6 parts of a smectic liquid crystal (S6; Merck), 0.2 parts of a fluorine type activator (Fluorad FC-430; Sumitomo 3M) and 0.2 parts of a photopolymerization initiator (Durocure 1173; Merck) was regulated to a solid content of 30% with xylene.

This solution was coated on the surface of an ITO transparent electrode (having a thickness of 500 Å and a resistance value of 80 Ω/) on a glass substrate by means of a blade coater having a gap thickness of 50 μm, and was held at 50° C. and then irradiated with UV light of 0.3 J/cm² to fabricate a liquid crystal recording medium having a liquid crystal recording layer of about 6 μm in thickness.

(c) Measurements

Figure 11:
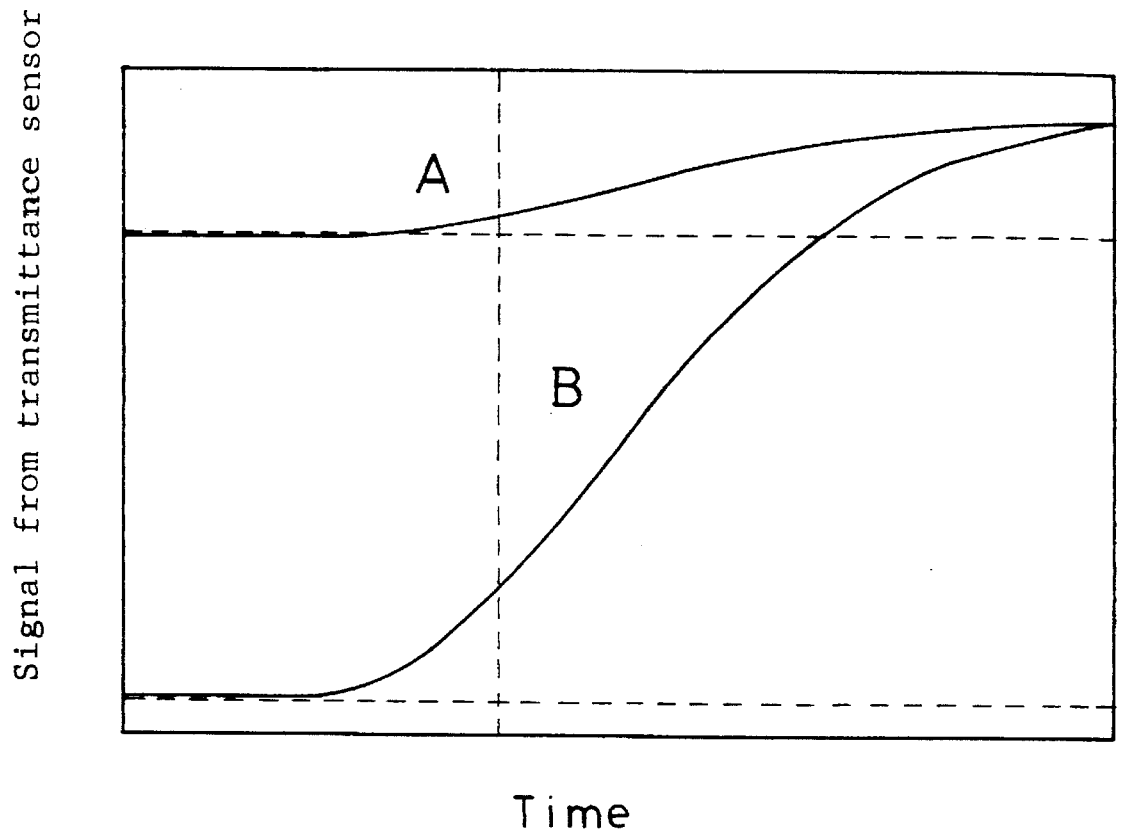
FIG. 11 is a graph showing the results of the transmittance measured.

The thus fabricated photoelectric sensor and liquid crystal recording medium were opposed to each other with an air gap of about 10 μm in such a manner that light from an LED was reflected by the reflecting layer on the photoelectric sensor, and struck on the photoelectric sensor. While a voltage of about 750 V was applied on this arrangement for 200 msec in a dark place, signals from the photoelectric sensor were monitored using an infrared light-emitting LED (700 nm) and a visible light-emitting LED (500 nm). As a result, waveforms A and B shown in FIG. 11 were obtained, respectively.

Figure 12:
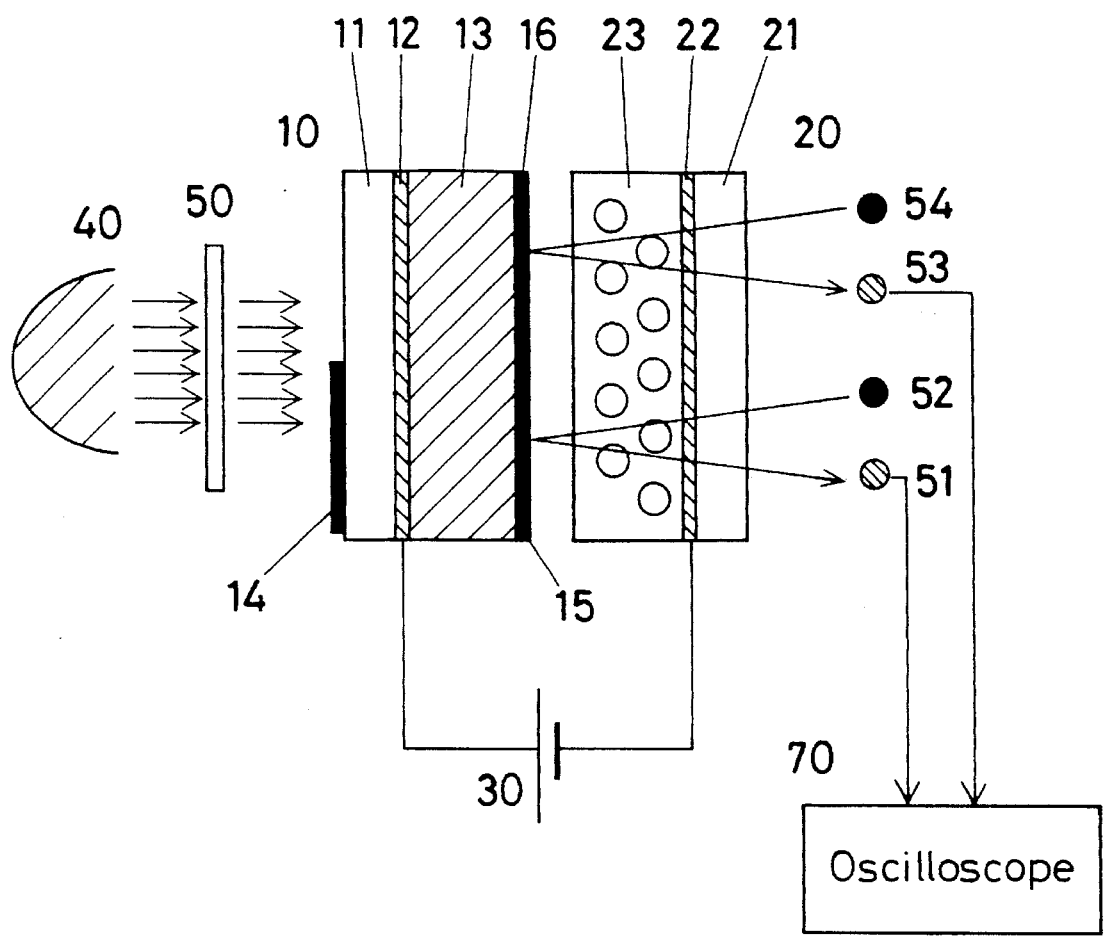
FIG. 12 is a schematic illustrating the method for measuring the behavior of the liquid crystal recording layer at the exposed and unexposed portions by the transmittance-measuring method according to the invention.

FIG. 12 illustrates the method for measuring the behavior of the exposed and unexposed portions of a liquid crystal recording layer, using the transmittance measuring method mentioned above. A photoelectric sensor 10 is opposed to a liquid crystal recording medium 20 with an air gap of about 10 μm between them. Using a light source 40 and an optical shutter 50, the transparent substrate of the photoelectric sensor is irradiated with a given quantity of light for a given time. Half the transparent substrate 11 of the photoelectric sensor 10 is provided with a black mask 14 so as to shield the region of the photoelectric sensor corresponding to it from light. The photoelectric sensor 10 is provided on the photoconductive layer with reflecting mirror layers 15 and 16. The reflecting mirror layers are separately formed by the vapor deposition of A1, and the reflecting mirror layer 15 is located in opposition to the mask 14. The liquid crystal recording medium 20 is provided with photoelectric conversion elements 51 and 53 and LEDs 52 and 54, so that light beams from the LEDs 52 and 54 can be reflected by the reflecting mirrors 15 and 16, and strike on the photoelectric conversion elements 51 and 53. The photoelectric sensor is irradiated with light from the light source 40 by putting down the optical shutter 50, simultaneously with the application of voltage between electrodes 12 and 22 via a power source 30, whereby the photoelectric conversion elements 51 and 53 can be used to monitor how the transmittance of the exposed and unexposed portions of the liquid crystal recording layer changes.

Figure 13A:
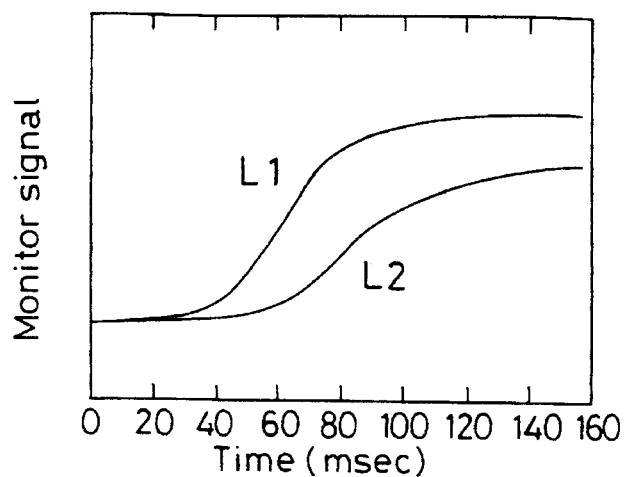
FIGS. 13(a) and 13(c) are graphs showing the transmittance change of the liquid crystal recording medium at the exposed and unexposed portions at varying applied voltages of 670 V, 720 V and 770 V.
Figure 13B:
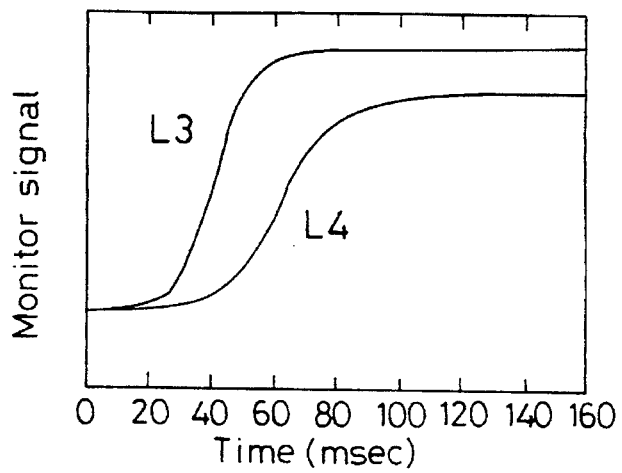
Figure 13C:
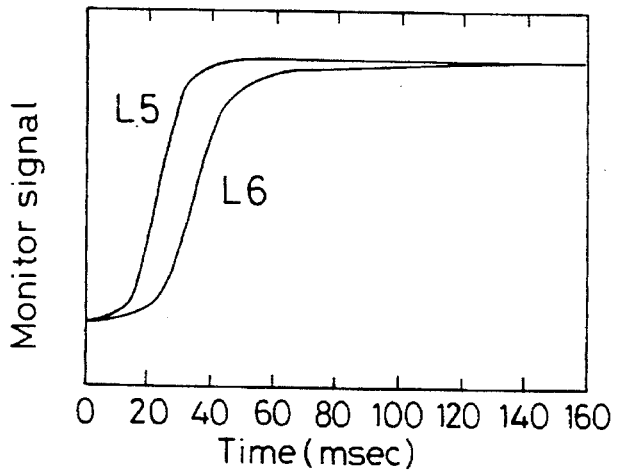
Figure 14:
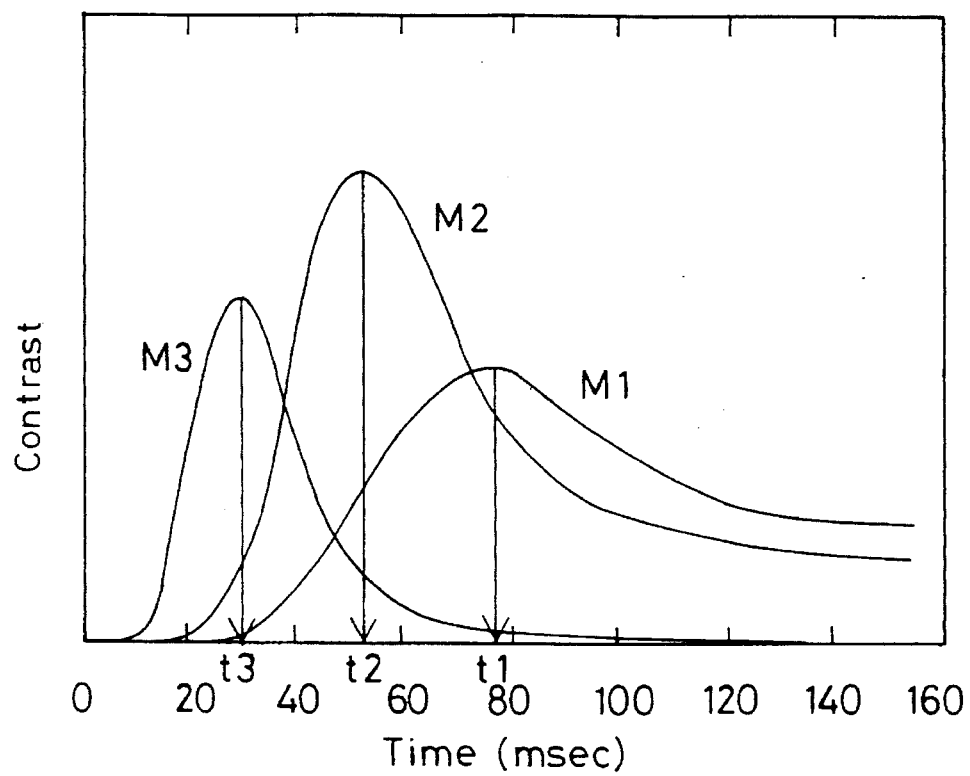
FIG. 14 is a graph showing the change-with-time of a transmittance difference between the exposed and unexposed portions.

Transmittance changes of the exposed and unexposed portions of the liquid crystal recording medium at varying applied voltages of 670 V, 720 V and 770 V were monitored by the photoelectric conversion elements 51 and 53. The results are shown in FIGS. 13(*a*) to (*c*). Also shown in FIG. 14 are changes-with-time of a difference in the monitoring signals between the exposed and unexposed portions. In FIG. 13 Curves L1, L3 and L5 show how the exposed portion of the liquid crystal medium changes and Curves L2, L4 and L6 show how the unexposed portion changes. In FIG. 14 Curves M1, M2 and M3 show changes-with-time of signal differences between the exposed and unexposed portions at the respective voltages.

Since the conductivity of the photoelectric sensor is higher at the exposed portion than at the unexposed portion, an extra voltage is applied on the liquid crystal recording layer, so that the liquid crystal layer can be rapidly oriented, resulting in a transmittance increase. Thus, images can be recorded due to a difference in the speed of the transmittance change. From FIGS. 13(*a*) to 13(*c*) it is also understood that the higher the applied voltage, the higher the voltage and rate of operation of the liquid crystal recording layer. The difference in transmittance between the exposed and unexposed portions reaches a maximum at a certain time; that is, images can be recorded by stopping the application of voltage at that time. As can be seen from FIG. 14, the time at which the difference in transmittance between the exposed and unexposed portions of the liquid crystal recording medium reaches a maximum is t1, t2 and t3 at the applied voltages of 670 V, 720 V and 770 V; that is, the higher the voltage, the shorter the duration of the applied voltage. The maximum value of the difference in transmittance between the exposed and unexposed portions depends on voltage; in other words, no enhanced contrast is obtained at too high or low an applied voltage. To obtain recorded images of good quality, it is thus required to apply the optimal voltage for recording images.

Figure 15:
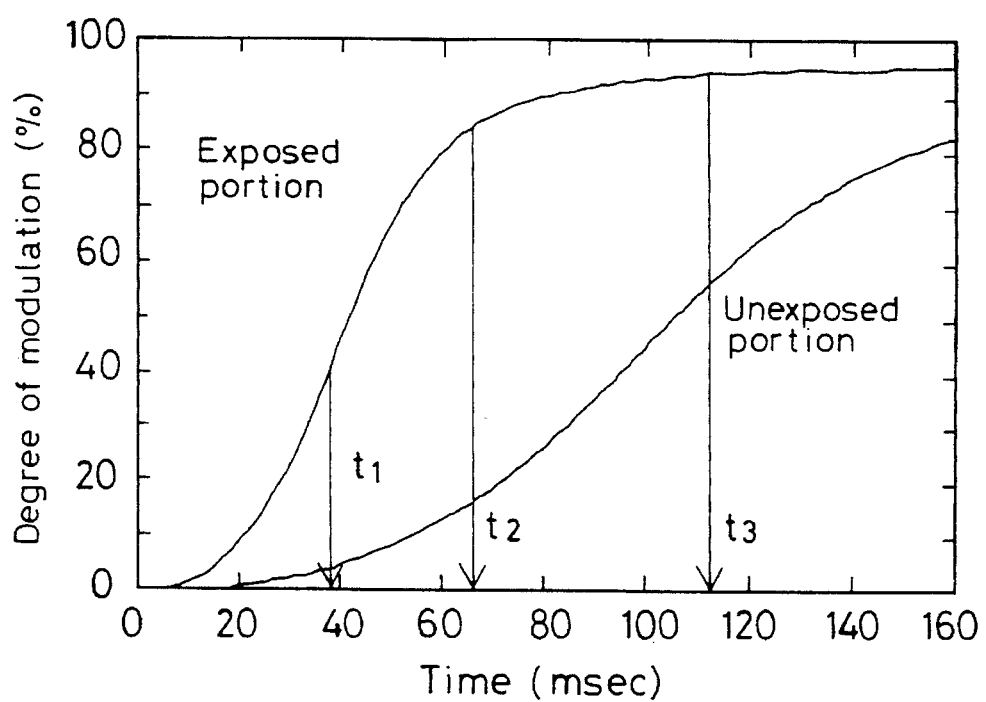
FIG. 15 is a graph showing the change-with-time in the degree of modulation between the exposed and unexposed portions.

FIG. 15 with time as abscissa and the degree of modulation as ordinate shows the degree of modulation of the exposed (light) and unexposed (dark) portions. The "contrast" is given by a difference in the degree of modulation between the light and dark portions, which enables images to be recorded.

The rate of operation of the liquid crystal is higher at the exposed portion than at the unexposed portion, because the conductivity of the photoconductive layer of the photoelectric sensor is higher at the exposed portion than at the unexposed portion, resulting in the application of an extra voltage on the liquid crystal portion. Hence, images can be recorded by making use of the difference in the rate of operation.

For instance, now let us consider the case where the voltage is put off at a certain time. At that moment the operation of the liquid crystal recording medium stops, so that image information can be recorded. As can be seen from FIG. 15, there is the optimal time for putting off the voltage. For instance, if the voltage is put off too early, e.g., at t1, no sufficient contrast will then be obtained due to no sufficient modulation of the light portion of the liquid crystal recording medium. If the voltage is applied too long, e.g., for as long as t3, on the other hand, neither sufficient contrast nor any image of good quality will again be obtained due to some excessive modulation of the dark portion of the liquid crystal recording medium. To obtain images of good quality, it is thus required to determine the optimal duration (t2) of an applied voltage. However, much difficulty is involved in its precise predetermination before the application of voltage.

Various methods for presetting the voltage to be applied and the duration of an applied voltage according to the invention will now be explained at great length.

In the first place, reference will be made to the determination of the voltage to be applied by measuring the resistivity of a liquid crystal recording layer and the conductivity of a photoelectric sensor.

RESISTIVITY OF LIQUID CRYSTAL RECORDING MEDIUM

Figure 16:
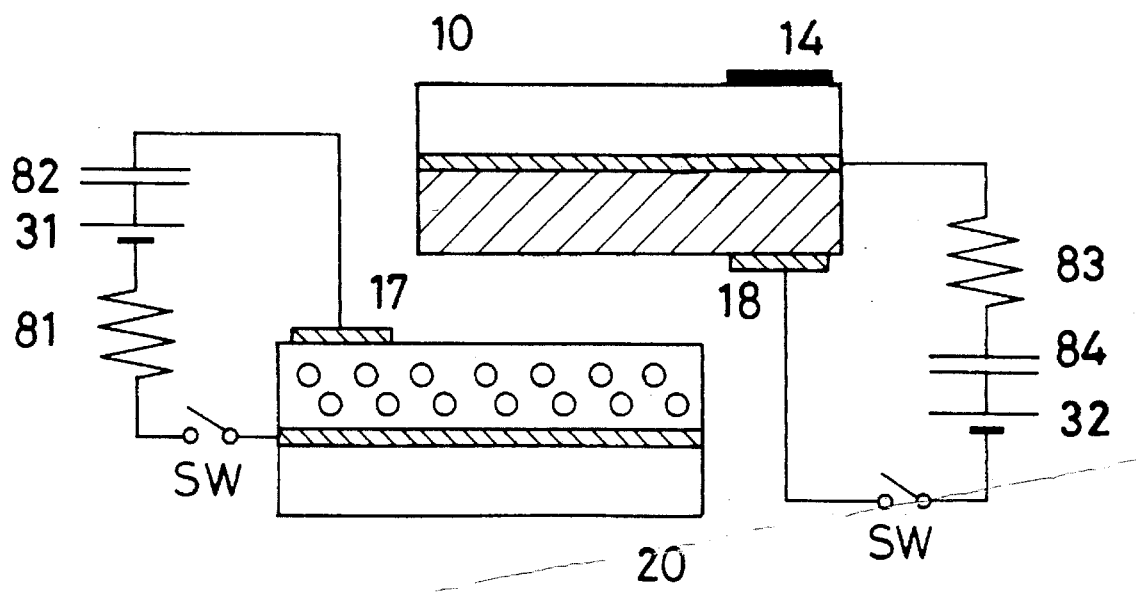
FIG. 16 is a schematic showing the method for measuring the resistance of the liquid crystal recording medium and the conductivity of the photoelectric sensor.
Figure 17A:
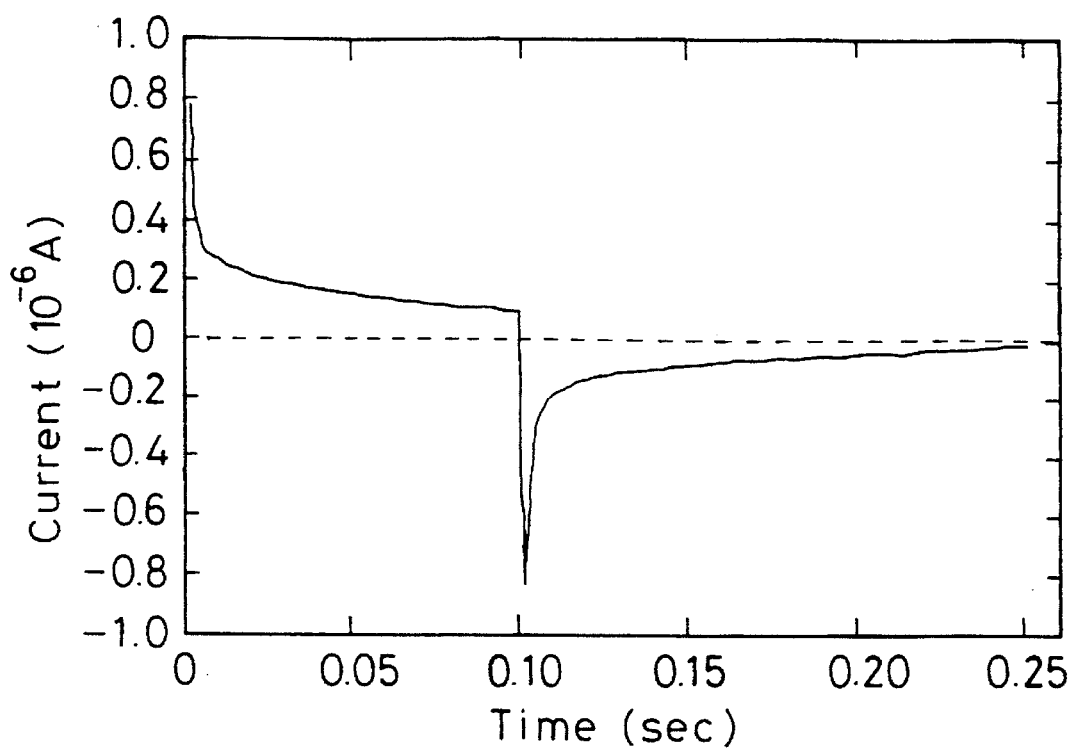
FIGS. 17(a)–17(b) are graphs showing the measurements of the current flowing through the liquid crystal recording layer.
Figure 17B:
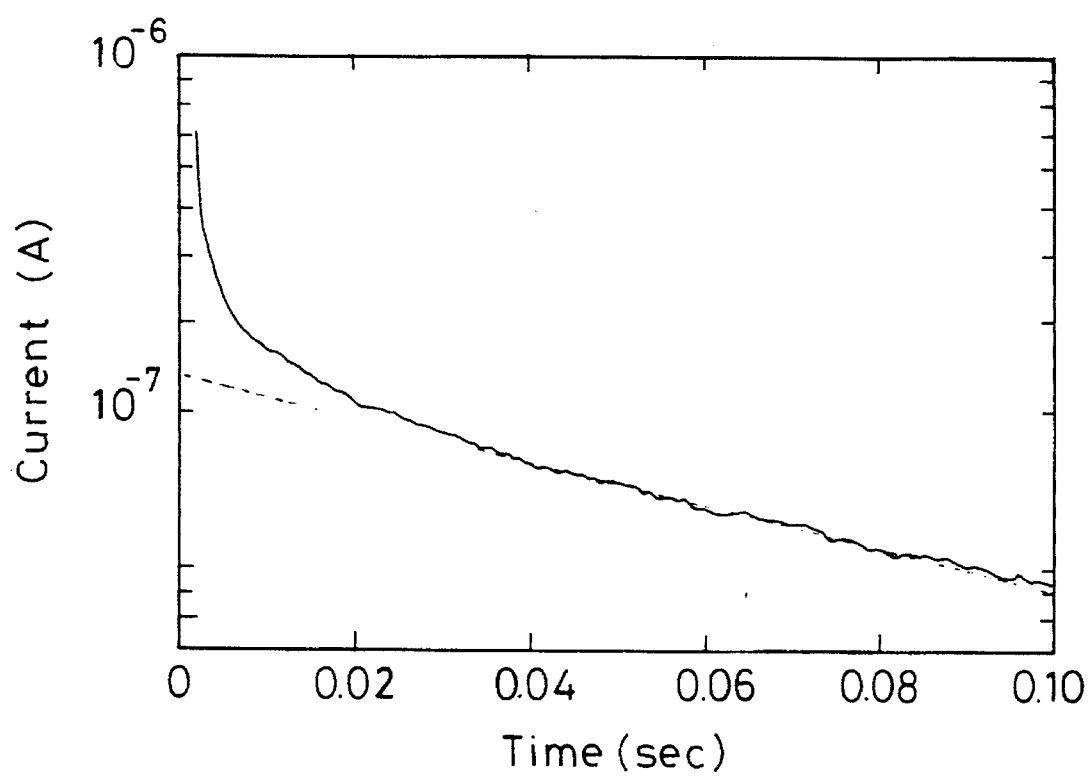

As shown in FIG. 16, an Au electrode 17 was deposited on the surface of a portion separate from the portion of the liquid crystal recording layer fabricated as mentioned above, which is to be formed with images. The Au electrode 17 had an area of 0.16 cm$^2$, and the liquid crystal recording portion with the electrode formed on it was found to have an electrostatic capacity of 150 pF, as measured by an impedance meter. Then, a capacitor 82 of 500 pF was connected in series with the liquid crystal recording layer, as shown in FIG. 16, to find the current value, while a voltage of 100 V was applied thereon for about 0.1 sac via a power source 31. The current value was measured by measuring the voltage of a resistance 81 of 50 k$\Omega$ connected in series with the recording layer. The results are shown in FIGS. 17(*a*) and (*b*). FIG. 17(*a*) shows a current change from just after the application of the voltage to the putting-off of the voltage, and FIG. 17(*b*) is a logarithmic representation of a current while voltage is applied.

The liquid crystal recording layer is considered to be a parallel circuit with the capacitor and resistance. Just after the application of the voltage, the voltage is distributed to the liquid crystal recording layer and capacitor according to their capacity ratio, and the voltage of the liquid crystal recording layer then decreases due to the flow of a current through the resistance component of the liquid crystal recording layer. At the same time as the voltage is put off, a current of the opposite polarity flows due to the discharge of the capacitor, as shown in FIG. 17(*a*). Plotting the logarithm of the current versus time gives a straight line such as one shown in FIG. 17(*b*), so that the resistivity in $\Omega$cm of the liquid crystal recording layer can be calculated from the gradient of that straight line. By calculation, the resistivity of the liquid crystal recording layer fabricated as mentioned above was thus found to be $2.0 \times 10^{11}$ $\Omega$cm.

In this invention, the area of the Au electrode and the capacity of the capacitor connected to it are in no sense limited to the values mentioned above. Illustratively and preferably, an electrode of about 0.1 to 1 cm² in area is used with a capacitor of 100 to 1,000 pF. While the applied voltage is not particularly limited to 100 V, it is needed to apply a voltage lower than the threshold value. This is because when the voltage of the liquid crystal recording layer exceeds the threshold voltage, there are changes in the capacity and the current to be measured due to the orientation of the liquid crystal, and so no precise resistivity value is obtained. Also how to measure the resistivity is never limited to the method mentioned above. For instance, the resistivity may be found by applying a slope form of voltage on the liquid crystal recording layer with no capacitor connected to it and calculating the gradient of the current value measured.

HOW TO PRESET THE VOLTAGE TO BE APPLIED

In what follows, how to preset the voltage to be applied will be explained.

Figure 18:
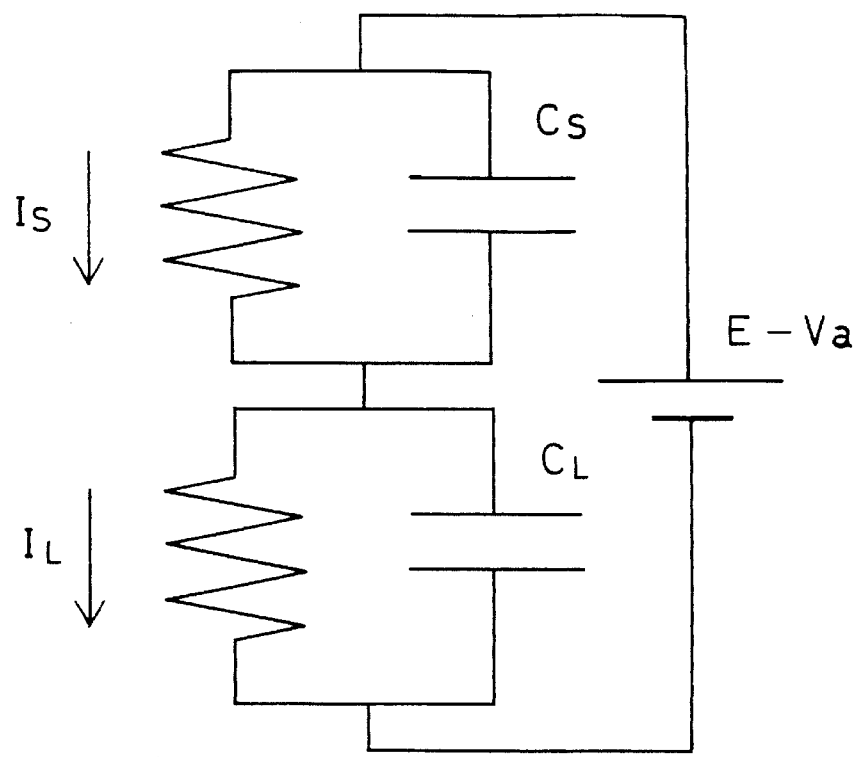
FIG. 18 is a schematic of an equivalent circuit for a recorder made up of a photoelectric sensor and a liquid crystal recording medium, FIG. 19 schematically illustrates the changes in voltage of the photoelectric sensor and liquid crystal recording layer at the unexposed portions, FIG. 20 schematically illustrates the change in current of the photoelectric sensor and liquid crystal recording layer at the unexposed portions.

In the image recorder system according to the invention, the photoelectric sensor and the liquid crystal recording medium are each considered to be a parallel circuit with the resistance and capacitor, and represented in terms of an equivalent circuit made up of these series circuits, as shown in FIG. 18.

As illustrated, now let $C_S$ and $C_L$ denote the capacities of the photoelectric sensor and liquid crystal recording medium, $V_{AP}$ (=source voltage E–gap voltage $V_{AIR}$) denote a voltage across the series circuit, $V_S$ and $V_C$ denote voltages on the photoelectric sensor and liquid crystal recording medium, and $I_S$ and $I_L$ denote currents through the photoelectric sensor and liquid crystal recording medium. Just after the application of voltage, the applied voltage is distributed according to the capacity ratio. Then, the voltages are given by $$V_L(0) = V_{AP} \times C_S/(C_L + C_S) \qquad \ldots (1\text{-}1)$$

$$V_S(0) = V_{AP} \times C_L/(C_L + C_S) \qquad \ldots (1\text{-}2)$$

Thereafter, the voltage of the liquid crystal recording medium increases, because the current $I_S$ through the photoelectric sensor is larger than the current $I_L$ (=$V_L/R_L$) through the liquid crystal recording medium so that charges can be accumulated in $C_L$. This state takes the form of the following differential equation (1-3):

$$\begin{aligned} & I_S + C_S(dV_S/dt) \\ =\ & V_L/R_L + C_L(dV_L/dt) + V_L(dC_L/dt) \\ & I_S - V_L/R_L \\ =\ & (C_S + C_L)(dV_L/dt) + V_L(dC_L/dt) \end{aligned} \qquad (1\text{-}3)$$

where $dV_S/dt = -dV_L/dt$

Figure 19:
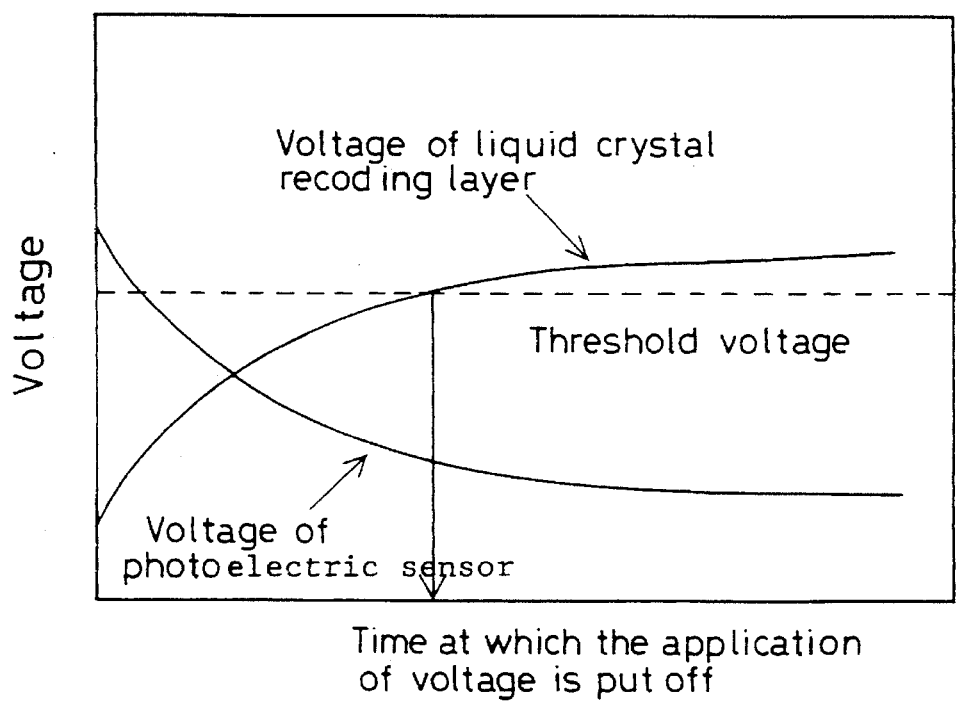
Figure 20:
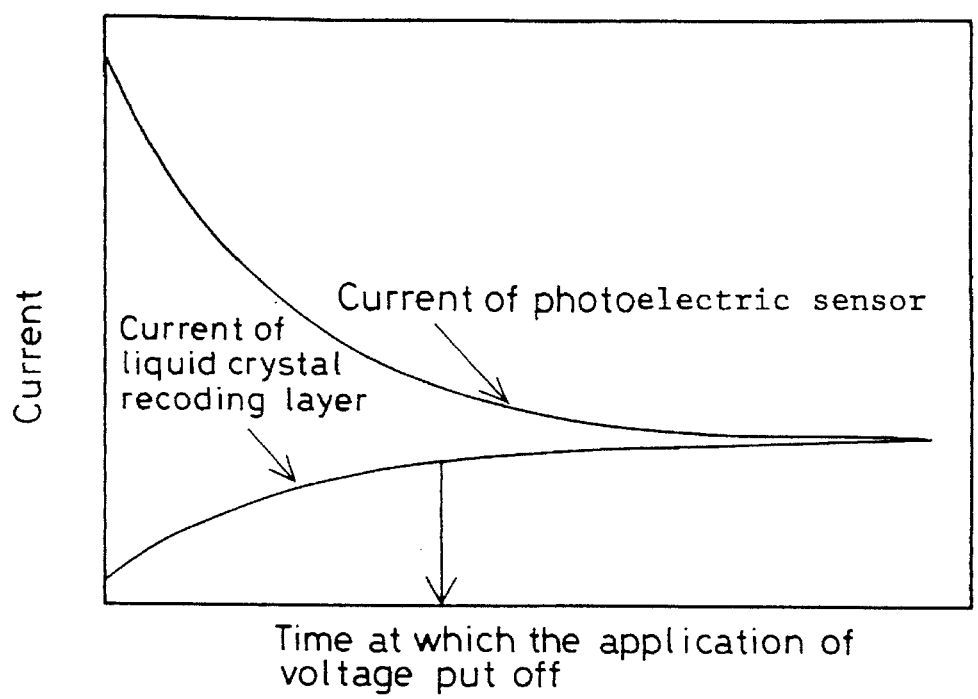

FIGS. 19 and 20 are schematic representations of changes in the voltage and current of the photoelectric sensor and liquid crystal layer at the unexposed portion in the case of the present recording system. In the present system an image of an enhanced contrast can be obtained by stopping the application of voltage when the voltage of the unexposed portion of the liquid crystal recording layer reaches the threshold voltage at which the liquid crystal starts to operate (orient). At this time the voltage of the liquid crystal recording layer is so equal to the threshold voltage, so that the current can be given by $$I_L = V_{TH}/R_L \qquad \ldots (1\text{-}4)$$

As explained with reference to FIG. 17, the resistivity of the liquid crystal recording layer may be found from a current change, and because the threshold voltage of the liquid crystal recording medium is already known, the current value of the liquid crystal recording layer may then be found by Equation (1-4). By calculation, the current value of the liquid crystal recording medium fabricated as mentioned above was found to be $1.5 \times 10^{-6}$ A/cm².

When the preset applied voltage is too low, no image recording can occur, because the voltage of the liquid crystal recording layer cannot exceed the threshold voltage. At too high a preset applied voltage the voltage of the liquid crystal recording medium reaches the threshold voltage too early, and so any image of an enhanced contrast cannot be obtained due to a small difference in the degree of orientation between the unexposed and exposed portions. Such a high preset applied voltage is thus not preferable. When the voltage of the liquid crystal recording layer is the threshold voltage, the current through the photoelectric sensor must have a proper value preset on the basis of the current that then flows through the liquid crystal recording layer. Thus, an image of an enhanced contrast can be obtained by presetting the applied voltage in such a way that the current, which flows through the photoelectric sensor when the voltage of the liquid crystal recording layer is the threshold voltage, has a proper value, as will be described at great length.

From Equation (1-3), it is understood that when the liquid crystal recording layer starts to operate upon its voltage reaching the threshold voltage, there is a current corresponding to an increase in the electrostatic capacity of the liquid crystal recording layer due to the orientation of the liquid crystal. When the application of the voltage is stopped, the voltage change of the liquid crystal recording layer is considered to be small (i.e., $dV_L/dt \approx 0$ in Equation (1-3)), and from Equation (1-3) it is then considered that the proper current value of the photoelectric sensor is the sum of the current flowing from the resistance component of the liquid crystal recording layer and the portion corresponding to the capacity change. The current density of the liquid crystal recording layer prepared as mentioned above that corresponds to the capacity change is 1 to $3 \times 10^{-6}$ A/cm², preferably about $2 \times 10^{-6}$ A/cm². This value remains substantially unchanged even when there is a variation in the thickness of the liquid crystal recording layer. In some cases, however, it varies depending on the liquid crystal substance used and a change in its composition with resin. In other words, the current density of the liquid crystal recording layer must be estimated with the rate of the capacity change of the liquid crystal recording medium in mind. The current corresponding to the voltage change of the liquid crystal recording layer and photoelectric sensor is smaller than the capacity variable components and so is negligible, because the voltage change is not appreciably large, as already mentioned.

MEASUREMENT OF THE CONDUCTIVITY OF PHOTOELECTRIC SENSOR

The conductivity of the photoelectric sensor may be measured, as shown in FIG. 16.

An Au electrode 18 of 0.16 cm² in size is deposited on the surface of the photoconductive layer at a portion of the photoelectric sensor that is not to be formed with an image (or that is provided with the mask 14). The photoelectric sensor was found to have a capacity of 50 pF, as measured with an impedance meter. As in the case of the liquid crystal recording layer, a capacitor 84 of a suitable capacity was connected in series with the photoelectric sensor to apply voltage across it via a power source 32, thereby measuring the current. The current was measured by measuring the voltage of a resistance 83 of 50 kΩ. Unlike the current through the liquid crystal recording layer, the current through the photoelectric sensor is not proportional to voltage; that is, no linear relation is obtained, even if the logarithm of the current value is plotted versus time. For this reason, the measurement of the conductivity of the photoelectric sensor and the presetting of the voltage to be applied must be done as follows.

Just after the application of voltage, the voltage is distributed to the photoelectric sensor and capacitor according to their capacity ration. Here let $V_{AP}$, C and $V_C$ denote an applied voltage, the capacity of the capacitor 84 and the voltage on it. Then, the voltages are given by $$V_C(0)=V_{AP} \times C_S/(C+C_S) \quad \ldots (2\text{-}1)$$

$$V_S(0)=V_{AP} \times C/(C+C_S) \quad \ldots (2\text{-}2)$$

Thereafter, the voltage of the photoelectric sensor decrease with time, because a current $I_S$ flows through the photoelectric sensor. This state takes the form of the following differential equation (2-3):

$$I_{EX}=C(dV_C/dt)=I_S+C_S(d\,V_S/dt) \quad \ldots (2\text{-}3)$$

Here, $$dV_C/dt=-dV_S/dt \quad \ldots (2\text{-}4)$$

so that $$\begin{aligned}I_S &= (C+C_S)(dV_C/dt) \\ &= (C+C_S)/C \times I_{EX}\end{aligned} \quad (2\text{-}5)$$

where $I_{EX}$ is the measured current.

Thus, the current value and, hence, the conductivity of the photoelectric sensor can be found from the measured current.

Figure 21:
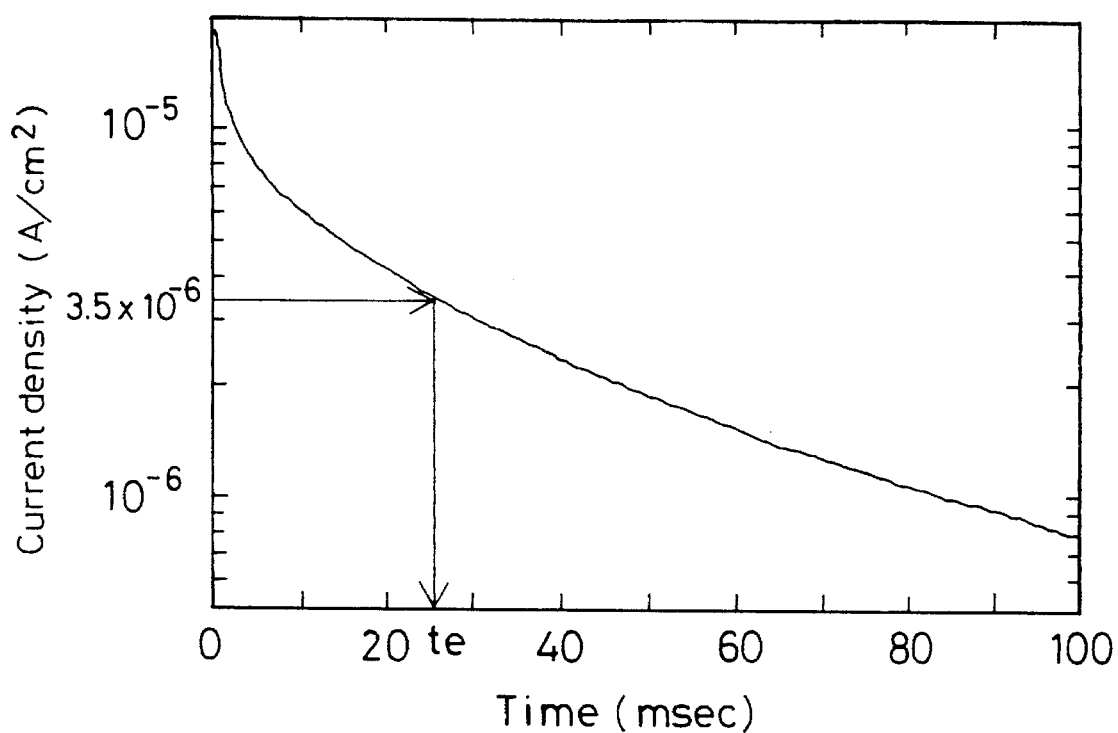
FIG. 21 is a graph showing the change-with-time in the density of the current flowing through the photoelectric sensor.

Shown in FIG. 21 is the current through the photoelectric sensor according to the present embodiment, which was measured at an applied voltage of 300 V with a capacitor of 200 pF capacity.

The voltage distributed to the capacitor just after the application of the voltage is given by Equation (2-1). Thereafter, the voltage of the capacitor changes with time, and this can be calculated from $$V_C = V_C(0) + \int_0^{te} (I_{EX}/C)dt \quad (2\text{-}6)$$

Also the change-with-time of the voltage on the photoelectric sensor can be calculated from the following equation (2-7):

$$V_{AP}=V_C+V_S \ldots (2\text{-}7)$$

Figure 22:
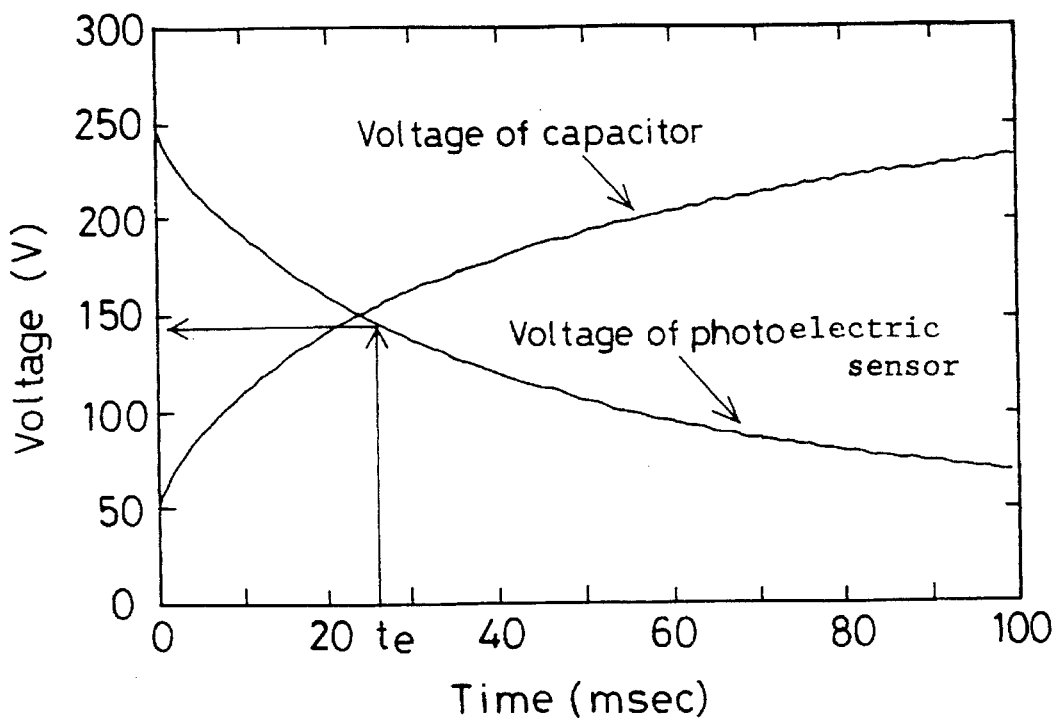
FIG. 22 is a graph showing the change-with-time in the voltage applied on the capacitor and photoelectric sensor.
Figure 23:
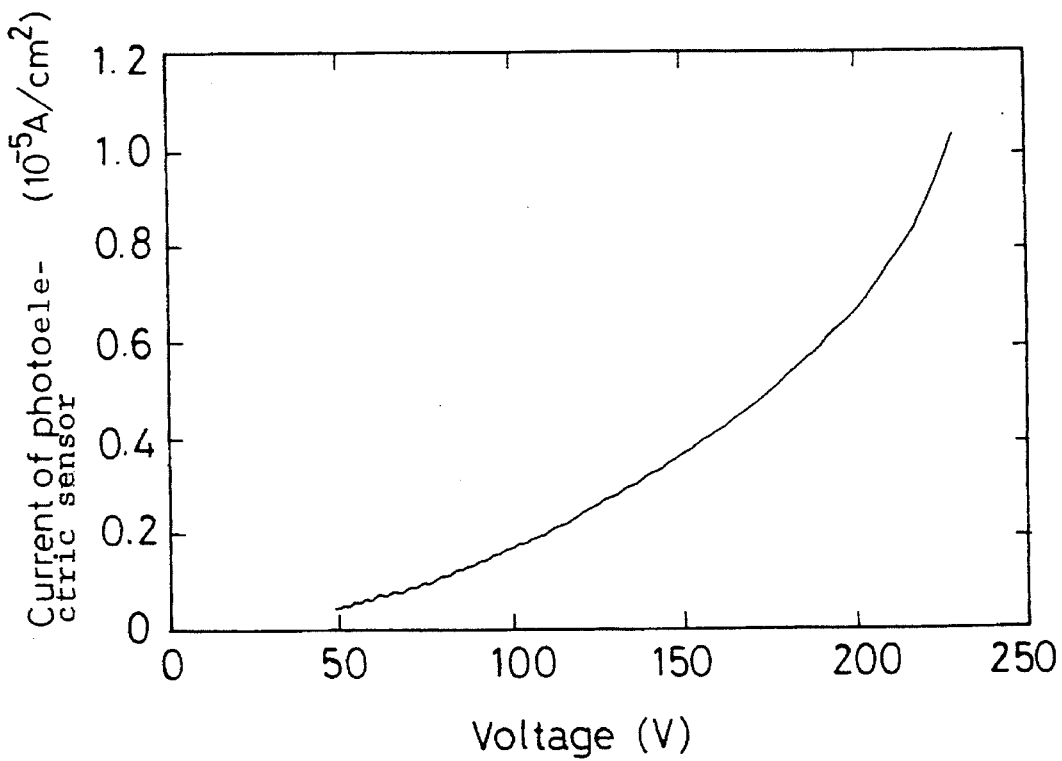
FIG. 23 is a graph showing the relation between the voltage and current of the photoelectric sensor.

From the results of the current measured the change-with-time of the voltages on the capacitor and photoelectric sensor can be found, as shown in FIG. 22, and the relation between the voltage and current of the photoelectric sensor is shown in FIG. 23.

PRESETTING OF APPLIED VOLTAGE

Reference will now be made to how to preset the voltage to be applied on the basis of the results of the resistivity of the liquid crystal recording medium measured and the results of the current of the photoelectric sensor measured.

When the application of voltage is stopped, the voltage of the liquid crystal recording medium is tantamount to the threshold voltage, as already noted. It is then considered that the liquid crystal recording layer undergoes no substantial voltage change, and that the current through the liquid crystal recording layer is given by the sum of current components due to the resistance and capacity variable components in Equation (1-3). The current through the resistance component is given by Equation (1-4), and the liquid crystal recording medium prepared as mentioned above is found to be $1.5 \times 10^{-6}$ A/cm². If the current due to the capacity variable component is $2.0 \times 10^{-6}$ A/cm², the current through the photoelectric sensor must then be $3.5 \times 10^{-6}$ A/cm².

FIG. 21 shows that just when 26 msec elapses after the initiation of the application of voltage, the current of the photoelectric sensor has the above value. The voltage that is then applied on the photoelectric sensor can be calculated by integrating the measured current from time t=0 to t=$t_e$ according to Equations (2-6) and (2-7). In actual image recording, it is thus possible to find the voltages of the photoelectric sensor and liquid crystal recording layer at the time when the application of voltage is stopped. In other words, the applied voltage to be preset can be found by adding the discharge voltage of the air gap to these voltages. That is, $$V_{AP}=V_S+V_{TH}+V_{AIR} \quad \ldots (2\text{-}8)$$

Here $V_{AP}$=the applied voltage $V_S$=145 V $V_{TH}$=the threshold voltage of the $V_{TH}$=180 V liquid crystal recording layer $V_{AIR}$=the discharge voltage of the $V_{AP}$=400 V/725 V air gap From Equation (2-8) and the results measured, it was found that at a threshold voltage of 180 V the optimal applied voltage was 725 V for the photoelectric sensor and liquid crystal recording medium fabricated as mentioned above.

In the following description, the characteristics of the photoelectric sensor used in the invention will be explained.

Figure 24:
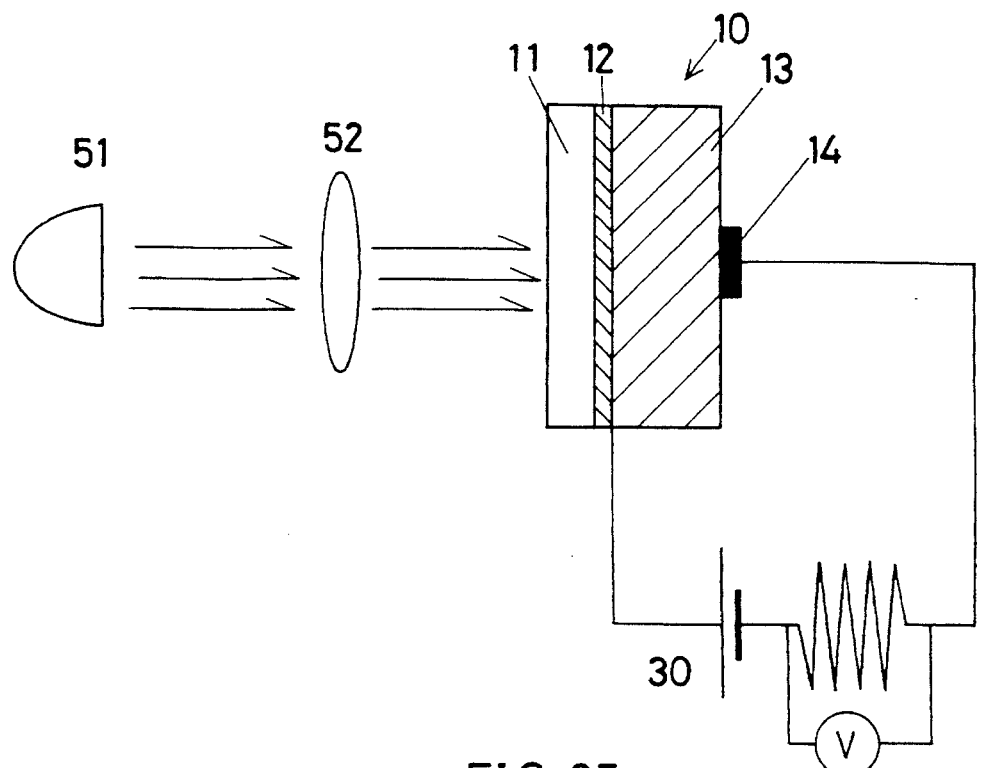
FIG. 24 is a schematic illustrating how to measure the characteristics of the photoelectric sensor.

FIG. 24 illustrates how to measure the characteristics of the photoelectric sensor used in the invention. A gold electrode 14 is deposited on a photoconductive layer 13 of a photoelectric sensor 10 over an area of 0.16 cm². Through a transparent substrate 11, the gold deposited portion of the photoelectric sensor 10 is irradiated with light from a light source 51. A shutter 52 located between the light source 51 and the photoelectric sensor 10 can be used to achieve a given time of irradiation of the photoelectric sensor with light. A suitable resistance (50 kΩ) and a power source 30 are connected in series between a transparent electrode 12 and the gold electrode 14, and a constant voltage is applied therebetween via the power source 30. After about 200 msec elapsed from the initiation of application of voltage, the shutter 52 was opened up for 33 msec. The current value of the photoelectric sensor was then measured by detecting the voltage on the resistance connected in series with the photoelectric sensor.

Figure 25:
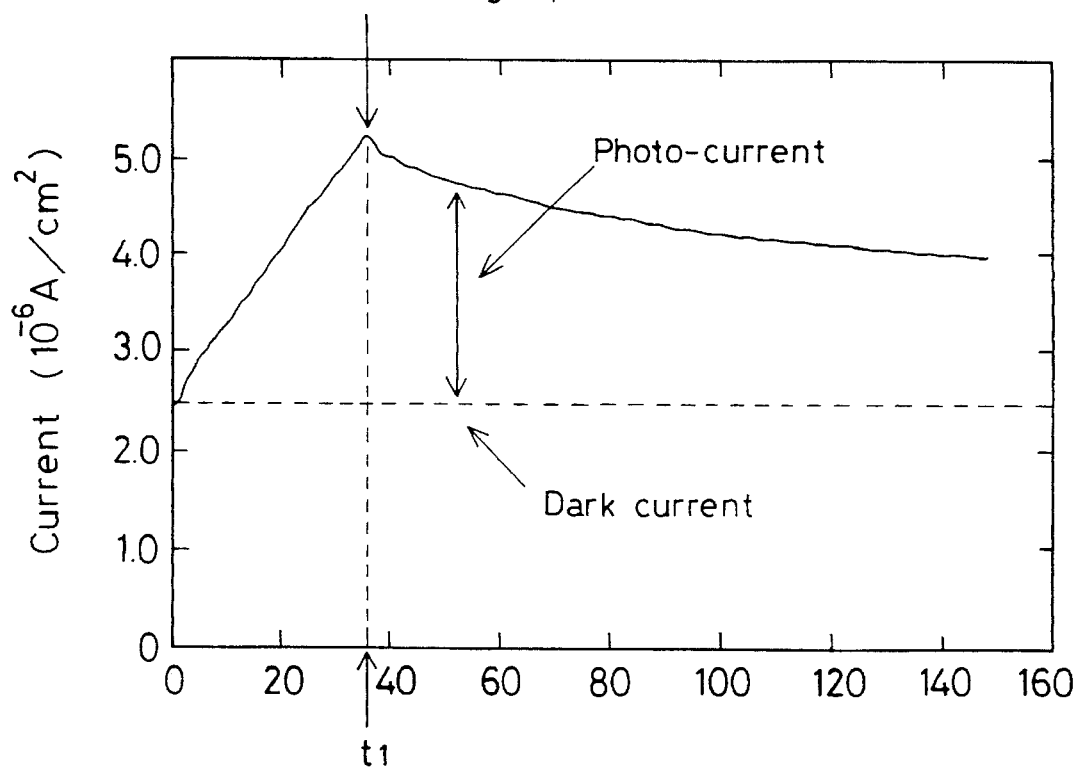
FIG. 25 is a graph showing the measurements of the current of the photoelectric sensor.

One example of the results measured is shown in FIG. 25. Here the current value found in the absence of light is called a dark current and a difference between a current in the presence of light and the dark current a photo-current. The photoelectric sensor used in the invention is of an injection type. According to this type photoelectric sensor, the photo-current increases while irradiated with light, so that the sensitivity can be enhanced due to this amplifying effect. Even after the irradiation of the photoelectric sensor with light is stopped (at time $t_1$), the photo-current attenuates gently. Thus, the duration of the photo-current is enough-long as long as the voltage is applied.

No precise clarification of the mechanism of this photoelectric sensor has been made as yet, because of its very complicated behavior. In the invention, however, it is found that the behavior of this photoelectric sensor can be expressed in terms of a function of voltage and time. This is because, as a result of studies made of the dependence of the characteristics of the photoelectric sensor upon voltage, the behavior of the photoelectric sensor can be approximated as follows.

(1) The dark current is proportional to the square of the voltage of the photoelectric sensor. That is, $$I_d = \alpha V^2 \qquad \ldots (3\text{-}1)$$

where $\alpha$ is a constant and V is the voltage applied on the photoelectric sensor.

(2) The photo-current is broken down into that obtained while the irradiation of the photoelectric sensor with light is held on and that obtained after the irradiation of the photoelectric sensor with light is put off. (2-1)

When the voltage is kept constant, the photo-current (a difference between the portions of the photoelectric sensor that are irradiated, and not irradiated, with light) increases with time while the photoelectric sensor is irradiated with light, as can be seen from FIG. 25. It is difficult to express a photo-current change in terms of a simple formula, but the following linear approximate expression can hold for a region exposed to light of low intensity (of up to 50 LUX) for a short time (of up to 100 msec). That is, $$\Delta I(t) = kt \qquad \ldots (3\text{-}2)$$

where $\Delta I(t)$ is the photo-current and k is a constant. (2-2)

When the voltage is kept constant, the photo-current attenuates at a certain time constant after the irradiation of the photoelectric sensor with light is put off. That is, the following approximate expression can hold.

$$\Delta I(t) = kt_1 \exp\{(t_1-t)/\tau\} \qquad \ldots (3\text{-}3)$$

where $t_1$ is the time at which the irradiation of the photoelectric sensor with light is put off, and $\tau$ is a time constant (200 to 500 msec).

(3) As a result of studies made of the dependence of the photo-current upon voltage, the photo-current is found to be proportional to voltage, when the electric field strength is in a certain range (of 5 to 49 V/μm). From (1) to (3), it is found that the current of the photoelectric sensor that is being irradiated with light is a function of the voltage of the photoelectric sensor and time with respect to a certain light intensity, and is given by $$I_p(V_p, t) = \alpha V_p^2 + \beta V_p t \quad (0 < t \leq t_1) \qquad \ldots (3\text{-}4)$$

$$I_p(V_p, t) = \alpha V_p^2 + \beta V_p t_1 \exp\{(t_1-t)/\tau\} (t_1 < t) \qquad \ldots (3\text{-}5)$$

where $V_p$ is the voltage of the photoelectric sensor, $t_1$ is the time at which the irradiation of the photoelectric sensor with light is put off, and $\beta$ is a constant.

Figure 26:
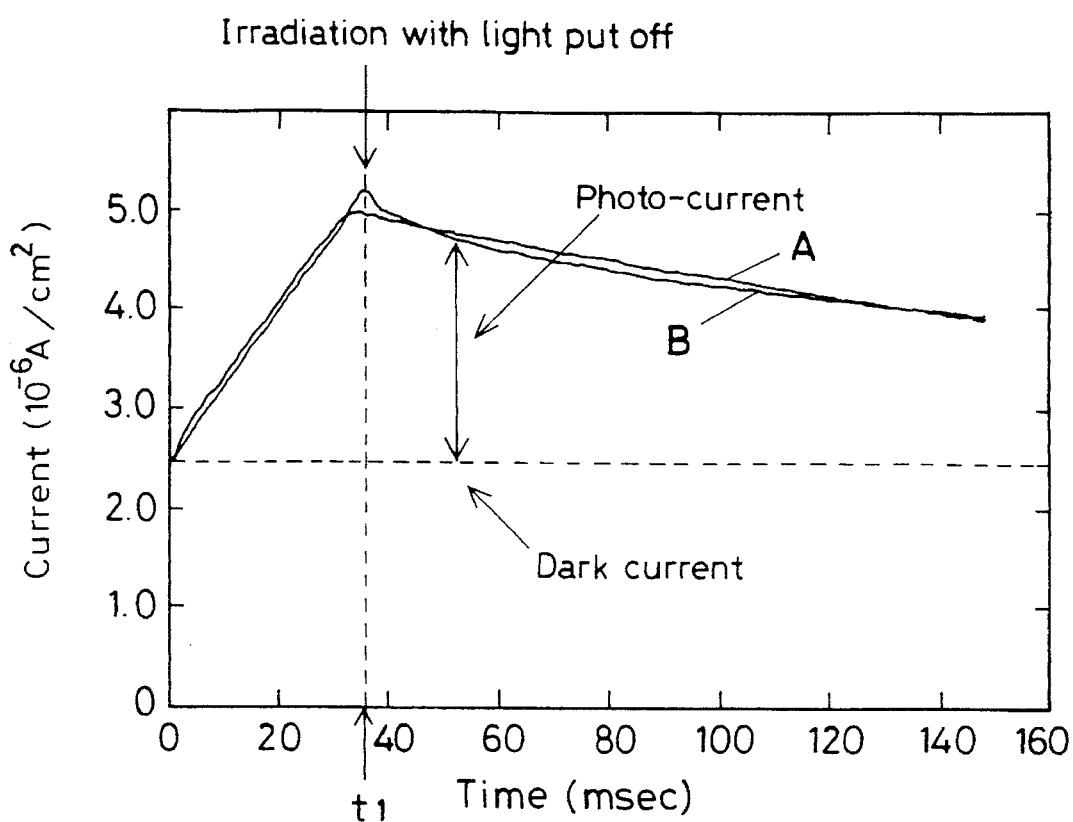
FIG. 26 is a graph showing the calculated and measured values for the current of the photoelectric sensor.

The values obtained by calculation from Equations (3-4) and (3-5) and the found values are shown in FIG. 26, wherein characteristic curves A and B represent the calculated and found values, respectively.

Figure 3:
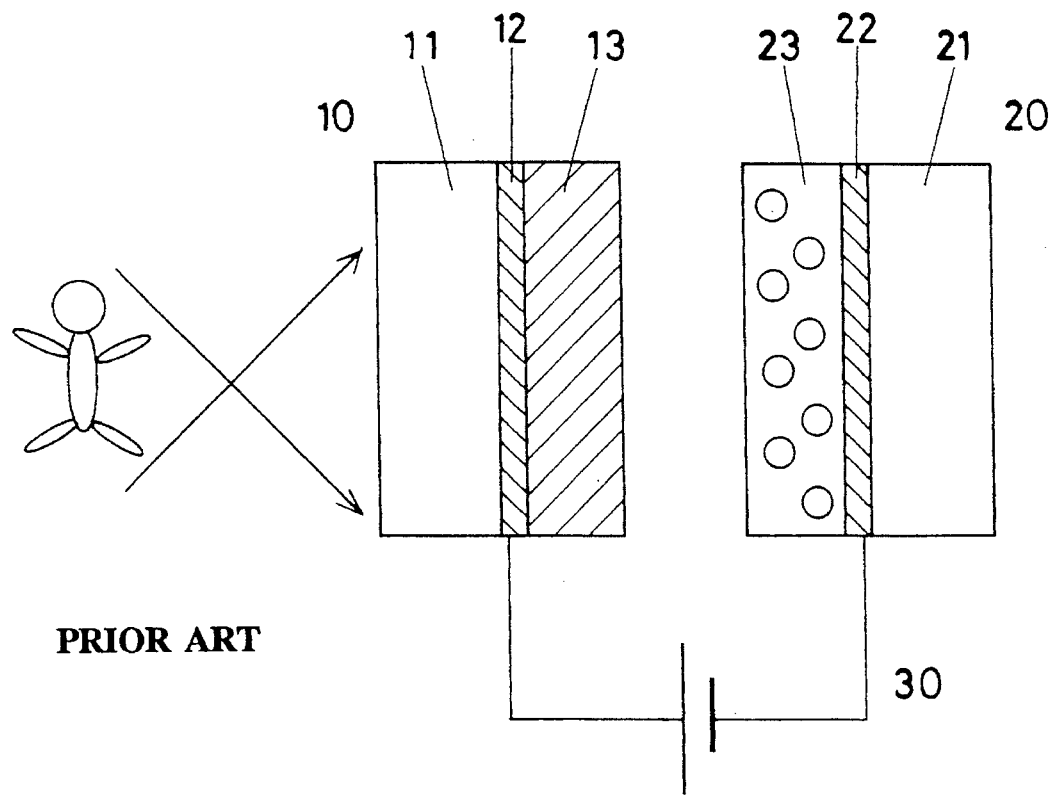
FIG. 3 is a schematic illustrating how to record an image.
Figure 4:
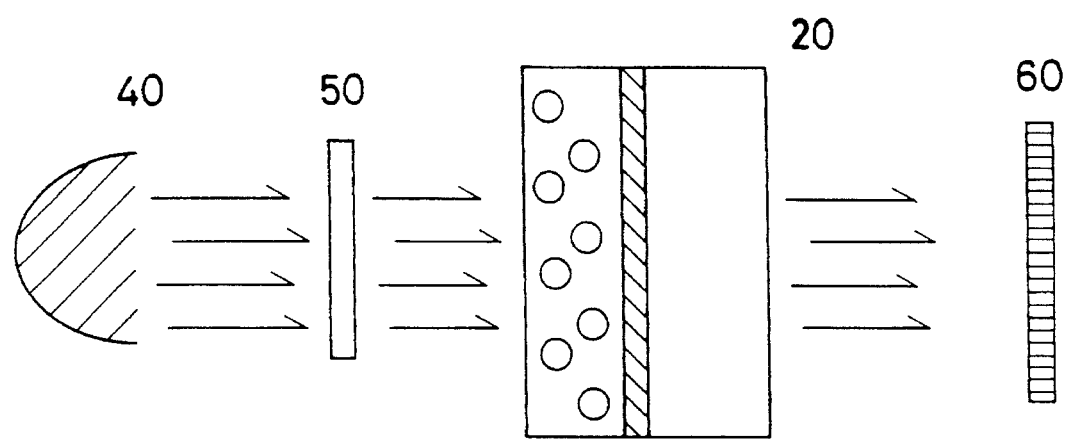
FIG. 4 is a schematic illustrating how to read an image

In the ensuing description, reference will be made to how to calculate the voltage applied on the liquid crystal medium 10 for recording images with the use of a separation type of liquid crystal recording medium such as one shown in FIG. 3.

In an image recorder built up of such a separation type of liquid crystal recording medium, it is considered that the breakdown voltage of air discharge is applied on the air layer portion, and there is an equivalent circuit such as one shown in FIG. 18.

Just after the initiation of the application of voltage, it is considered that the voltage is distributed to the photoelectric sensor and liquid crystal medium according to their capacity ratio. The voltages are then given by $$V_S(0) = \{C_L/(C_S+C_L)\} \times (E-Va) \qquad \ldots (4\text{-}1)$$

$$V_L(0) = \{C_S/(C_S+C_L)\} \times (E-Va) \qquad \ldots (4\text{-}2)$$

Also the following differential equations hold.

$$C_S(dV_S/dt) + I_S = C_L(dV_L/dt) + I_L \qquad \ldots (4\text{-}3)$$

$$V_S + V_L = (E-Va) \qquad \ldots (4\text{-}4)$$

The differentiation of both sides of Equation (4-4) with respect to time becomes 0. From this and Equation (4-3), $$dV_L/dt = (I_S - I_L)/(C_S+C_L) \qquad \ldots (4\text{-}5)$$

so that, $$V_L(t+\Delta t) = V_L(t) + (dV_L/dt) \cdot \Delta t \qquad \ldots (4\text{-}6)$$

From this approximate expression the voltage imposed on the liquid crystal medium was calculated.

Here, if the liquid crystal medium 10 is taken as being a parallel circuit with the capacitor and resistance, the current flowing through the liquid crystal medium can then be found by $$I_L = V_L/R \qquad \ldots (4\text{-}7)$$

The current of the photoelectric sensor varies at the light and dark portions, and are given by the following equations.

The current of the dark portion is given by $$I_S(d) = \alpha V_S(d)^2 \qquad \ldots (4\text{-}8)$$

The current of the light portion is given by $$I_S(p) = \alpha V_S(p)^2 + \beta V_S(p) \cdot t \qquad \ldots (4\text{-}9)$$

on condition that $0 < t \leq t_1$, and by $$I_S(p) = \alpha V_S(p)^2 + \beta V_S(p) \cdot t_1 \exp\{(t_1-t)/\tau\} \qquad \ldots (4\text{-}10)$$

on condition that $t_1 < t$.

Here $\alpha$ is a constant that can be determined by measuring the current value of the dark portion of the photoelectric sensor and found by $$I_S(m) = \alpha V_S(m)^2 \qquad \ldots (4\text{-}11)$$

where $I_S(m)$ is the value measured and $V_S(m)$ is the voltage measured.

Also $\beta$ is found from $\alpha$ by calculating from the following equation:

$$\beta V_S(m) t_1 / \alpha V_S(m)^2 = 1.25 \qquad \ldots (4\text{-}12)$$

Figure 27:
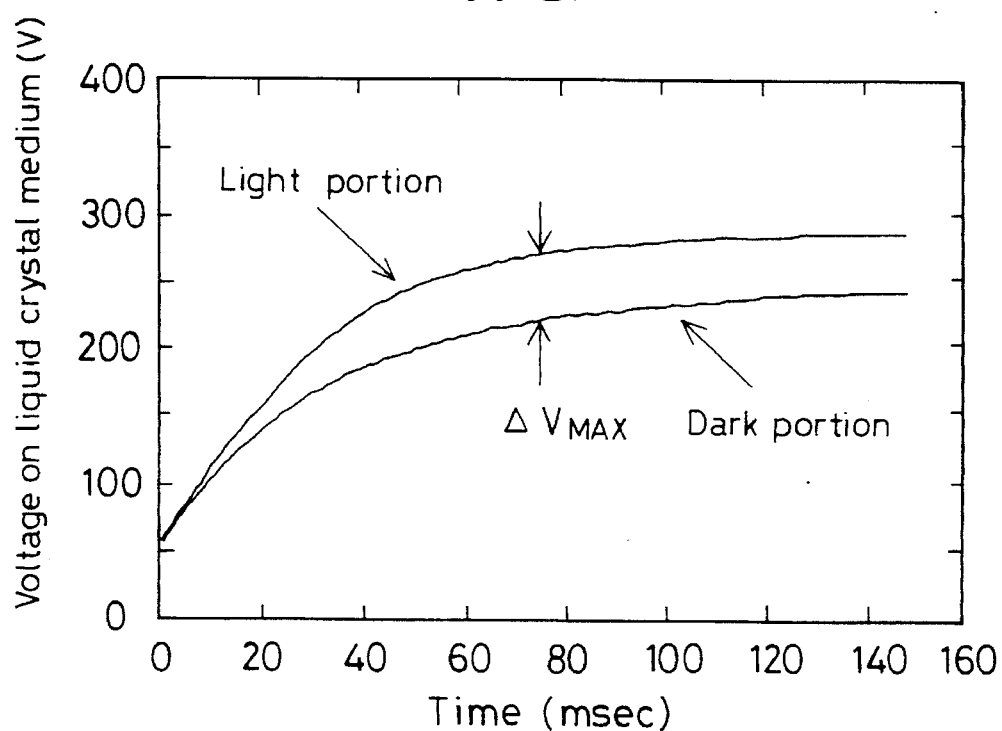
FIG. 27 is a graph showing one example of the calculations of the voltage applied on the liquid crystal medium at the light and dark portions.
Figure 28:
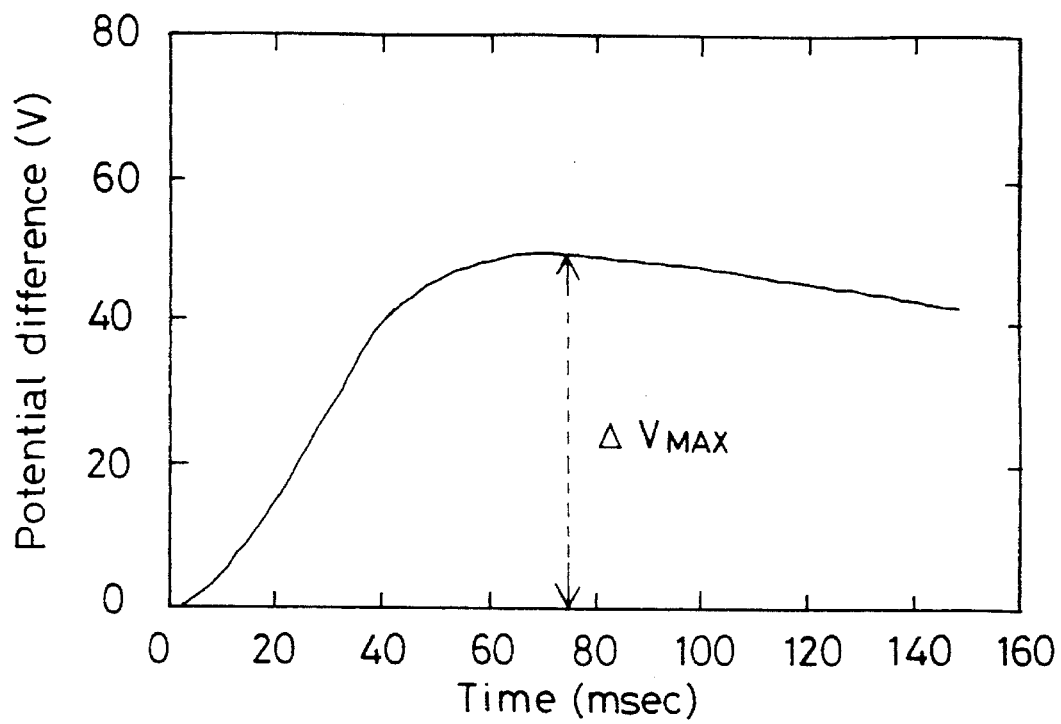
FIG. 28 is a graph showing one example of the calculations of the difference in the voltage applied on the liquid crystal medium between the light and dark portions.

As can be seen from Equation (4-9), the numerator and denominator of Equation (4-12) stand for the photo-current and dark current at time $t_1$, respectively, and this ratio may lie in the range of about 1.10 to about 1.50. In the invention, however, the ratio is preferably 1.25. The voltages on the liquid crystal medium at the light and dark portions can be calculated by substituting Equations (4-7) to (4-10) for Equation (4-6). Some results are shown in FIGS. 27 and 28.

Now consider the condition under which the difference in the voltage applied on the liquid crystal medium between the light portion and the dark portion reaches a maximum. As can be seen from FIG. 27, the rise and saturation of the voltage of the light portion occur earlier than do those of the dark portion. That is, that condition is considered to hold when the rate of the change of the voltage applied on the liquid crystal medium is invariable at the light and dark portions or is larger at the dark portion than at the light portion. From a comparison of the right side of Equation (4-5)—that represents the rate of the change in the voltage applied on the liquid crystal medium—between the light portion and the dark portion, it is understood that the condition under which the voltage difference reaches a maximum is given by the following relation:

$$I_S(d) - I_L(d) \geq I_S(p) - I_L(p) \qquad \ldots (4\text{-}13)$$

The first moment the condition of Relation (4-13) is met is considered to be the time at which the difference in the voltage applied on the liquid crystal medium between the light portion and the dark portion reaches a maximum. Thus, the voltage to be applied is preferably preset such that the voltage of the dark portion is equal to, or slightly larger (e.g., by a few volts) than, the threshold of the liquid crystal medium. It is here to be noted that the optimal time of the application of voltage is the time at which the difference in the voltage applied on the liquid crystal medium between the light portion and the dark portion reaches a maximum.

More specifically, the voltage applied on the liquid crystal medium at a certain preset voltage is first calculated from Equation (4-6). Then, the voltage to be applied is calculated from Relation (4-13). However, when the voltage of the liquid crystal medium at the dark portion is larger than the threshold of the liquid crystal medium, the applied voltage is reset low for re-calculation. When the voltage of the liquid crystal medium at the dark portion is smaller than the threshold of the liquid crystal medium, on the other hand, the applied voltage is reset high for recalculation. Thus, the optimal value for the applied voltage can be found by calculation such that the voltage of the dark portion is equal to, or slightly larger (e.g., by a few volts) than, the threshold of the liquid crystal medium.

Next, reference will be made to how to calculate the voltage to be applied on an integral type of liquid crystal medium such as one shown in FIG. 2.

Figure 29:
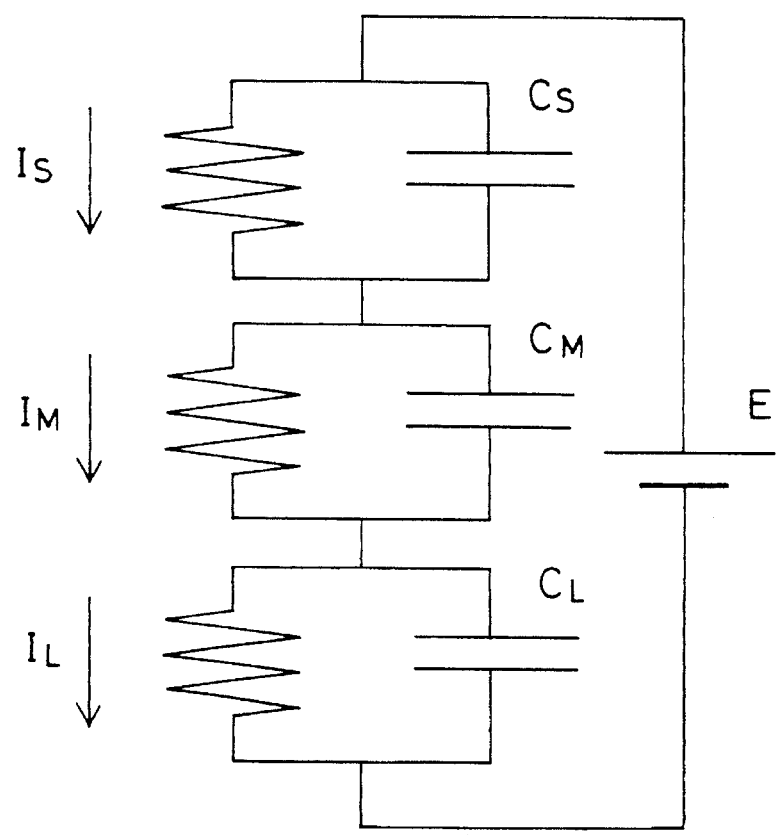
FIG. 29 is a schematic showing an equivalent circuit in the case of using an integral type of liquid crystal recording medium.

An integral type medium made up of three layers, i.e., photoelectric sensor, middle and liquid crystal layers, is represented by such an equivalent circuit as shown in FIG. 29. It is here to be noted that $I_M$ and $C_M$ represent the resistance and capacity of the middle layer.

Just after the initiation of application of voltage, the voltage is distributed to the photoelectric sensor, middle and liquid crystal layers according to their capacity ratio. The voltages are then given by $$V_S(0) = C_M C_L/(C_S C_M + C_M C_L + C_L C_S) \times E \qquad \ldots (5\text{-}1)$$

$$V_M(0) = C_L C_S/(C_S C_M + C_M C_L + C_L C_S) \times E \qquad \ldots (5\text{-}2)$$

$$V_L(0) = C_S C_M/(C_S C_M + C_M C_L + C_L C_S) \times E \qquad \ldots (5\text{-}3)$$

From the equivalent circuit shown in FIG. 28, the following differential equation holds:

$$C_S \cdot dV_S/dt + I_S = C_M \cdot dV_M/dt + I_M \qquad (5\text{-}4)$$
$$= C_L \cdot dV_L/dt + I_L$$

$$V_S + V_M + V_L = E \qquad (5\text{-}5)$$

If Equation (5-4) is solved, then the voltages applied on the middle layer and crystal liquid medium can be calculated from $$V_M(t + \Delta t) = V_M(t) + (dV_M/dt) \cdot \Delta t = V_M(t) + \qquad (5\text{-}6)$$

$$\frac{I_S - (I_M - I_L)(C_S/C_L) - I_M}{C_M + C_S + C_M \cdot C_S/C_L}$$

$$V_L(t + \Delta t) = V_L(t) + (dV_L/dt) \cdot \Delta t = V_L(t) + \qquad (5\text{-}7)$$

$$\frac{I_S - (I_L - I_M)(C_S/C_M) - I_L}{C_L + C_S + C_S \cdot C_L/C_W}$$

$$I_M = V_M/R_M \qquad (5\text{-}8)$$

Equations (4-7) to (4-10) and (5-8) are substituted for Equation (5-7) to calculate the voltages applied on the light and dark portion of the liquid crystal.

As in the case of the separation type of liquid crystal medium, the condition under which the difference in the voltage applied on the liquid crystal medium between the light portion and the dark portion is the time at which the rate of the change in the voltage applied on the liquid crystal medium is always the same at the light and dark portions, or is larger at the dark portion than at the light portion. From a comparison of the right side of Equation (5-7) between the light portion and the dark portion, $$I_{S(d)} - (I_{L(d)} - I_{M(d)})(C_S/C_M) - I_{L(d)} \geq I_{S(p)} - (I_{L(p)} - I_{M(p)})(C_S/C_M) - I_{L(p)} \qquad \ldots (5\text{-}9)$$

The first moment the condition of Relation (5-9) is met is considered to be the time at which the difference in the voltage applied on the liquid crystal medium between the light portion and the dark portion reaches a maximum. Thus, the voltage to be applied is preferably preset such that the voltage of the dark portion is equal to, or slightly larger (e.g., by a few volts) than, the threshold of the liquid crystal medium. It is here to be noted that the optimal time of application of voltage is the time at which the difference in the voltage applied on the liquid crystal medium between the light portion and the dark portion reaches a maximum.

More specifically, the voltage applied on the liquid crystal medium at a certain preset voltage is first calculated from Equations (5-6) and (5-7). Then, the voltage to be applied is calculated from Relation (5-9). However, when the voltage of the liquid crystal medium at the dark portion is larger than the threshold of the liquid crystal medium, the applied voltage is reset low for re-calculation. When the voltage of the liquid crystal medium at the dark portion is smaller than the threshold of the liquid crystal medium, on the other hand, the applied voltage is reset high for re-calculation. Thus, the optimal value for the applied voltage can be found by calculation such that the voltage of the dark portion is equal to, or slightly larger (e.g., by a few volts) than, the threshold of the liquid crystal medium.

Figure 30:
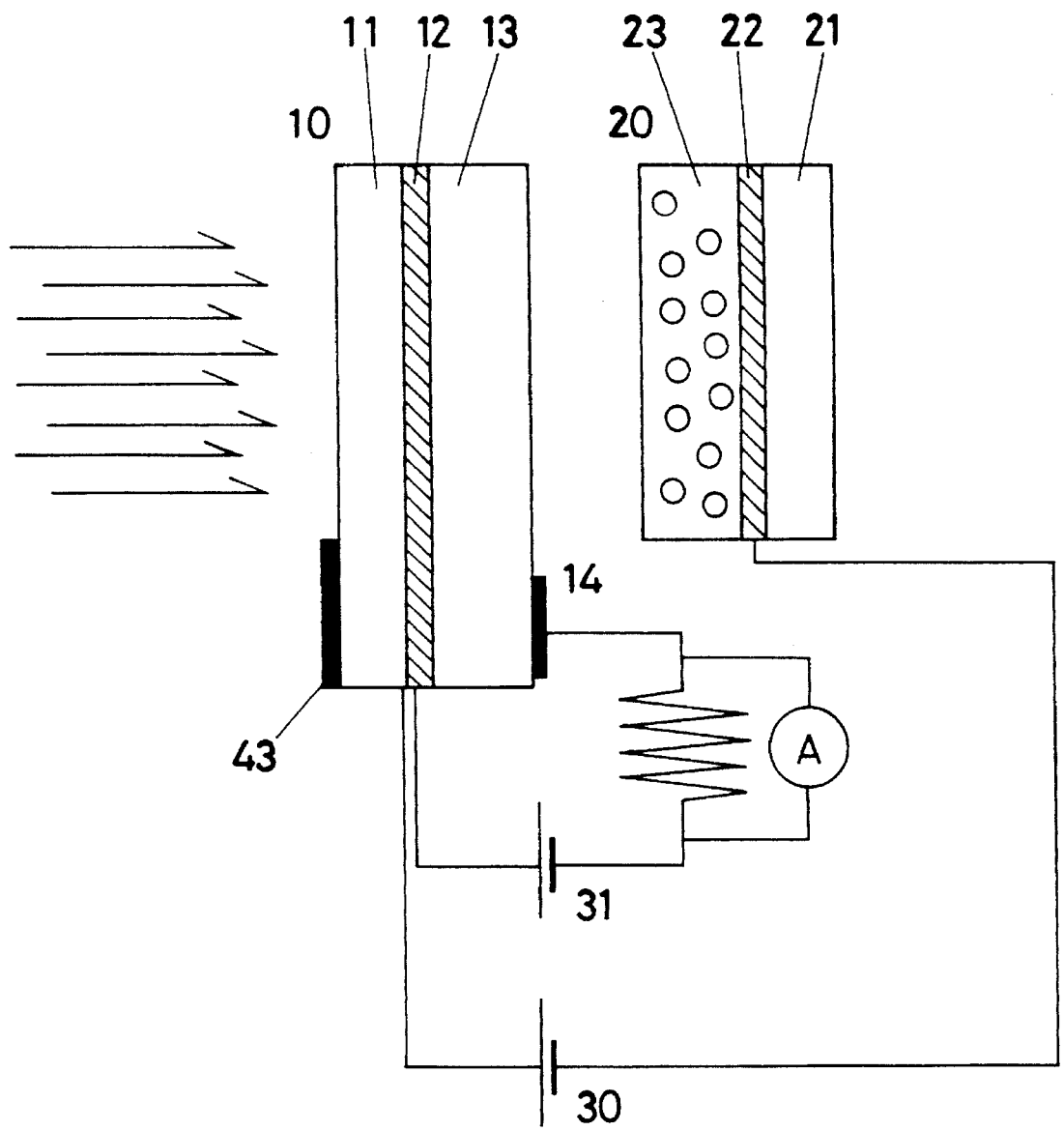
FIG. 30 is a schematic illustrating how to preset the optimal applied voltage and the optimal duration of the applied time.

FIG. 30 is a schematic for illustrating how to preset the optimal voltage to be applied and the optimal duration of the applied voltage.

As in the case of conventional recording methods, a photoelectric sensor 10 is opposed to a polymer dispersion type of liquid crystal medium 20 with a gap between them. However, a part of the carrier transport layer of the photoelectric sensor used in the present embodiment is provided thereon with an electrode 14. The liquid crystal medium 20 is designed to be smaller than, or be displaced with respect to, the photoelectric sensor 10, so that nothing is located in front of the portion of the photoelectric sensor 10 that is provided with the electrode 14. As illustrated, a mask 43 is provided on a portion of the substrate of the photoelectric sensor on the opposite side of the electrode 14, whereby that portion is not exposed to light. A power source 31 is used to apply a rectangular voltage between an electrode 12 of the photoelectric sensor and the electrode 14 on a photoconductive layer, so that a current flowing through the photoelectric sensor can be determined by measuring the voltage of a resistance connected in series with it. Since the area of the electrode formed on the photoconductive layer is already known, α can be found from the current value measured by Equation (3-1).

Then, β is found by Equation (4-12), so that the optimal values for the voltage to be applied and the duration of the applied voltage can be determined according to the method expressed by Equations (4-1) to (4-13). In connection with Equation (4-12), the ratio of the dark current to the photocurrent has been prima facie described as being 1.25, but it is understood that this is not particularly limited to 1.25, because there is no appreciable variation in calculations in the range of 1.10 to 1.50.

The duration of the applied voltage may be determined either by the value found by such calculation or by monitoring the transmittance of the liquid crystal medium at the dark portion as usual. Here it is noted that the actually applied voltage must be found by adding the discharge breakdown voltage to the calculated value, because no gap voltage is included in the voltage found by calculation. The discharge breakdown voltage shall follow Paschen's law.

As in the case of an integral type of liquid crystal medium, an electrode is provided on a part of the carrier transport layer of the photoconductive layer, but neither middle layer nor liquid crystal layer is formed on the electrode. The current is measured as in the case of a separation type medium, and the optimal value of the voltage to be applied can then be calculated from Equations (5-1) to (5-7). In this case, no care may be taken of the discharge breakdown voltage due the absence of any gap.

Reference will now be made to an embodiment wherein the transmittance of the dark or light portion is measured to detect the moment the contrast reaches a maximum, thereby putting the applied voltage off.

The contrast (quality) of an image changes with time, and is enhanced at an applied voltage duration of 55 to 75 msec, so that good-enough image quality can be obtained. For instance, when the voltage is put off at an applied voltage duration of about 30 msec, no good-enough image quality can be obtained, because no appreciable change in the liquid crystals at the light portion results in a low contrast. When the voltage is put off at an applied voltage duration of about 120 msec, no good-enough image can again be obtained due to an increase in the transmittance of the dark portion.

Thus, the contrast of an image varies largely depending on the applied voltage duration; it is required to control the applied voltage duration precisely. However, it is difficult to make an accurate prediction of the optimal value of the applied voltage duration before an image is picked up, because it varies depending on the characteristics of the photoconductive and liquid crystal recording layers and the environment in which an image is picked up. It is thus required to incorporate a function of controlling the applied voltage duration in an image recorder.

Figure 31:
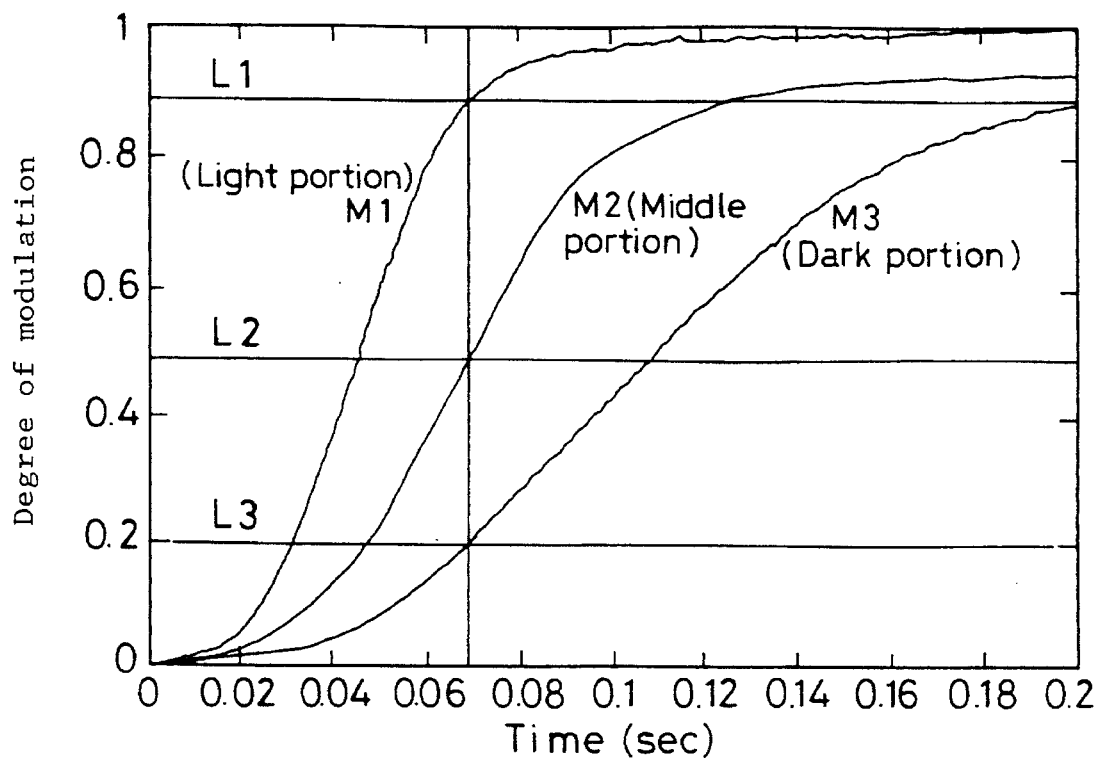
FIG. 31 is a graph showing the modulation-change-with-time of the liquid crystal recording medium.
Figure 32:
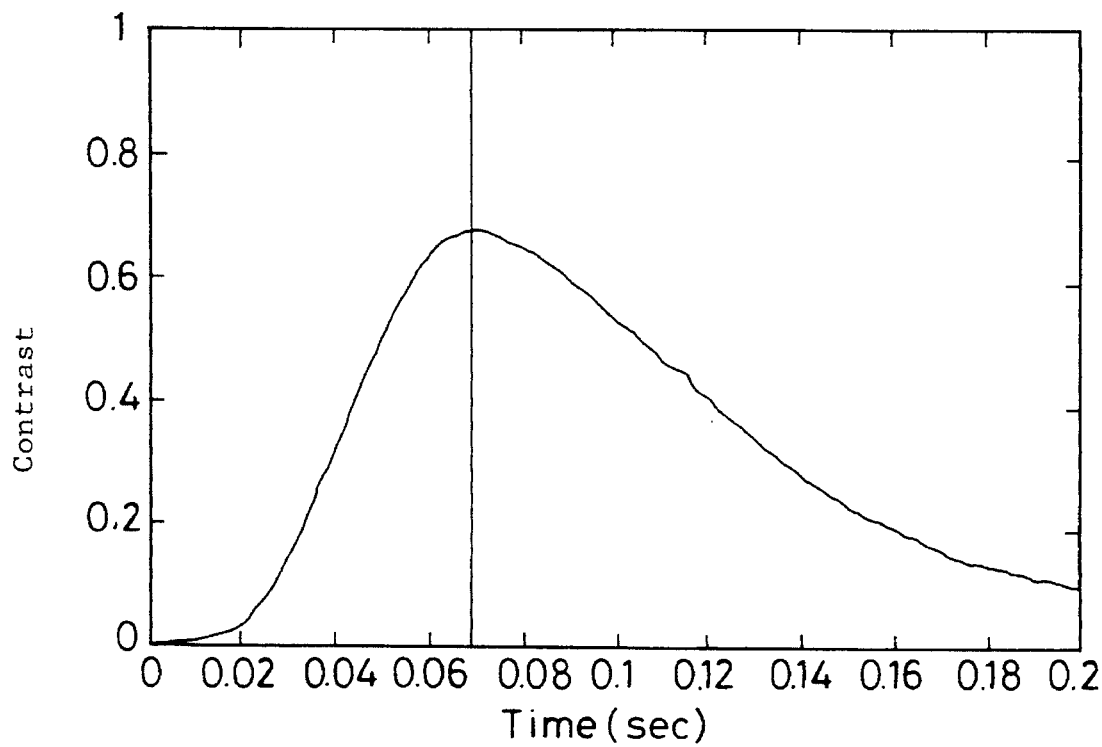
FIG. 32 is a graph showing the contrast change with time.

A change-with-time of the modulation of a liquid crystal recording medium is illustrated in FIG. 31 with M1, M2 and M3 denoting the degrees of modulation of the light portion, the middle portion (that is an area irradiated with light corresponding to the average quantity of the light used for exposure) and the dark portion, respectively. The contrast is given in terms of a difference between characteristic curves M1 and M3, and the contrast characteristics are shown in FIG. 32. Now let $T_{ON}$, $T_{OFF}$ and T denote the maximal transmittance (of the liquid crystals in a completely oriented state), the transmittance of the liquid crystals when they are not oriented at all and the transmittance of the liquid crystals in a certain oriented state, respectively. Then, the degree of modulation M is defined by $$M = (T - T_{OFF})/(T_{ON} - T_{OFF})$$

From FIG. 32 it is noted that the contrast peaks in the vicinity of 0.07 sec.

As can be seen from FIG. 31, the contrast (quality) of an image correlates with the degree of modulation of the light, middle or dark portion. For instance, the degree of modulation is of the order of 90% at the light portion (Level L1), about 50% at the middle portion (Level L2), and about 20% at the dark portion (Level L3). First, the transmittance of the liquid crystal medium at the light, middle, dark, or other region exposed to a suitable quantity of light is monitored to determine the transmittance at which the contrast reaches a maximum as by the method explained with reference to FIG. 5. Then, the application of voltage is stopped when the transmittances of the light, middle and dark portions of the liquid crystal medium reach a level at which the contrast peaks. In the example illustrated, the application of voltage is stopped, when the transmittances of the light, middle and dark portions reach Levels L1, L2 and L3. By this it is possible to obtain the optimal applied voltage duration at which the contrast peaks and so an image of good quality is achievable. Hence, it is also possible to achieve density gradation control by varying the applied voltage duration on the basis of the transmittance of the dark portion, for instance.

Of course, it is also possible to stop the application of voltage by monitoring the transmittances of the light and dark portions, finding the transmittance difference to detect the contrast, and detecting the moment the contrast peaks. The moment the contrast peaks may be detected at the timing at which the contrast change is minimized.

In connection with the measurement of the transmittance of the liquid crystal recording medium explained with reference to FIG. 5, it is noted that the reflectivity of the photoelectric sensor is low. To obtain sufficient signals, it is thus required to increase the intensity of the LED. In this case, however, the photoelectric sensor is irradiated with some considerable light. To reduce the light—with which the photoelectric sensor is irradiated—as much as possible, it is preferable that an LED having a wavelength lying in the infrared region—to which the photoelectric sensor has a relatively low sensitivity—is used at a light emitting cycle of 0.9 msec with respect to a 0.1 msec exposure to light.

Figure 5:
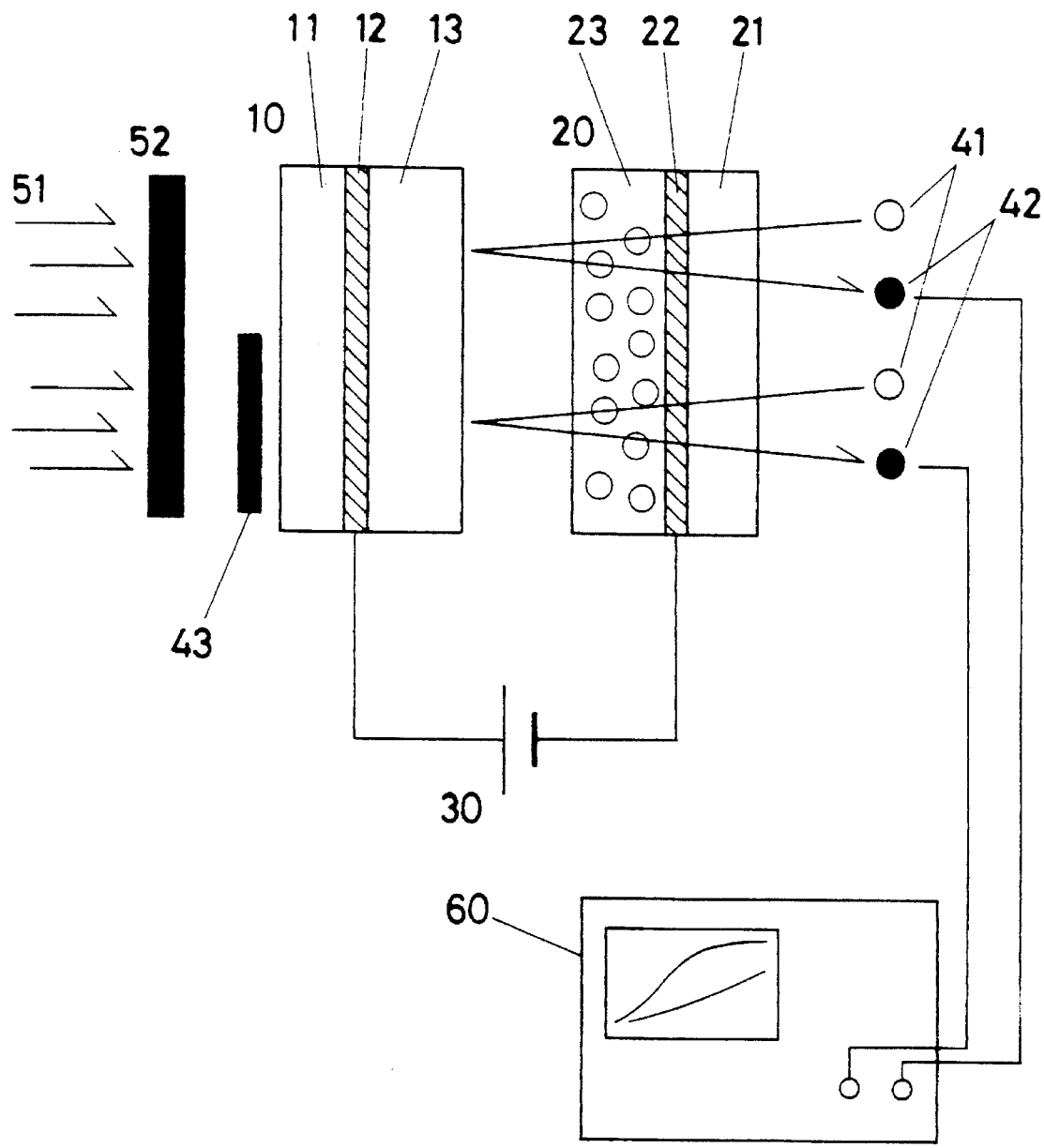
FIG. 5 is a schematic illustrating a conventional method for measuring the transmittance of liquid crystals.

In connection with the method shown in FIG. 5, it is noted that the transmittance of the liquid crystal medium does not substantially change with respect to the light in the infrared region; it is difficult to detect the light by the photoelectric sensor. The method for irradiating the photoelectric sensor with periodically pulsed light is also not preferable, because the light is poor in stability and makes the circuit complicated as well. Therefore, the transmittance of the liquid crystal medium may be measured by the methods explained with reference to FIGS. 8 to 10.

Reference will now be made to another embodiment in which the transmittance of the liquid crystal recording medium is monitored to record an image.

In the instant embodiment, the transmittance of a portion of the liquid crystal medium corresponding to an unexposed portion of the photoelectric sensor is monitored. When the transmittance of the liquid crystal recording medium changes to a given level, the applied voltage is put off, thereby controlling the tone of the image to be recorded.

Figure 33:
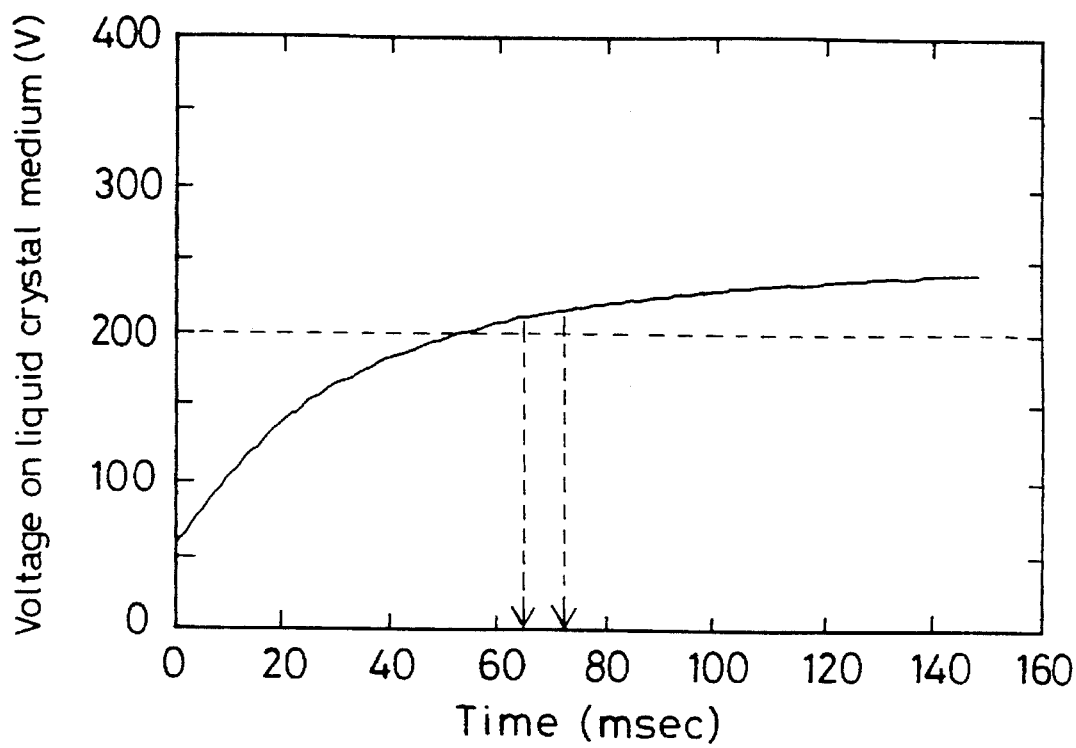
FIG. 33 is a graph showing the change-with-time of the voltage applied on the liquid crystal recording medium and the capacity change of the liquid crystal recording layer as well.

FIG. 33 shows the calculations of the change-with-time of the voltage applied on the liquid crystal recording medium, when the photoelectric sensor is unexposed with light according to the present method of recording information. However, it is understood that the photoelectric sensor and liquid crystal recording medium are calculated as being a parallel circuit with a resistance and a capacitor. From FIG. 33, it is found that the initial voltage corresponding to the capacity ratio of the liquid crystal recording medium and the photoelectric sensor is imposed on the liquid crystal recording medium, but the voltage then increases with time.

Figure 34:
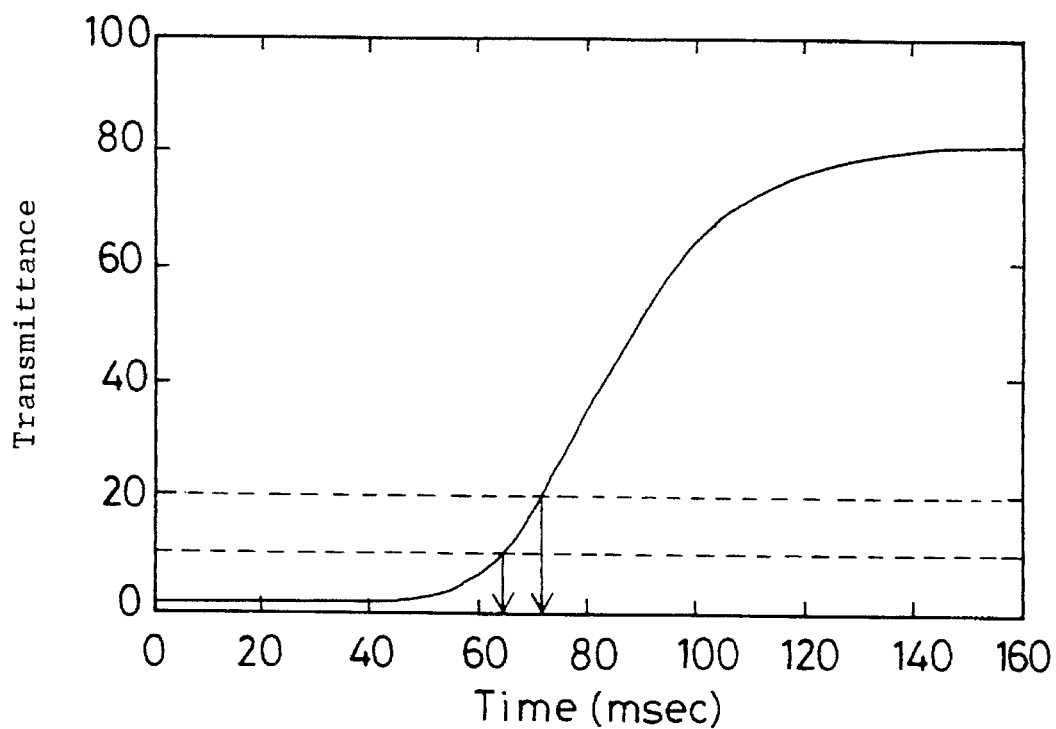
FIG. 34 is a graph showing the transmittance change of the liquid crystal recording medium versus the change-with-time of the voltage applied on the liquid crystal recording medium.

FIG. 34 shows a change in the transmittance of a liquid crystal recording medium with respect to a change-with-time in the voltage of the liquid crystal recording medium. With the voltage imposed on the liquid crystal recording medium exceeding the threshold of the liquid crystal recording medium, the liquid crystals are so oriented that the transmittance of the liquid crystal recording medium can increase. Shown in FIG. 34 is the transmittance change of the liquid crystal recording medium with respect to light of 365 nm wavelength, although it varies depending on wavelength. It is understood that the transmittance of the liquid crystal recording medium is expressed in terms of a relative value with respect to a 100% transmittance that is obtained when the liquid crystals are completely oriented.

Figure 35A:
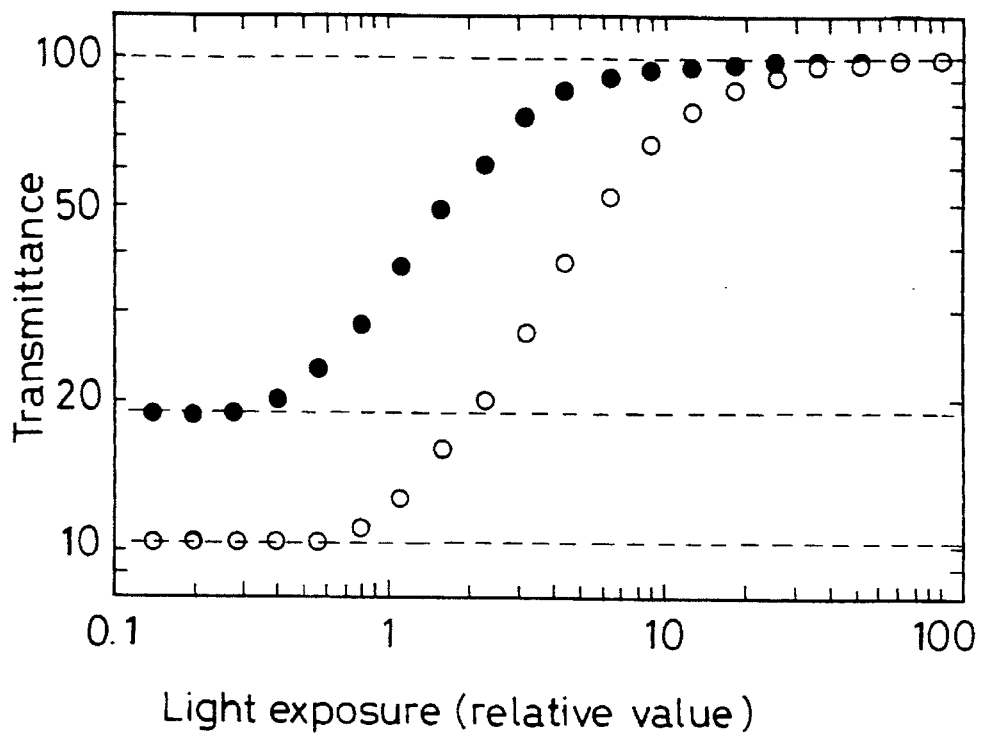
FIGS. 35(a)–35(b) are graphs showing the relation between the light exposure and the transmittance of the liquid crystal recording medium when a gray scale is subjected to projection exposure.
Figure 35B:
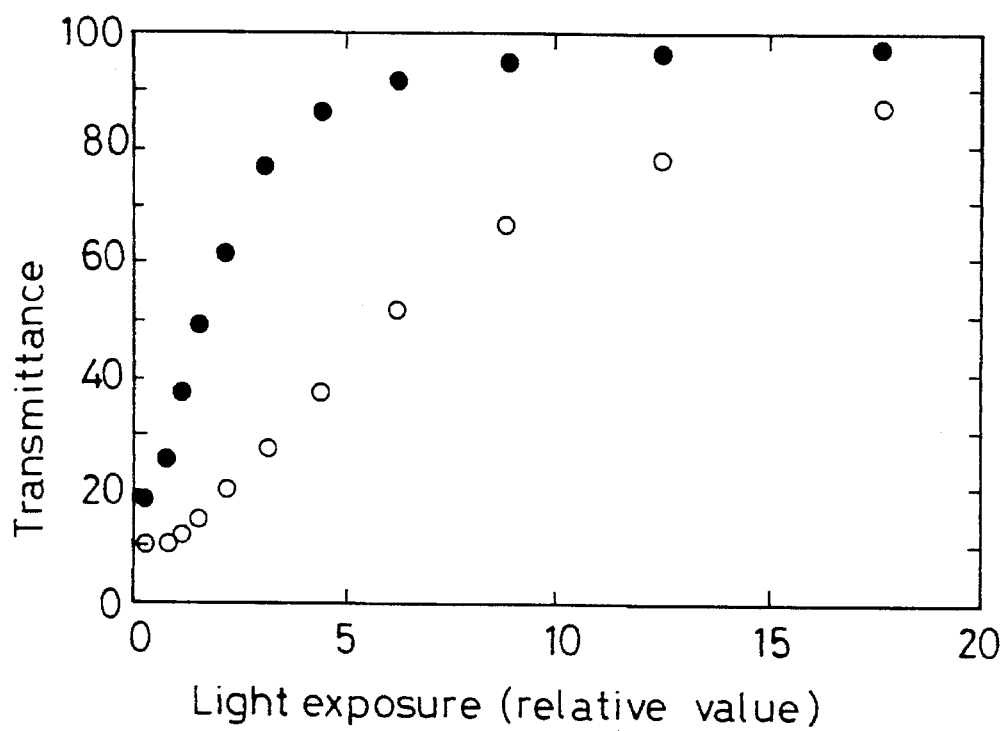

Shown in FIG. 35 is the relation between the light exposure and the transmittance of a liquid crystal recording medium with respect to light of 365 nm, when a gray scale is subjected to projection exposure to light, with FIG. 35($a$) represented in terms of logarithm and FIG. 35($b$) on an isometric scale. The light exposure is a relative value, and the transmittance of the liquid crystal recording medium is again expressed in terms of a relative value with respect to a 100% transmittance that is obtained when the liquid crystals are completely oriented. With the same photoelectric sensor and liquid crystal recording medium as mentioned above, recording was made under the following two conditions for the application of voltage:

Black Dots: 780 V 80 msec
White Dots: 740 V 80 msec

Thus, a change in the voltage-applying condition results in a change in the voltage imposed on the liquid crystal recording medium even at the unexposed portion and so a change in how an image is recorded at the unexposed portion. As illustrated, there is a difference in how to record an image between when the transmittance (a portion shown by broken lines) of the unexposed portion is about 10% (white dots) and when the transmittance of the unexposed portion is about 20% (black dots). The reproducibility of the area exposed to a low quantity of light is better when the transmittance of the unexposed portion is 20% than when the transmittance of the unexposed portion is 10%. When the transmittance of the unexposed portion is 10%, the area, which can be expressed when the transmittance of the unexposed portion is 20%, is flat. At the area exposed to a high quantity of light, no information can be expressed even by liquid crystals that are not saturated when the transmittance of the unexposed portion is 10%. The reason is that when the transmittance of the unexposed portion is 20%, nearly 100% of the information is transmitted.

Thus, there is a variation in the exposed area expressed by the image recorded depending on the transmittance change of the unexposed portion. This relation results from the characteristics of the liquid crystal recording medium, and holds even when the photoelectric sensor used in combination with the liquid crystal recording medium varies.

Figure 36:
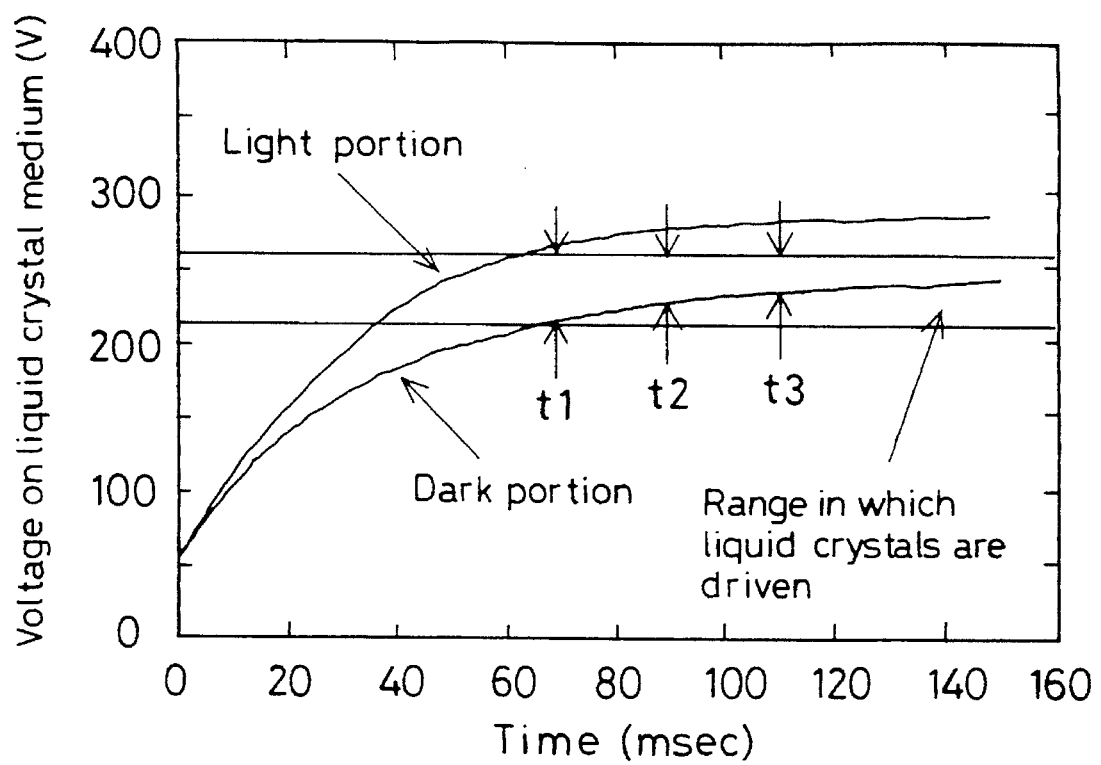
FIG. 36 is a graph showing the relation between the change in the voltage applied on the liquid crystal medium and the drive range of the liquid crystals.

By making use of such properties, it is possible to enhance the area exposed to a low quantity of light, as shown in FIG. 36 by way of example. This is achieved by putting off the voltage after the transmittance of the unexposed portion increases to some extent (time t3). Likewise, the area exposed to a high quantity of light can be enhanced by putting off the voltage when the transmittance of the unexposed portion changes only a little (time t1). Thus, an image of the required tone can be recorded.

It is thus possible to control the properties of the image recorded by monitoring the transmittance of the unexposed portion. In addition, it is possible to record various images enhanced at the area exposed to a low or high quantity of light.

For a conventional recording medium, it is required to keep the quantity of light exposed thereon constant by controlling the incident light by means of a diaphragm incorporated in the input system or changing the exposure time depending on a change in the area of the image (to be recorded) exposed to light. As can be seen from FIG. 35, however, it is possible to record an image varying in the area exposed to light by varying the transmittance of the unexposed portion. This is because when the image is recorded under such conditions that the transmittance of the unexposed portion is high, the area exposed to light shifts to the area exposed to a low quantity of light.

The recorded image, because of being sufficiently reduced in terms of noise, can be converted by a reader to electrical signals having the desired properties.

Reference will now be made to how to measure the transmittance of the unexposed portion with reference to FIG. 37.

Figure 37A:
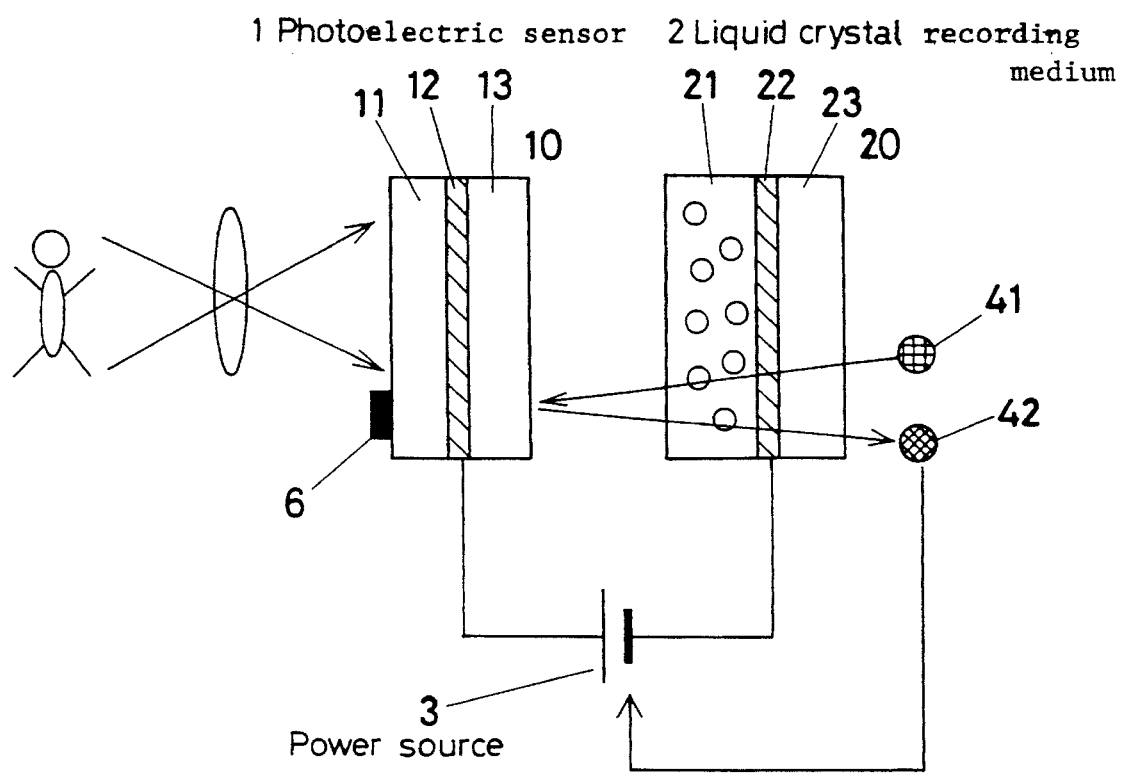
FIGS. 37(a)–37(b) are schematics showing how to measure the transmittance of the unexposed portion.
Figure 37B:
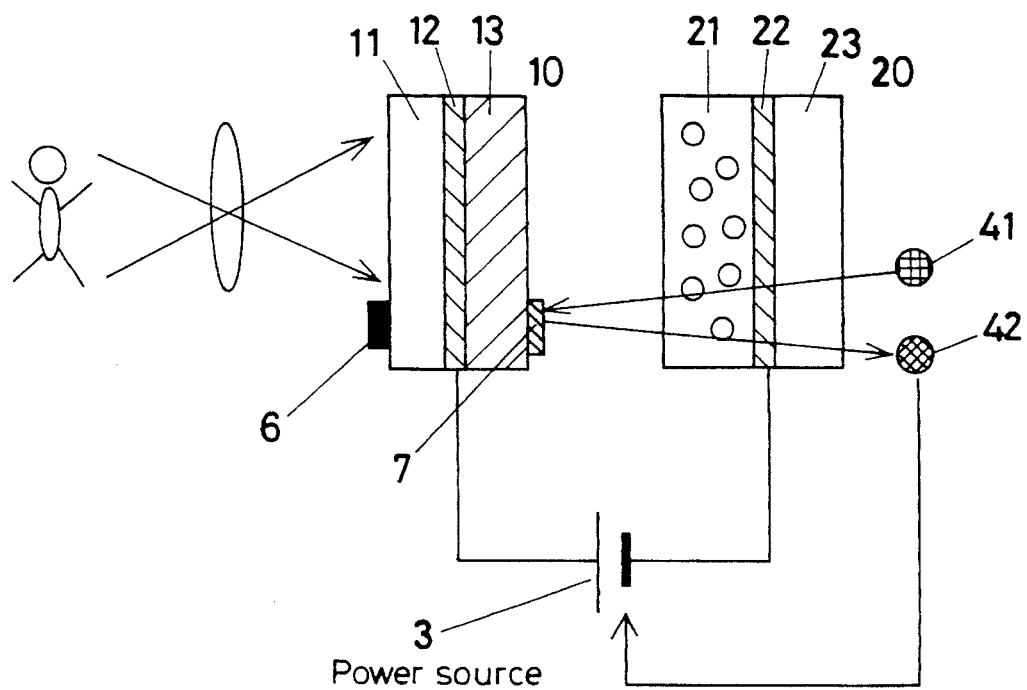

As shown in FIG. 37($a$), a photoelectric sensor 10 located at the position where the transmittance of a liquid crystal recording medium 20 is to be measured is provided on the surface with a mask 6 which prevents any irradiation of the photoelectric sensor with light. In this arrangement, light from an LED 41 passes through the liquid crystal medium 20, is reflected by the surface of a photoconductive layer 13 of the photoelectric sensor 10, and strikes on a photodiode 42. As shown in FIG. 37($b$), a very thin reflecting layer 7 such as a dielectric mirror layer may be formed on the surface of the photoconductive layer. It is understood that when no reflecting layer is provided, some care must be taken to prevent any sensitization of the photoelectric sensor by the light from the LED. Then, a power source circuit is regulated such that when the signal of the photodiode has a given value, i.e., the transmittance of the unexposed portion reaches a given level, the applied voltage is put off.

Read light for the liquid crystal recording medium is different in wavelength from the light generated from the LED. In addition, a reader reads the transmitted light and the light from the LED reads the reflected light. As a result, the degree of scattering of the transmitted and reflected light in the liquid crystal recording medium differs, resulting in a change in the behavior of the transmittance change. Thus, both the transmitted light and the reflected light must be correlated with each other for correction.

Figure 38A:
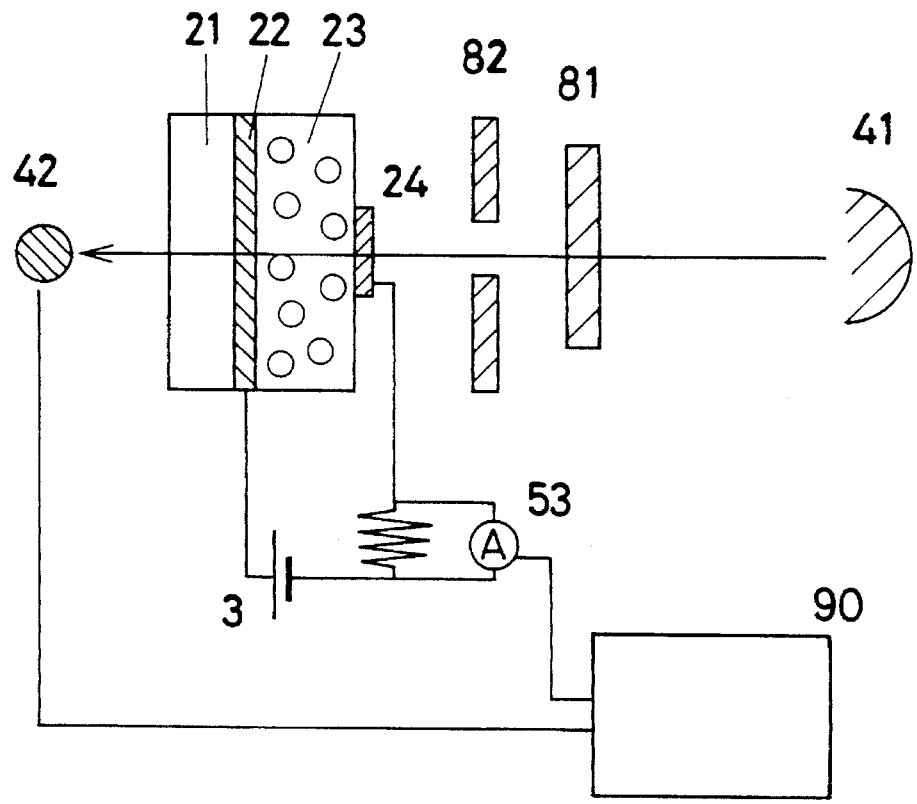
FIGS. 38(a)–38(b) are schematics illustrating how to measure the transmitted light.

FIG. 38($a$) shows how to measure the transmitted light. A liquid crystal recording medium is provided on a glass substrate including an ITC transparent electrode, and an ITO electrode 24 is formed on the surface of the liquid crystal layer by means of sputtering. Light from a light source 41 is filtered through a filter 81 to obtain only a light component of 365 nm, with which the portion of the liquid crystal layer provided with the ITO electrode is irradiated through an aperture 82. Then, the transmitted light is monitored by a photodiode 42. A power source 3 is used to apply between both electrodes of the liquid crystal recording medium a voltage that increases on a constant slope. Then, the signal and current value of the photodiode are monitored on an oscilloscope 90. It is not always necessary to limit the transmitted light to 365 nm, but it is required to regulate the wavelength and the optical system as well in association with how to read.

Figure 38B:
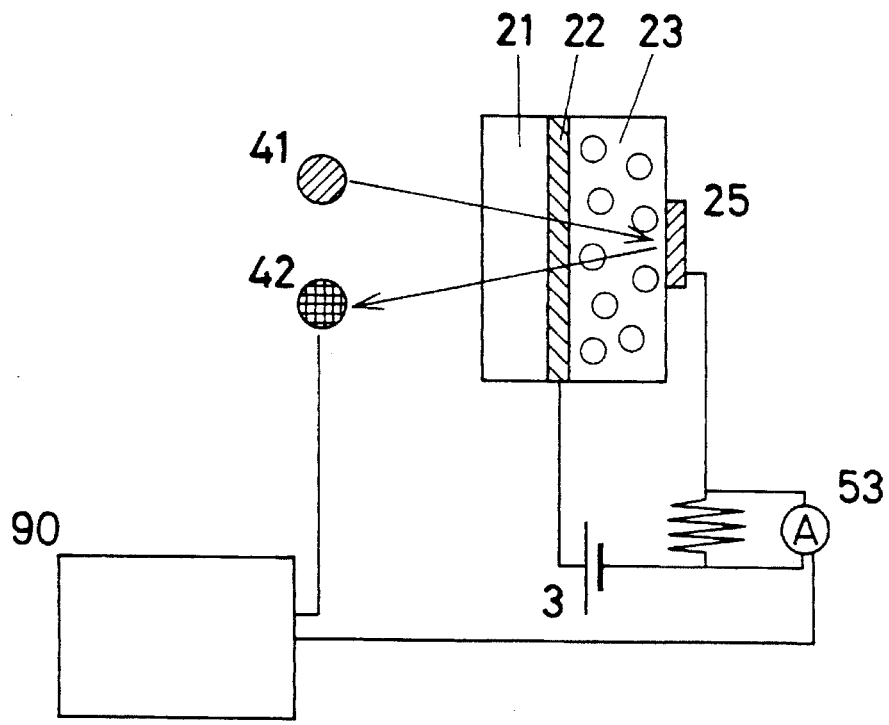

FIG. 38(b) shows how to measure monitor signals. A liquid crystal recording medium is provided thereon with an Al electrode 25. In this arrangement, light from an LED 41 is reflected by the Al electrode, and strikes on a photodiode 42. Likewise, a power source 3 is used to apply on the recording medium a slope form of voltage to monitor the signals and current value of the photodiode on an oscilloscope 90. By comparing these measurements, it is possible to examine the correlation of a change in the transmittance of the read system with a transmittance change in image recording.

Reference will now be made to an embodiment wherein the current flowing through the dark portion is measured to detect the moment the contrast peaks, thereby putting the voltage off.

A liquid crystal recording medium has an intrinsic threshold voltage. Upon exceeding the threshold voltage, the liquid crystals in the liquid crystal recording layer line up in the direction of an applied electric field, causing the liquid crystal recording layer to turn from opaque to transparent. The rate of modulation of the liquid crystal recording layer in the vicinity of the threshold voltage is already known or, if not so, can be measured just before recording information. Thus, if the time at which the voltage imposed on the liquid crystal recording layer becomes the threshold voltage, it is then possible to determine the time at which a transmittance of 10 to 20% is obtained by adding the time required for modulation to that time.

A liquid crystal recording layer is considered to be a parallel circuit with a resistance and a capacitor. Thus, the current flowing through it can be measured at the time of recording information to monitor the voltage applied on the liquid crystal recording layer, as will be described later, thereby finding the time at which the voltage on the liquid crystal recording layer becomes the threshold voltage.

First, how to measure the current will now be explained.

Figure 39:
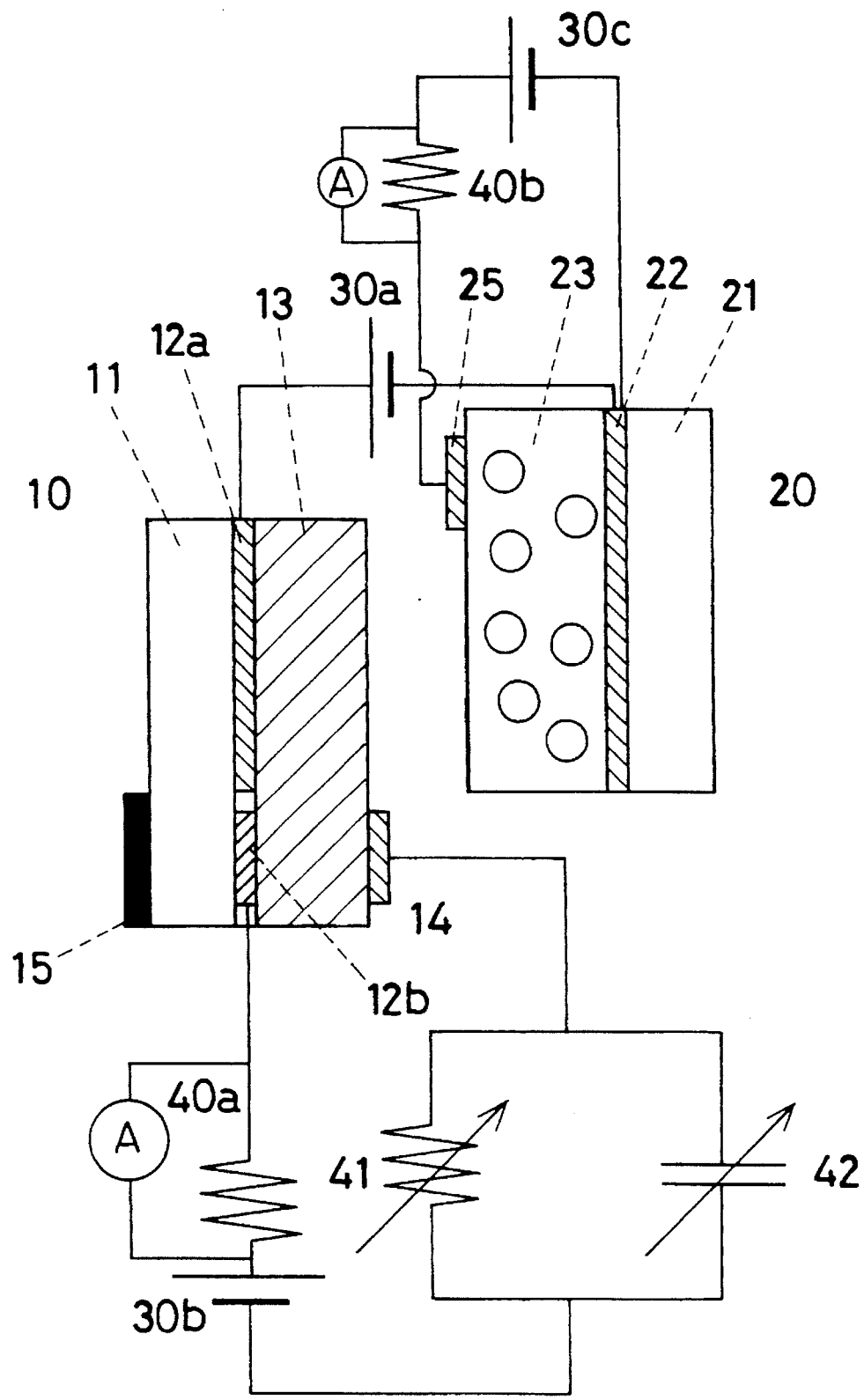
FIG. 39 is a schematic illustrating how to measure the current of a separation type of liquid crystal medium.

How to measure the current in a separation type of information recording medium is illustrated in FIG. 39, wherein an electrode of a photoelectric sensor is shown to be separated into two regions 12a and 12b. In other words, voltage can independently be applied on the electrode 12a that is an image-recording portion and the electrode 12b that is a current-measuring portion. The supporting substrate of the photoelectric sensor 10 is provided on the surface with a mask 15 that can cover all the photoconductive layer formed on the current-measuring electrode 12b. The mask may be formed by the deposition of a reflecting layer such as an Al layer, the coating of black ink, or the attachment of an opaque seal. In addition, a part of the surface of the photoconductive layer shielded from light is provided with an electrode 14. The electrode 14 is not always required to be transparent, and so may be made up of an ITO electrode, a deposited Al layer, etc. Also the electrodes 12b and 14 are not always required to have the same area. By way of example but not by way of limitation, it is desired that both electrodes overlap over an area lying in the range of 0.1 to 1 cm².

A part of the surface of the liquid crystal recording layer is provided with an electrode 25. A power source 30c can be used to apply voltage on that electrode to measure the current through it, thereby determining the electrical properties (resistance and electrostatic capacity) of the liquid crystal recording layer.

The resistance and capacity of the liquid crystal recording layer are calculated as the area of the portions of the electrodes 12b and 14 that overlap each other. A variable resistance 41 and a capacity 42 are regulated to the thus calculated value and, as shown, connected in series with the photoelectric sensor together with a current-measuring electrode 40a, followed by the application of voltage via a power source 30b. Although varying depending on the area of the electrode, the current-measuring resistance 40a used may have a resistance value of 1 kΩ to 100 MΩ, and has preferably a resistance value variable depending on the resistance of the liquid crystal recording medium and the area of the electrode. The voltage to be applied is determined by subtracting the discharge voltage of an air layer from the voltage of the image-recording power source 30a. Here, too, the discharge voltage shall Paschen's law. Consequently, the current measured by the current-measuring resistance 40a can be taken as being a current flowing through the liquid crystal recording medium.

The current may be measured by the simultaneous application of voltage from the power sources 30a and 30b simultaneously with image recording. Alternatively, voltage may be applied from the power source 30b alone to the recording medium just before image recording to calculate the applied voltage duration, followed by image recording with the power source 30a. The method of measuring the current simultaneously with image recording is more advantageous, because the time of image recording can be made shorter. However, the method of measuring the current just before image recording has a merit of being able to correct the applied voltage, when it is considerably different from the proper value. Of course, these methods may be used in combination with each other.

Figure 40:
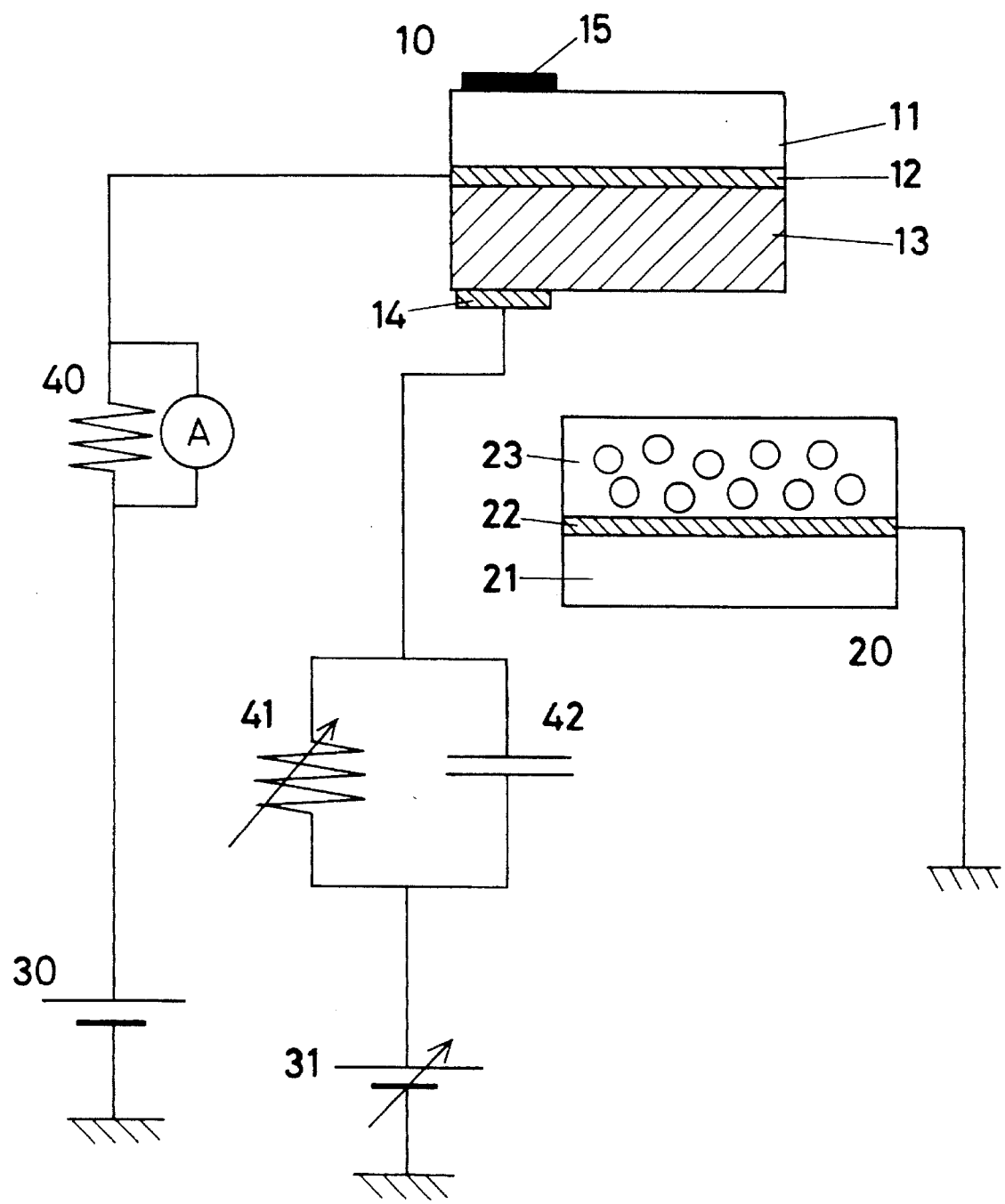
FIG. 40 is a schematic illustrating how to measure the current of a separation type of liquid crystal medium.

In the above methods of measuring the current, it is required to separate the electrode of the photoelectric sensor into the current-measuring and image-recording portions. As shown in FIG. 40, however, it is also preferable to apply a bias voltage 31 corresponding to the air discharge voltage to a current-measuring circuit and, at the same time, apply voltage thereto via a common power source 30, whereby a voltage except the discharge voltage is applied on the current-measuring portion. In this case, the element (resistance and capacity) of a pseudo liquid crystal recording layer is determined by the area of an electrode 14.

Reference will now be made to how to measure the current of an integral type recording medium in which photoconductive, dielectric middle and liquid crystal recording medium are formed on a transparent electrode in this order.

Figure 41:
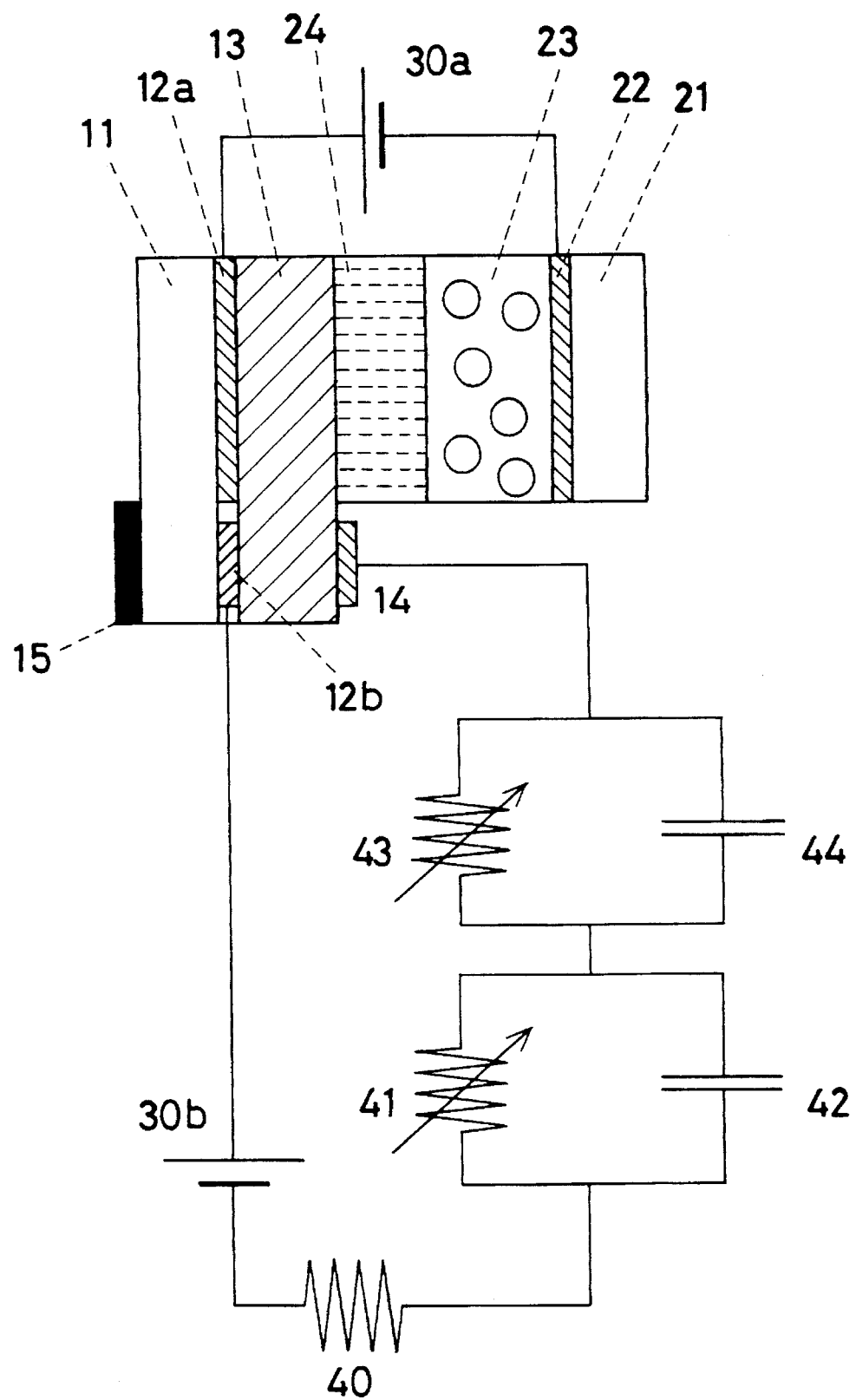
FIG. 41 is a schematic illustrating how to measure the current of an integral type recording medium.
Figure 42:
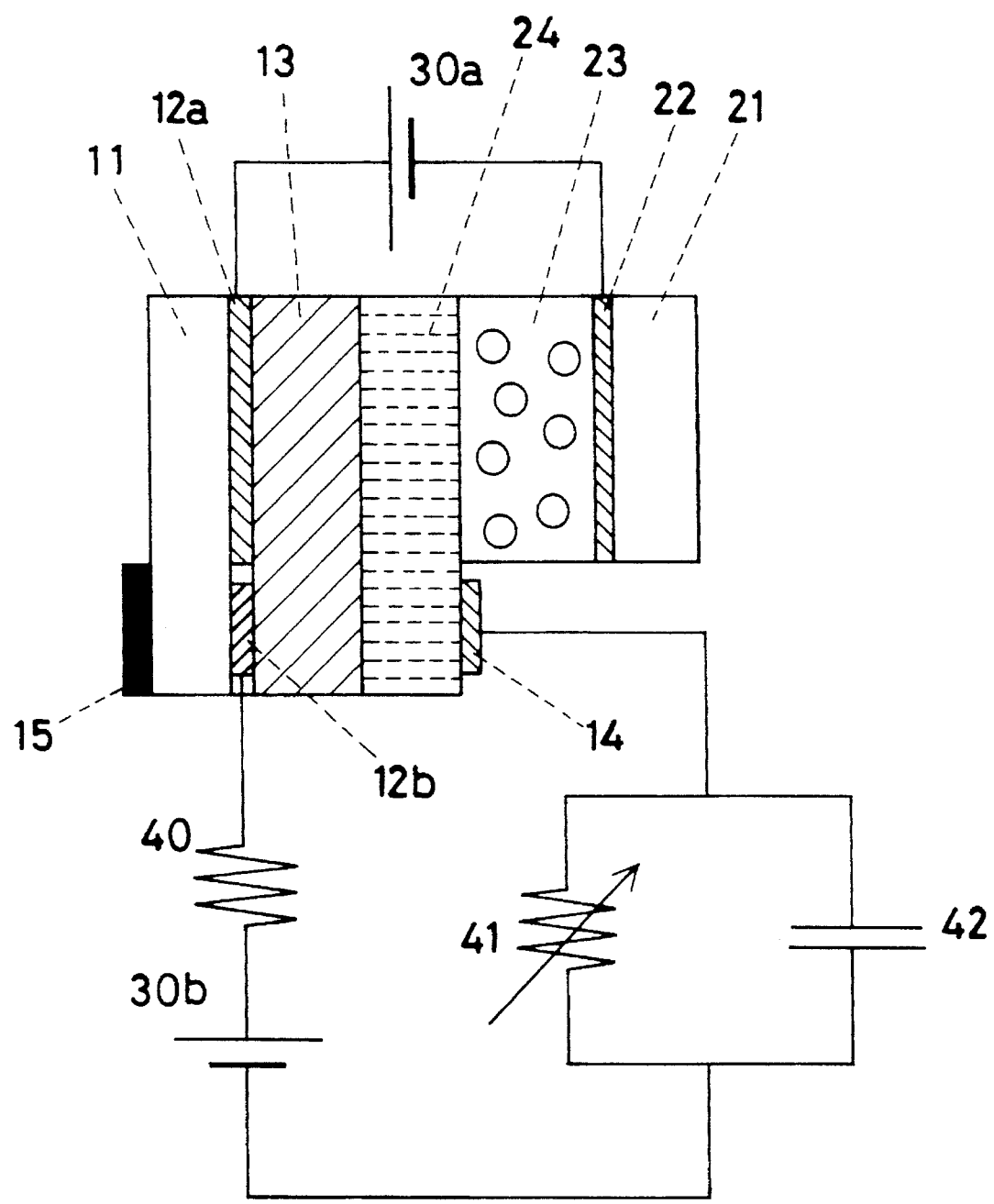
FIG. 42 is a schematic illustrating how to measure the current of an integral type recording medium.

This method is illustrated in FIGS. 41 and 42 wherein, as in the case of the arrangement shown in FIG. 39, an electrode is shown to be separated into an image-recording portion and a current-measuring portion. A supporting substrate is provided on the surface with a light-blocking mask 15. In the arrangement shown in FIG. 41, a photoconductive layer is provided thereon with an electrode 14, and a resistance 41 and a capacitor 42 that correspond to a liquid crystal recording layer are connected in series with a resistance 43 and a capacitor 44 corresponding to a dielectric middle layer. The resistor and capacity of the liquid crystal recording layer are measured in the same manner as illustrated in FIG. 39, and are connected with each other with an element calculated as the area of the current-measuring portion. The resistance and capacity of the dielectric middle layer may be estimated from the dielectric constant, resistivity, thickness and area thereof. A power source 30b is used to apply voltage on a current-measuring resistance 40 connected to it, thereby measuring the current and so calculating the applied voltage duration.

In the arrangement shown in FIG. 42, a dielectric middle layer is provided on the surface with an electrode 14, which is connected with a resistance 41 and a capacitor 42 corresponding to a liquid crystal recording layer. By the application of voltage via a power source 30b it is likewise possible to measure the current and so calculate the applied voltage duration.

Reference will now be made to how to calculate the applied voltage duration.

A liquid crystal recording layer is considered to be a parallel circuit with a resistance and a capacitor. After the voltage is initially distributed to a photoelectric sensor and a liquid crystal recording medium according to their capacity ratio, the following differential equations hold. Consequently, the voltages can successively be calculated by measuring the current value.

Such a system is represented by an equivalent circuit such as one shown in FIG. 18.

In the initial stage of the application of voltage, the voltage is distributed to the photoelectric sensor and liquid crystal recording medium according to their capacity ratio.

$$V_S(0)=V_{AP} \times (C_L/(C_S+C_L)) \quad \ldots (6\text{-}1)$$

$$V_L(0)=V_{AP} \times (C_S/(C_S+C_L)) \quad \ldots (6\text{-}2)$$

The liquid crystal recording layer is represented in terms of a parallel circuit with a resistance and a capacitor, and the following differential equations hold therefor.

$$I=C_L(dV_L/dt)+(V_L/R_L) \quad \ldots (6\text{-}3)$$

$$V_L(t+\Delta t)=V_L(t)+(dV_L/dt)\cdot\Delta t \quad \ldots (6\text{-}4)$$

From Equations (6-3) and (6-4), $$V_L(t+\Delta t)=V_L(t)+(I(t)-V_L(t)/R_L)\Delta t/C_L \quad \ldots (6\text{-}5)$$

By substituting the initial condition of Equation (6-2) for Equation (6-5) it is possible to find the voltage imposed on the liquid crystal recording layer.

An integral type medium made up of three layers, i.e., a photoconductive layer, a dielectric middle layer and a liquid crystal recording layer is represented by an equivalent circuit such as one shown in FIG. 28.

Just after the initiation of the application of voltage, the voltage is distributed to the photoconductive, dielectric middle and liquid crystal recording layers according to their capacity ratio. The distributed voltages are then given by $$V_S(0)=C_M C_L/(C_S C_M+C_M C_L+C_L C_S) \times V_{AP} \quad \ldots (7\text{-}1)$$

$$V_M(0)=C_L C_S/(C_S C_M+C_M C_L+C_L C_S) \times V_{AP} \quad \ldots (7\text{-}2)$$

$$V_L(0)=C_S C_M/(C_S C_M+C_M C_L+C_L C_S) \times V_{AP} \quad \ldots (7\text{-}3)$$

Since the three layers are connected in series with one another, Equation (6-3) holds for the liquid crystal recording layer. As in the case of the separation type, it is thus possible to calculate the voltage from Equation (6-5) and so find the initial condition from Equation (7-3).

When the capacity of the photoelectric sensor is smaller than that of the liquid crystal recording medium, the voltage imposed on the photoelectric sensor can be estimated from the current value.

Figure 43:
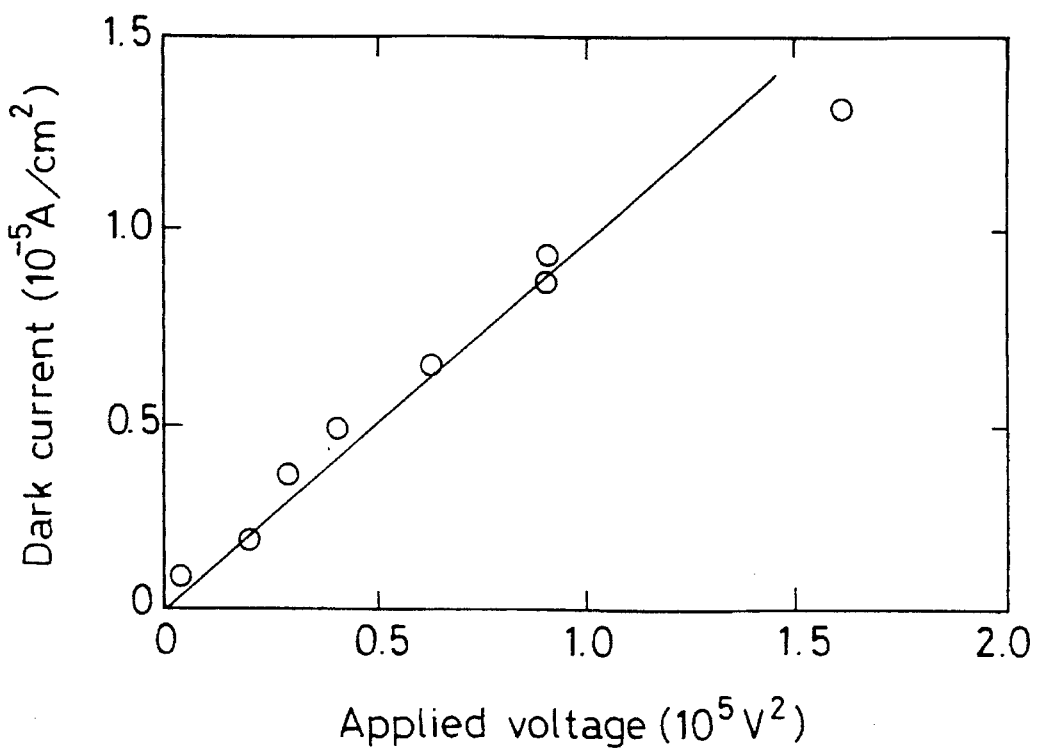
FIG. 43 is a graph showing the relation between the applied on the photoelectric sensor and the dark current value at that time.

Shown in FIG. 43 is the relation between the voltage imposed on the photoelectric sensor and the then dark current value. Thus, the voltage correlates with the dark current; that is, the voltage can be estimated from the current value. As in the case of Equation (6-3), the following differential equation holds for the photoelectric sensor, when the voltage is applied on it.

$$I=C_S dV_S/dt+I_S(V_S) \quad \ldots (8\text{-}1)$$

In the information recording system according to the invention, the voltage imposed on the liquid crystal recording layer drops sharply just after the application of voltage, but the voltage hardly changes when the application of the voltage is stopped. Thus, the current in association with the voltage change given by the first term of Equation (8-1) decreases with the duration of the applied voltage.

Figure 44:
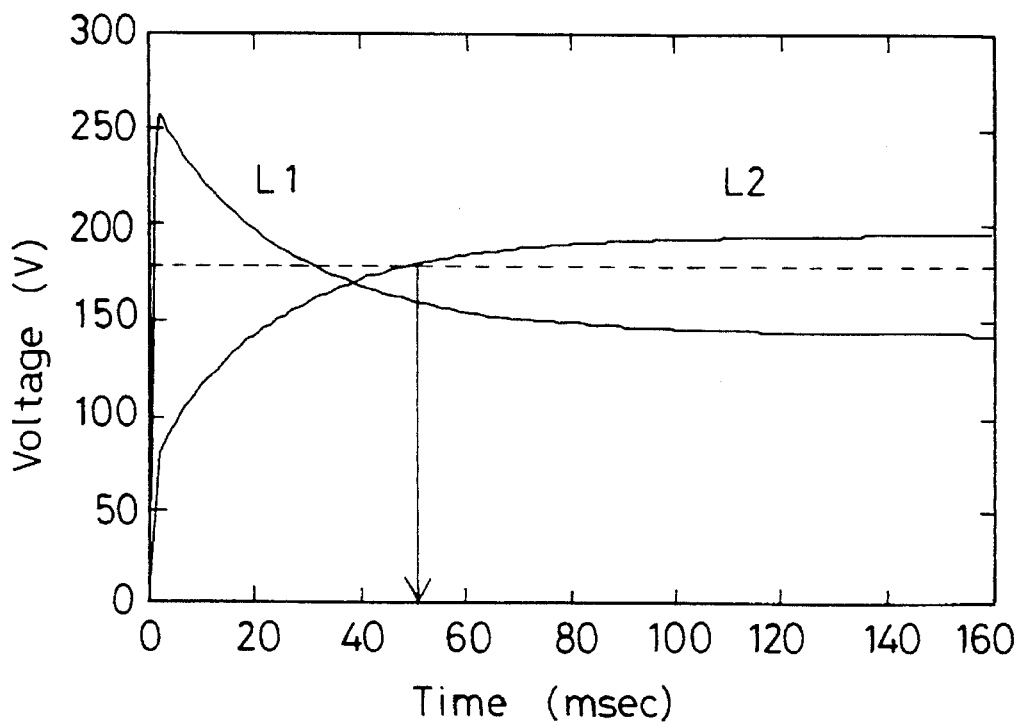
FIG. 44 is a graph showing the results of simulation of the time changes of the voltages applied on the photoelectric sensor and liquid crystal layer.

FIG. 44 shows the results of simulation of changes-with-time in the voltages applied on the photoelectric sensor and liquid crystal layer when the liquid crystal recording medium is provided in the form of a parallel circuit with a capacitor and a resistance. L1 and L2 represent the changes-with-time in the voltages applied on the photoelectric sensor and liquid crystal layer, respectively. As can be seen from FIG. 44, they are charged in a short time (of about 2 msec) to the voltages corresponding to the capacity ratio of the photoelectric sensor to the liquid crystal recording layer. After this, the voltage of the photoelectric sensor decreases with an increase in the voltage of the liquid crystal recording layer. The rate of change is large at the initial time of the application of voltage, and decreases with the lapse of time.

The above simulation was done on condition that the liquid crystal recording layer is parallel with the resistance and capacitor and the dark current of the photoelectric sensor is proportional to the square of the voltage. The electrical properties of the photoelectric sensor and liquid crystal recording medium used are mentioned below.

Thickness of Recording Medium: 6 μm

Capacity of Recording Medium: 1,000 pF/cm$^2$

Resistivity of Recording Medium: $1.3 \times 10^{11}$ Ωcm

Thickness of Photoelectric sensor: 10 μm

Capacity of Photoelectric sensor: 300 pF/cm$^2$

Dark Current of Photoelectric sensor: $1.0 \times 10^{-6}$ A/cm$^2$ at an applied voltage of 100 V Applied Voltage: 340 V (except that of the air gap portion)

Figure 45:
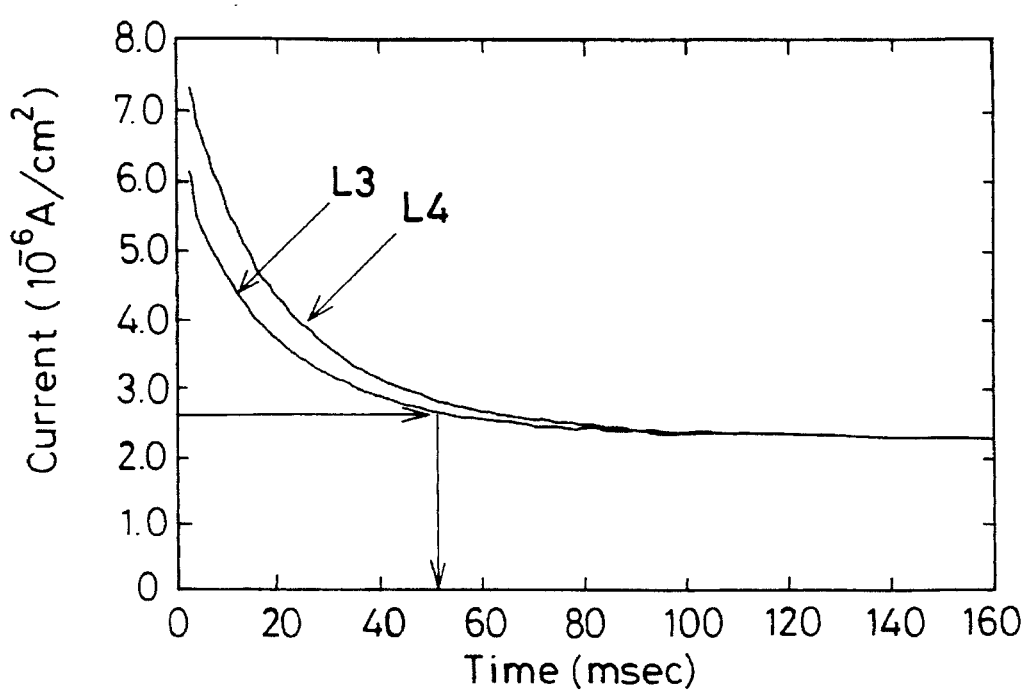
FIG. 45 is a graph showing the calculations of the current value.

The results of the calculated current value are also shown in FIG. 45.

In FIG. 45 L3 denotes the change-with-time in the dark current value of the photoelectric sensor (the second term of Equation (8-1)) and L4 stands for the change-with-time in the current measured (the total current value I of Equation (8-1)).

As shown in FIG. 43, the voltage and dark current of the photoelectric sensor have a mutual relation, and so the voltage applied on the photoelectric sensor can be found from the dark current value. What is measured by the methods shown in FIGS. 39 and 41 is the sum of the portions corresponding to the dark current and voltage change of the photoelectric sensor, as can be understood from Equation (8-1). In other words, it is impossible to directly measure the dark current value. As can be seen from FIG. 45, there is no large difference between the current value L4 measured and the dark current value L3 of the photoelectric sensor because of the small capacity of the photoelectric sensor. In particular, since there is no appreciable voltage change when the voltage of the liquid crystal recording layer reaches the threshold voltage, the first term of Equation (8-1) is sufficiently smaller than the second term; that is, the current measured can be deemed as being the dark current of the photoelectric sensor.

Consequently, when the relation between the dark current and voltage of the photoelectric sensor is previously known, it is possible to estimate the voltage applied on the photoelectric sensor by monitoring the current value of the dark portion, and it is then possible to find the voltage of the liquid crystal recording layer by subtracting the estimated value from the applied voltage.

Reference will now be made to how to determine when the application of voltage is stopped.

As already noted, the current may be measured either at the same as the exposure with an applied voltage or by applying voltage on the current-measuring portion alone just before information recording.

As already mentioned, the condition for the application of voltage—under which an image having a high contrast is obtained—is that the transmittance of the liquid crystal recording medium at the dark portion is about 10 to 20%. Consequently, it is required to find the optimal duration of the applied voltage by adding the time—at which the liquid crystal recording layer is modulated to a transmittance of 10 to 20%—to the time at which the voltage of the liquid crystal reaches the threshold.

The time at which the voltage of the liquid crystal recording layer reaches the threshold can be found by estimating the voltage by measuring the current value by the method mentioned above and determining whether or not the estimated voltage have reached the threshold. It is noted that the judgment of whether or not the voltage estimated from the current value measured have reached the threshold voltage and the operation for finding the optimal duration of the applied voltage by the addition of the time at which the liquid crystal recording layer is modulated to a transmittance of 10 to 20% may be carried out by use of a microcomputer or other control, and the voltage is put off by the microcomputer when the optimal duration of the applied voltage is reached. It is also noted that the time necessary for the liquid crystal recording layer to be modulated to a transmittance of 10 to 20%, although varying somewhat depending on the liquid crystal medium, can be previously measured, for instance, by applying a voltage in the vicinity of the threshold voltage to the recording layer and irradiating the recording layer with laser light to measure the intensity of the transmitted light.

Reference will now be made to an embodiment in which the behavior of a liquid crystal recording layer is monitored to detect the moment the contrast reaches a maximum, thereupon putting off the voltage.

In this embodiment, the behavior of the liquid crystal recording layer is monitored by measuring the current flowing through the liquid crystal recording medium. For instance, the "behavior" of the liquid crystal recording layer means that the voltage of the unexposed portion reaches the threshold voltage—this may be found by measuring the current, that the contrast of the light and dark portions reaches a maximum—this may be found by a change-with-time in the current of the exposed portion or a change-with-time of the difference in the current between the exposed and unexposed portions, and that the difference between the integral value of the current of the region irradiated with light and the integral value of the current of the exposed portion reaches the quantity corresponding to the capacity change of the liquid crystal recording medium. The moment these are monitored, the application of voltage is stopped, so that the image information can be carried out with the maximum contrast.

First, reference will be made to the method, medium and device for measuring the current in recording information.

Figure 46:
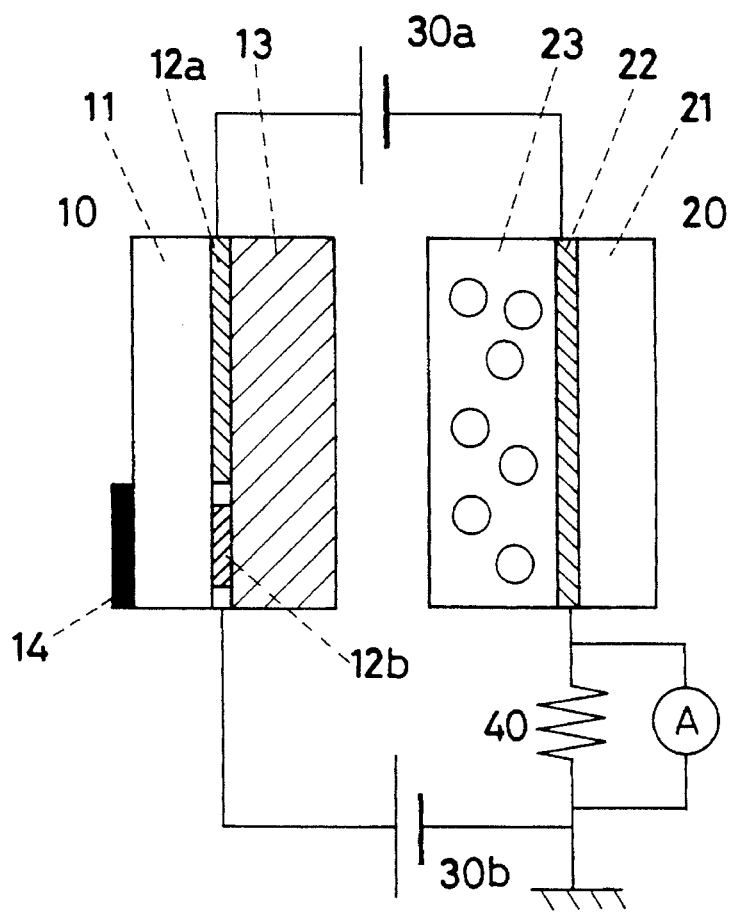
FIG. 46 is a schematic illustrating how to measure the current of the unexposed portion.

FIG. 46 shows how to measure the current of the unexposed portion. As illustrated, a part of a transparent supporting substrate of a photoelectric sensor 10 is provided with a mask 14 to shield a photoconductive layer at this region from light. The mask 14 may be formed of any desired material with the proviso that it can shield the photoconductive layer from light, and so may be formed by the coating of a black coating material or by use of a deposited Al layer. In this case, a transparent electrode of the photoelectric sensor is separated into an image information-recording portion and a current value-monitoring portion, as shown at 12a and 12b. While the electrode of the photoelectric sensor is shown to be separated into 12a and 12b, it is understood that the electrode of the liquid crystal recording medium may also be separated into similar portions. While separate power sources are shown to be used with the image information-recording and current value-monitoring portions, it is understood that a single common power source may be used. A current-monitoring resistance 40 is connected between the electrode 12b of the current-monitoring portion and the power source, so that the current can be measured by monitoring the voltage of the resistance 40. The resistance 40 used may have a resistance value of about 1 kΩ to about 1 MΩ, although varying depending on the area of the portion to be monitored and the conductivity of the photoelectric sensor.

Figure 47A:
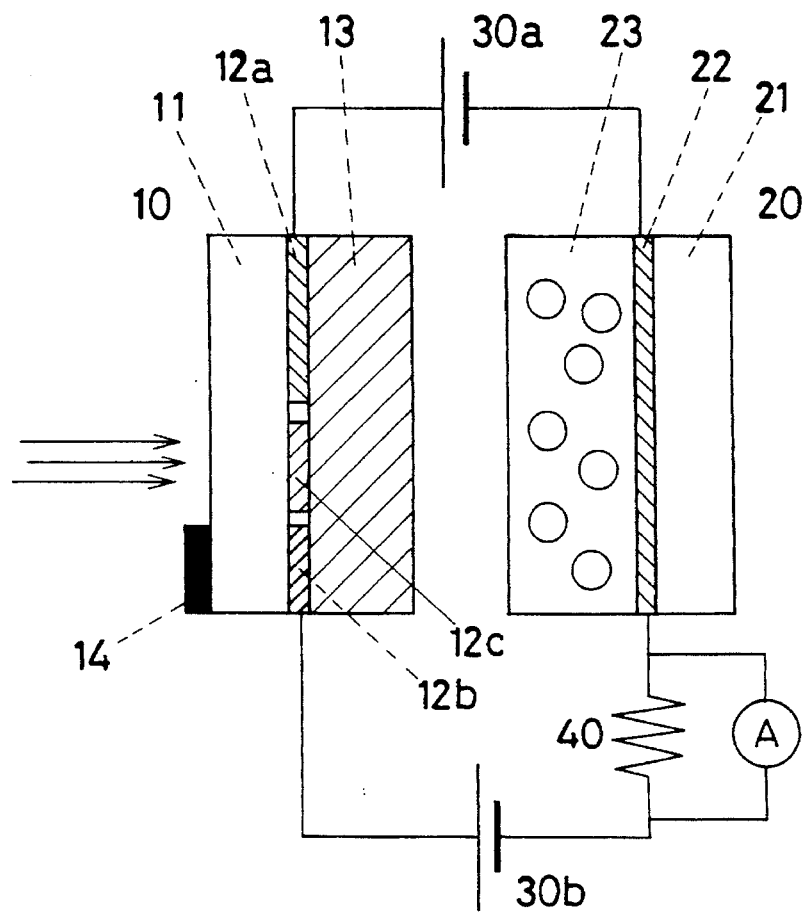
FIGS. 47(a)–47(b) are schematics illustrating how to measure the currents of the exposed and unexposed portions at the same time.
Figure 47B:
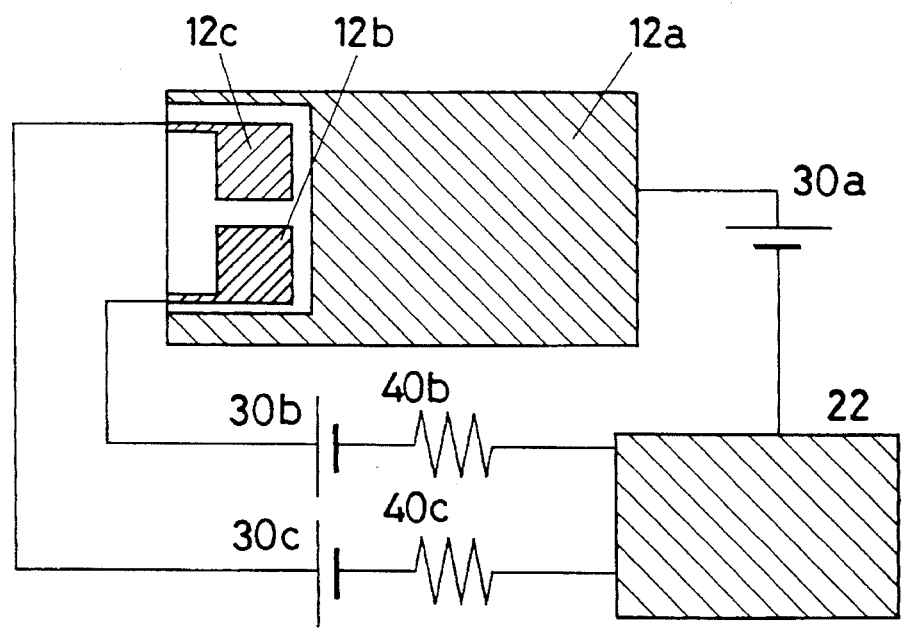

FIGS. 47(a) and 47(b) show how to measure the current values of the exposed and unexposed portions at the same time. As shown at 12a, 12b and 12c, a transparent electrode of a photoelectric sensor is separated into three regions, on which voltage can independently be applied. The electrodes 12b and 12c for monitoring the currents of the unexposed and exposed portions are connected with resistances 40b and 40c, respectively, so that the currents can be monitored by measuring the voltages of the respective resistances. As in the case of the arrangement shown in FIG. 46, a light-shielding mask 14 is formed on the surface of the supporting substrate of the photoelectric sensor that corresponds to the region for monitoring the current of the unexposed portion. It is noted that the current-monitoring region of the exposed portion may be irradiated with light, as shown in FIGS. 9 and 10.

Figure 48A:
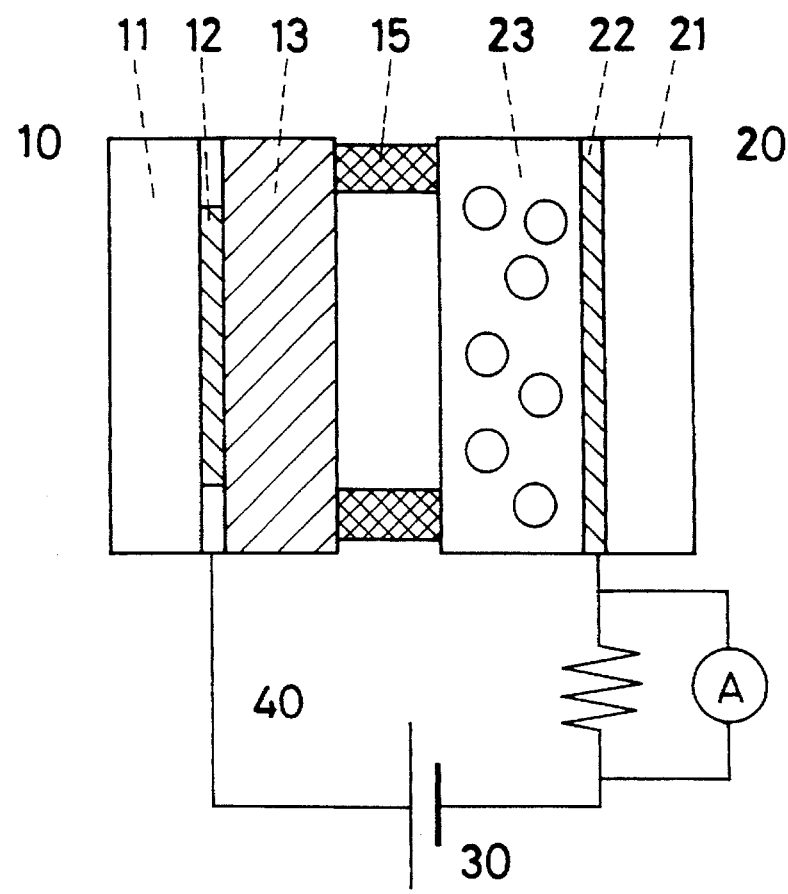
FIGS. 48(a)–48(b) are schematics illustrating an example wherein the current is measured while a portion provided with a spacer is separated from a portion provided with an electrode.
Figure 48B:
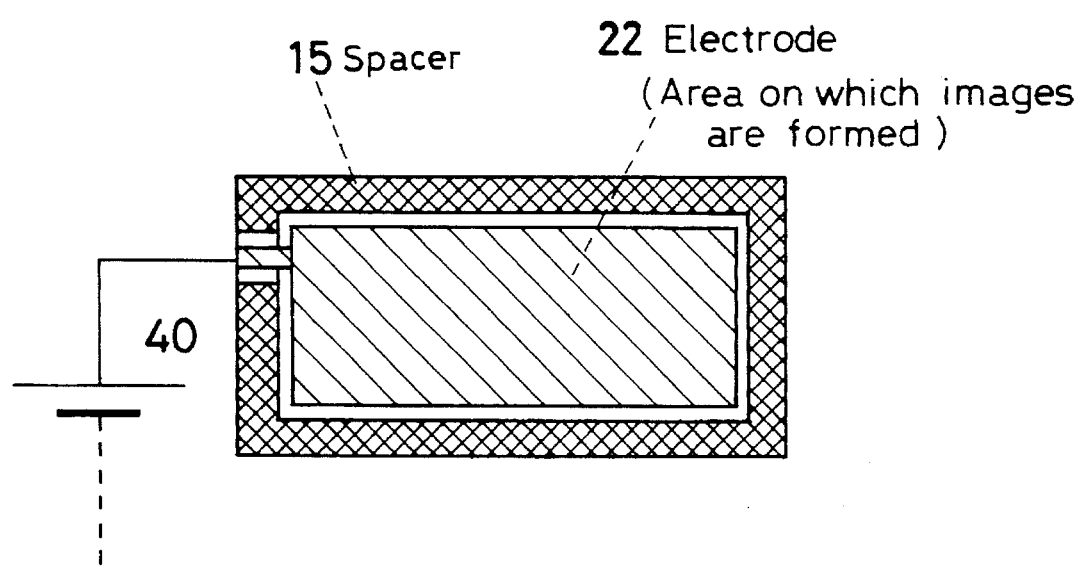

While mention has been made of the method in which the current is monitored at the current-monitoring region separate from the image-recording portion, it is understood that the duration of the applied voltage may also be controlled by monitoring the current of the image-recording portion. In this case, it is considered that the current value of the image to be recorded at the time when it is irradiated with an average quantity of light is measured. In the method in which the photoelectric sensor is opposed to the liquid crystal recording medium with an air gap between them for the application of voltage, the spacer film is located around the image-recording portion to keep the air gap uniform. When the current value of the image-recording portion is found, however, it is impossible to measure the current precisely, if some voltage is applied on the spacer portion. As shown in FIG. 48 by way of example, it is thus required that the portion at which a spacer 15 is located be separated form the portion at which the electrode 12 is located. In FIG. 48, the spacer 15 in a rectangular frame form is located around the photoelectric sensor 10 and liquid crystal recording medium 20 such that the image is recorded at the central portion in which the spacer 15 does not exist.

When both the current value of the image-recording portion and the current value of the unexposed portion are monitored to control the duration of the applied voltage, it is not always necessary to make the areas of both portions equal to each other. In other words, control operation can be simplified by use of a resistance in which care is taken of a difference in area.

For instance, let Sa denote the electrode area of the image-recording portion, Sf represent the electrode area of the current-monitoring portion of the unexposed region and Ra and Rf stand for monitoring resistances. Then, $$SaRa=SfRf$$

According to this equation resistances are chosen. By comparing the voltages of the selected resistances it is possible to directly compare the currents per unit area.

To control the time for putting off the voltage by measuring the current, it is required to measure the electrical properties of a liquid crystal recording layer. How to measure the electrical properties of the liquid crystal recording layer will now be explained with reference to FIG. 49.

A liquid crystal recording layer is provided on the surface with an electrode 24, which is connected with a current-measuring resistance 41. A power source 31 is then used to apply on the electrode a pulse voltage lower than the threshold of the liquid crystal recording medium, whereby the resistance value of the liquid crystal recording medium can be found by monitoring the current values.

How to control the duration of an applied voltage will now be explained with reference to the drawings, using a separation type recording medium by way of example.

A system of the separation type recording medium is represented by an equivalent circuit such as one shown in FIG. 18. In the initial stage of the application of voltage, the voltage is distributed to the photoelectric sensor and liquid crystal recording medium according to their capacity ratio.

$$V_S(0)=V_{AP} \times (C_L/(C_S+C_L)) \qquad \ldots (9\text{-}1)$$

$$V_L(0)=V_{AP} \times (C_S/(C_S+C_L)) \qquad \ldots (9\text{-}2)$$

The liquid crystal recording layer is represented by a parallel circuit with a resistance and a capacitor, for which the following differential equation holds.

$$I=d(C_L V_L)/dt+(V_L/R_L) \qquad \ldots (9\text{-}3)$$

With $V_L$ lower than the threshold of the liquid crystal recording medium, the liquid crystal recording medium does not operate, resulting in no change in the capacity of the liquid crystal recording layer.

$$C_L=\text{const} \qquad \ldots (9\text{-}4)$$

$$I=C_L(dV_L/dt)+(V_L/R_L) \qquad \ldots (9\text{-}5)$$

$$V_L(t+\Delta t)=V_L(t)+(dV_L/dt)\cdot \Delta t \qquad \ldots (9\text{-}6)$$

From Equations (9-3) and (9-6), $$V_L(t+\Delta t)=V_L(t)+(I(t)-V_L(t)/R_L)\,\Delta t/C_L \qquad \ldots (9\text{-}7)$$

Substituting the initial condition of Equation (9-2) for Equation (9-7) enables the voltage applied on the liquid crystal recording layer to be found by calculation.

Figure 49:
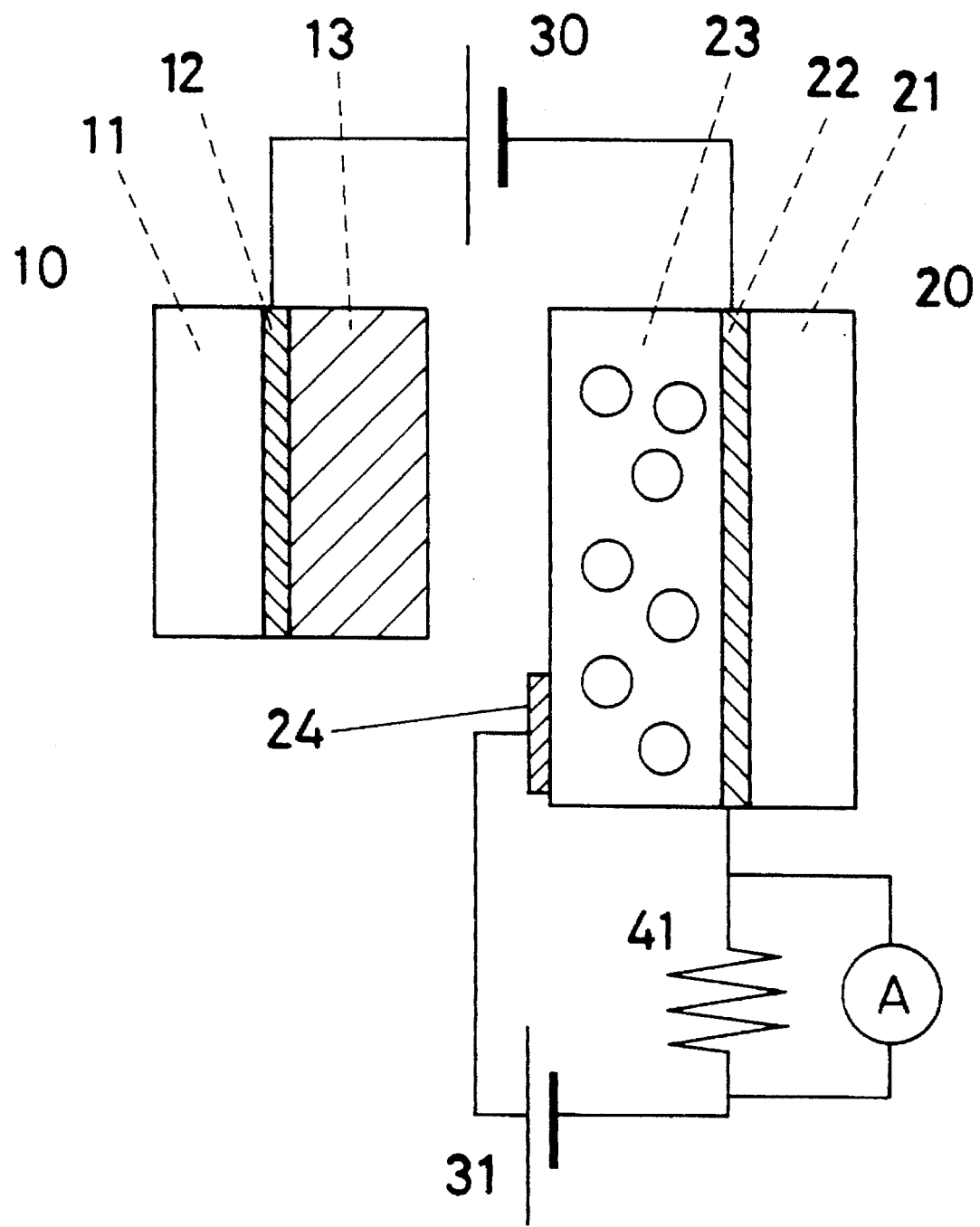
FIG. 49 is a schematic illustrating how to measure the electrical properties of the liquid crystal recording layer.

The capacities of the liquid crystal recording layer and photoconductive layer can be previously calculated from Equations (9-2) and (9-7), and the resistance $R_L$ of the liquid crystal recording layer can be either measured in advance or measured by the method shown in FIG. 49 just before recording an image. At the time of recording the image, the current $I(t)$ of the dark portion can be measured by the method shown in FIG. 46.

To obtain an image of good quality and a high contrast, it is required to put off the voltage when the voltage of the liquid crystal recording medium reaches the threshold, with the liquid crystals oriented to some extent (about 10 to 20%). The liquid crystals of the dark portion are hardly oriented until the voltage is put off, and so the capacity of the liquid crystal recording layer is considered to remain substantially constant; that is, Equation (9-7) holds for. It is thus possible to obtain an image of a high contrast by putting off the voltage after the voltage of the liquid crystal recording layer found by measuring the dark current value has reached the threshold voltage. A good image is obtained by putting off the voltage while the liquid crystal layer of the dark portion is in a state oriented to some extent (about 10 to 20% of the completely oriented state), rather than in a not-oriented-at-all state. In other words, it is preferable to put off the voltage after the lapse of some time upon the threshold voltage being reached.

Controlling the duration of the applied voltage may be achieved by another method in which the capacity change of the liquid crystal recording layer is detected from the dark current value.

Equation (9-5) holds for the liquid crystal recording layer, because the liquid crystals are not oriented at a voltage lower than the threshold voltage, resulting in no change in the capacity of the liquid crystal recording layer. While voltage is being applied on the liquid crystal recording layer, the voltage of the liquid crystal recording layer increases monotonously, with a monotonous decrease in the current value measured. When a voltage higher than the threshold voltage is applied on the liquid crystal recording layer, the liquid crystals are oriented in the direction of the electric field, causing a change in the capacity of the liquid crystal recording layer. Consequently, Equation (9-3) takes the following form:

$$I=C_L(dV_L/dt)+V_L\,(dC_L/dt)+(V_L/R_L) \qquad \ldots (9\text{-}8)$$

This means that the capacity change must be taken into consideration.

A change in the capacity of the liquid crystal recording layer, if occurs, causes a current to flow according to the second term of Equation (9-8). Here it is noted that liquid crystals have a dielectric constant higher in an oriented state than in a non-oriented state. Hence, as the liquid crystals are oriented, there is an increase in the capacity of the liquid crystal recording layer. By making use of this to detect a change in the current value in association with the capacity change, it is possible to detect the capacity change (orientation) of the liquid crystals.

Figure 50:
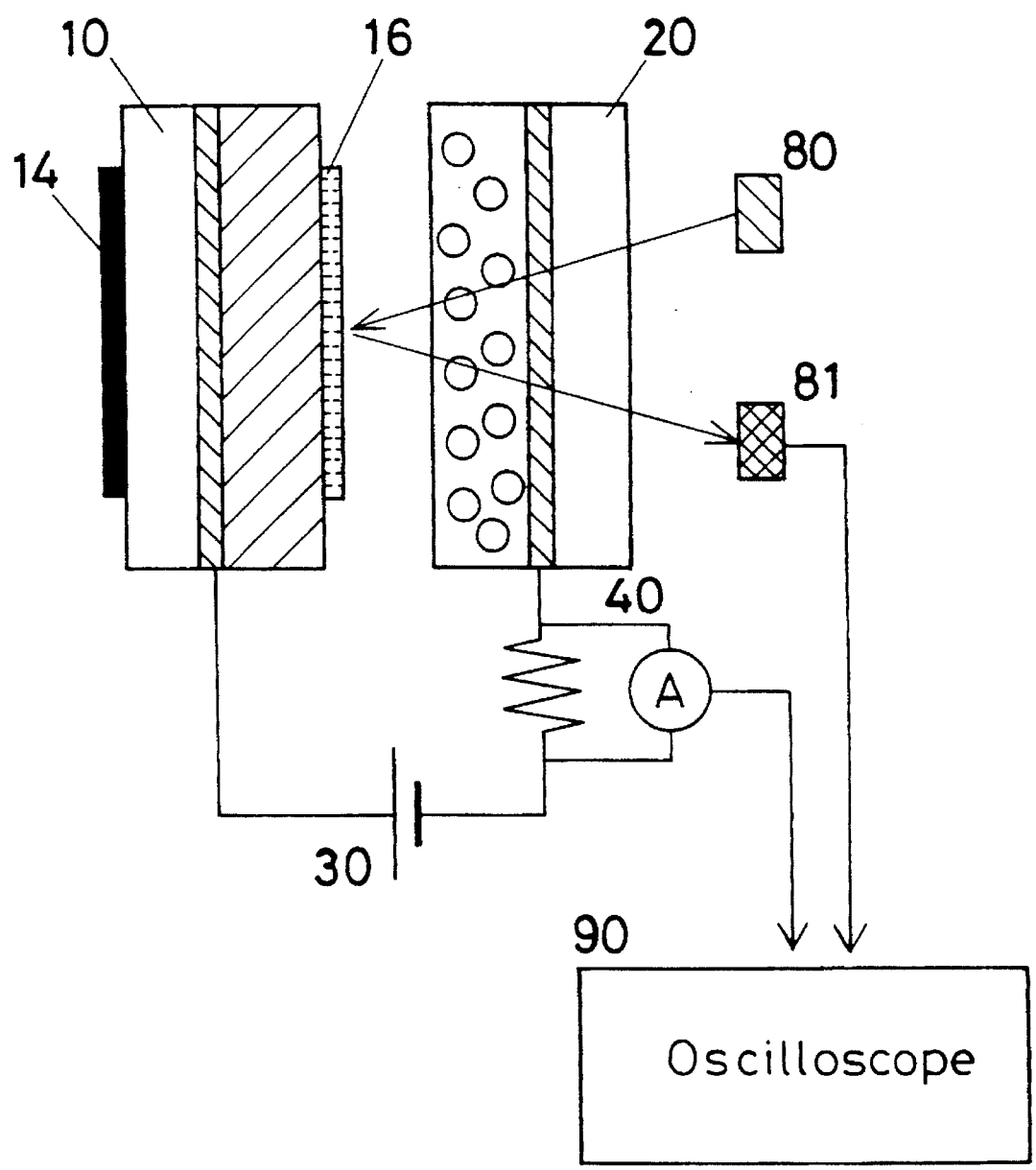
FIG. 50 is a schematic illustrating how to measure the capacity change and current value of the liquid crystal recording layer.

FIG. 50 is a schematic of how to measure the capacity change and current value of the liquid crystal recording layer according to the invention.

Figure 51:
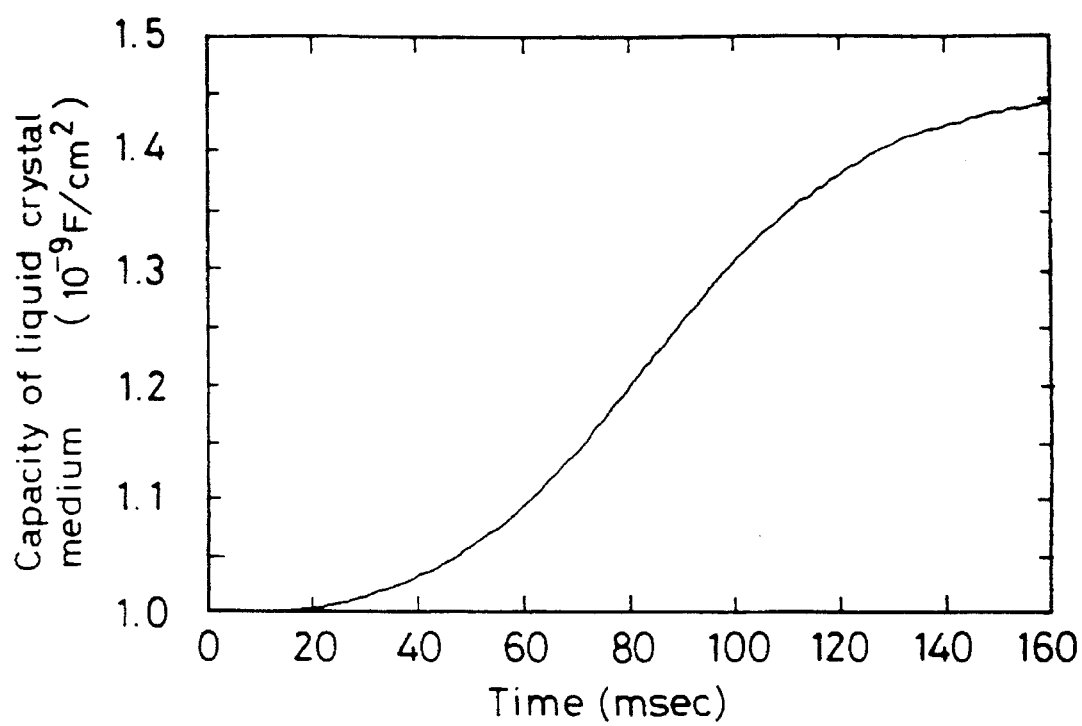
FIG. 51 is a graph showing the capacity change of the liquid crystal recording layer.
Figure 52:
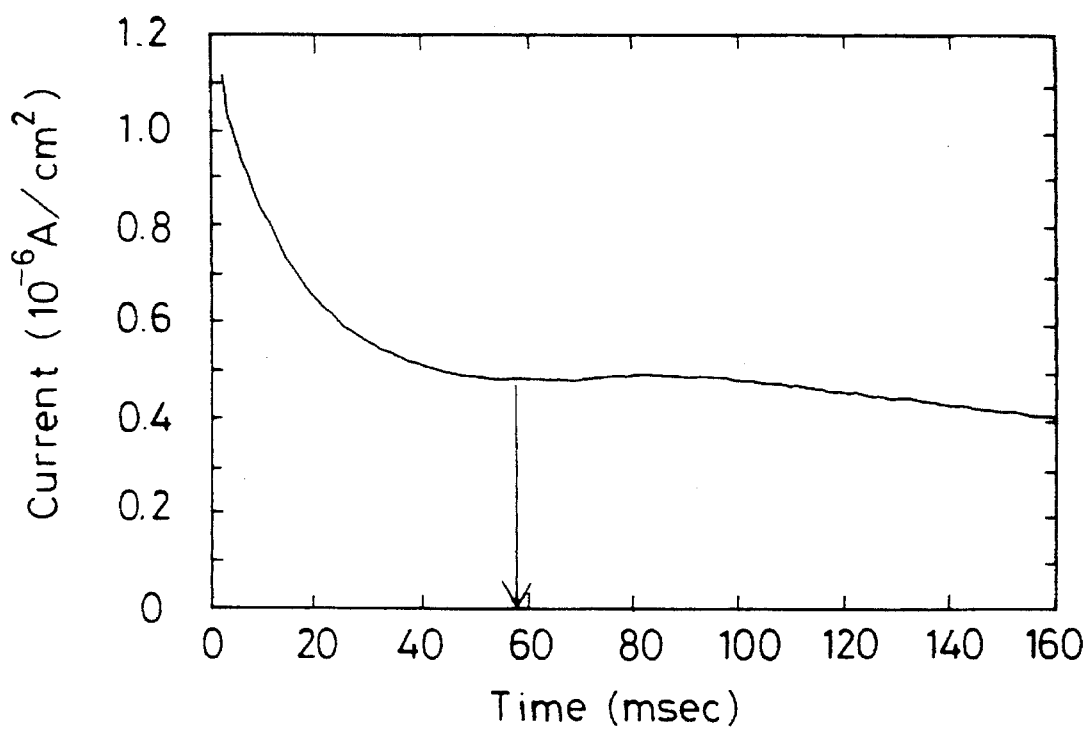
FIG. 52 is a graph showing the measurements of the current value.

It is required to shield a photoconductive layer of a photoelectric sensor 10 from light either by providing a transparent supporting substrate of the photoelectric sensor with a mask 14 or by measuring the capacity change and current value of a liquid crystal recording layer in a dark environment. A reflecting layer 16 is provided either on the surface of the liquid crystal recording layer or on the surface of the photo-conductive layer of the photoelectric sensor. The reflecting layer should be made so extremely thin (1,000 Å or less), thereby preventing the recording properties of the instant system from being adversely affected. As illustrated, the photoelectric sensor is opposed to the liquid crystal recording medium, and an LED 80 and a photoelectric conversion element 81 are positioned such that light from the LED is reflected by the reflecting layer 16, and strikes on the photoelectric conversion element 81. When no reflecting layer is formed on the photoconductive layer, care must be taken such that the photoelectric sensor is not sensitized by the light from the LED. A power source 30 is used to apply voltage on the photoelectric sensor and the liquid crystal recording layer, between which an air gap is interposed. The current can be measured by monitoring the voltage of a resistance 40. As the liquid crystals are oriented and so the transmittance of the liquid crystal layer changes, the quantity of the light exposed to the photoelectric element 81 changes. This change can be converted into electrical signals which can then be monitored. Shown in FIG. 51 is the capacity change of the liquid crystal recording layer measured in this way. The method for determining the relation between the signals of the photoelectric conversion element and the capacity of the liquid crystal recording layer will later be explained with reference to FIG. 60. Also, the current values measured are shown in FIG. 52. All the values are rewritten per unit area ($cm^2$).

Figure 53:
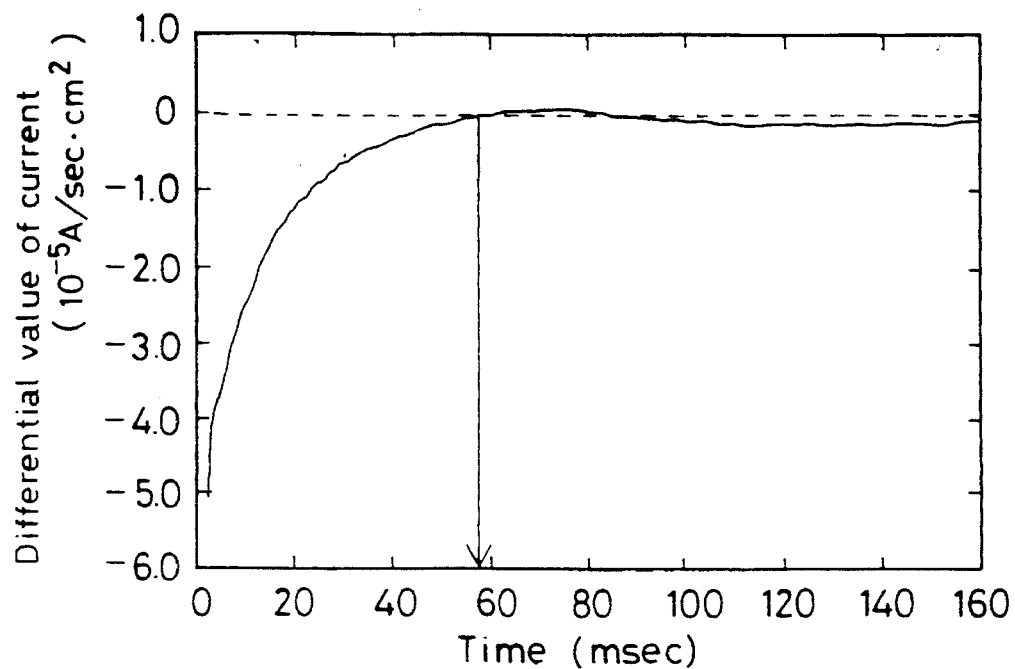
FIG. 53 is a graph showing the change-with-time of the current in the dark portion by the differentiation of the measurements with respect to time.

FIG. 53 shows the differential values of the current of the dark portion with respect to time, i.e., the change-with-time of the current. When the liquid crystals are not oriented at a voltage lower than the threshold voltage, the current value decreases monotonously, so that the differential value is negative. As the liquid crystals start to line up, there is a capacity change. When the quantity of change is large, the second term of Equation (9-8) increases with a current increase, so that the differential value can be larger than zero.

The liquid crystal layer reaches the threshold voltage in the vicinity of 20 msec, and starts to operate. The quantity of change of the liquid crystal recording layer increases from the vicinity of 60 msec, and so the portion corresponding to the capacity change of the second term of Equation (9-8) can increase. Consequently, the current starts to increase, so that the differential value can change from negative to positive. Thus, the current value can be monitored to monitor how the capacity of the liquid crystal recording layer changes on the basis of the differential value.

At this time, it is possible to obtain an image of a high contrast by controlling the duration of the applied voltage, i.e., putting off the voltage at the timing at which the current of the dark portion changes from the decrease to increase phase (i.e., the differential value changes from negative to positive).

Reference will now be made to how to control the duration of the applied voltage by measuring the current of the exposed portion.

Figure 54:
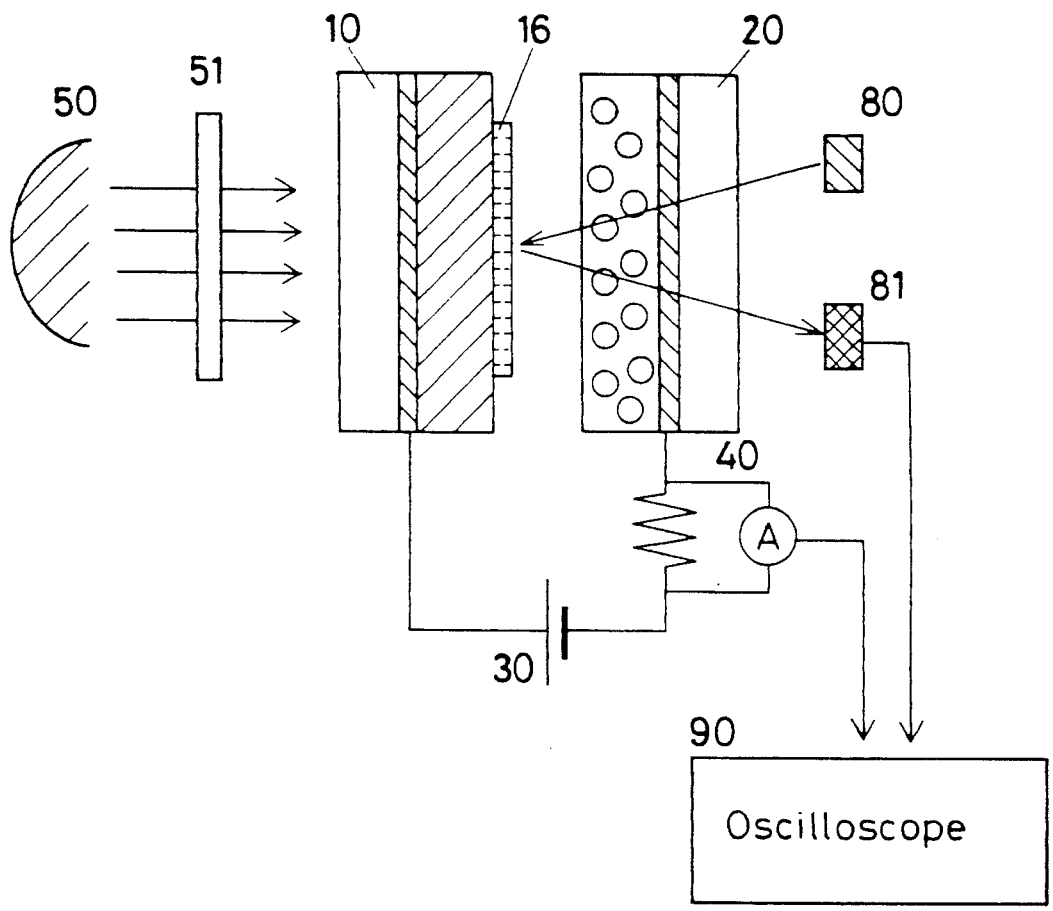
FIG. 54 is a schematic illustrating how to measure the current of the exposed portion and the modulation of the liquid crystal medium.

How to measure the current of the light (exposed) portion and the modulation (capacity change) of the liquid crystal medium is illustrated in FIG. 54. This method is basically similar to that shown in FIG. 50 with the exception that the photoelectric sensor is irradiated with light for a given time, using a light source 50 and an optical shutter 51.

Figure 55A:
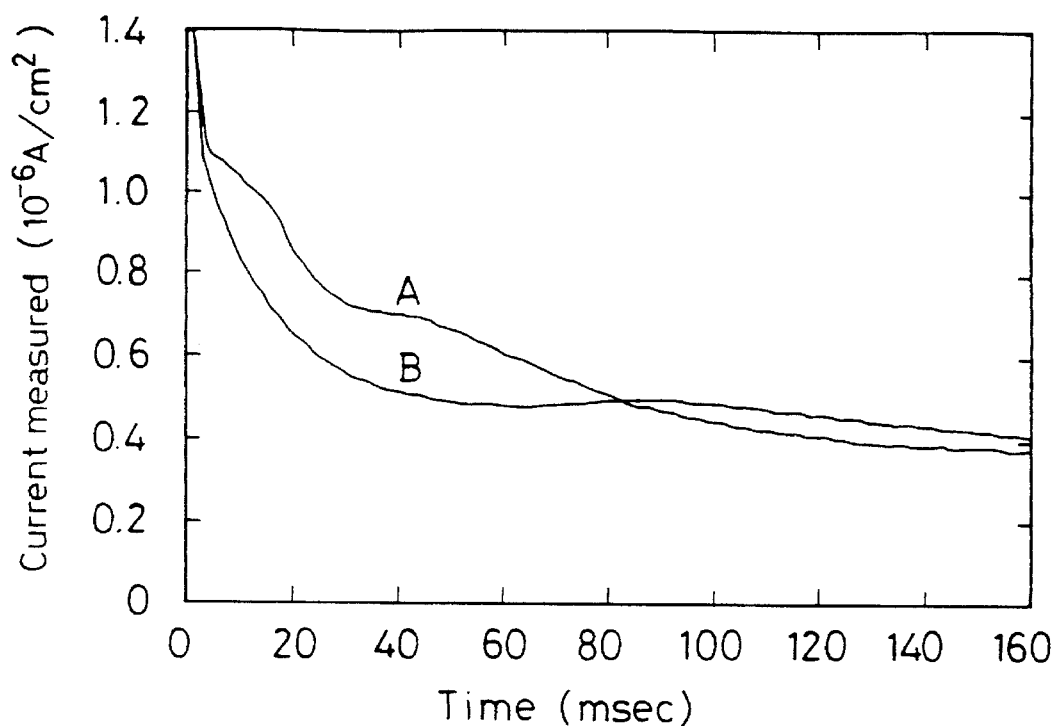
FIGS. 55(a)–55(b) are graphs showing the current characteristics of the exposed and unexposed portions.
Figure 55B:
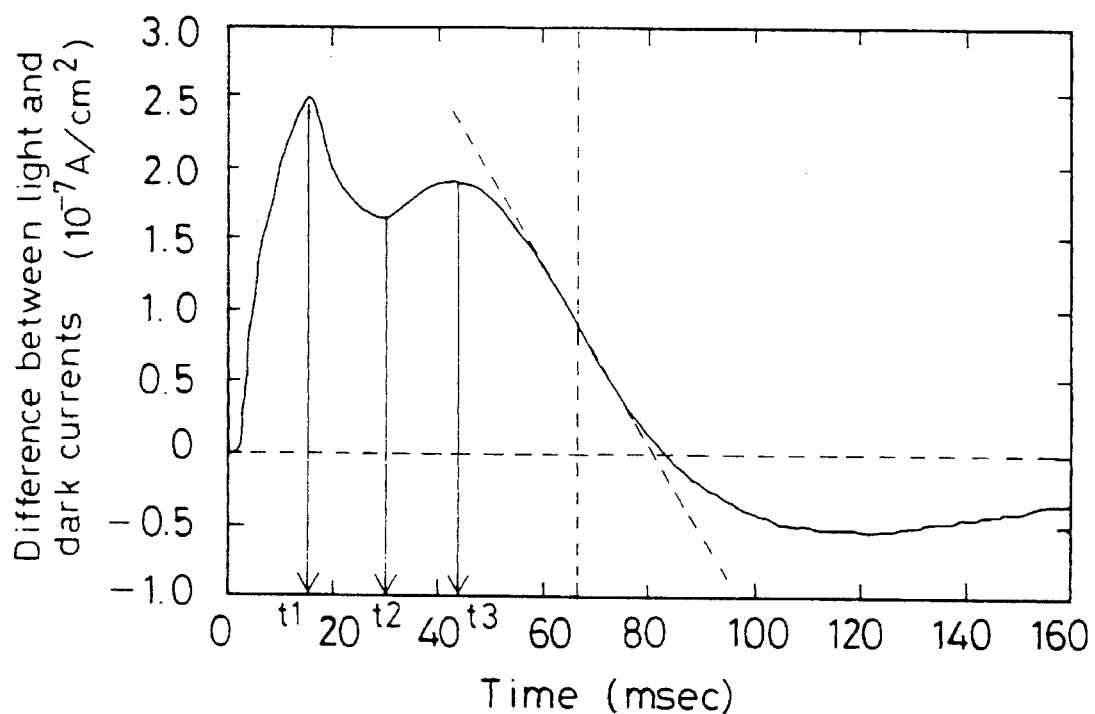
Figure 56A:
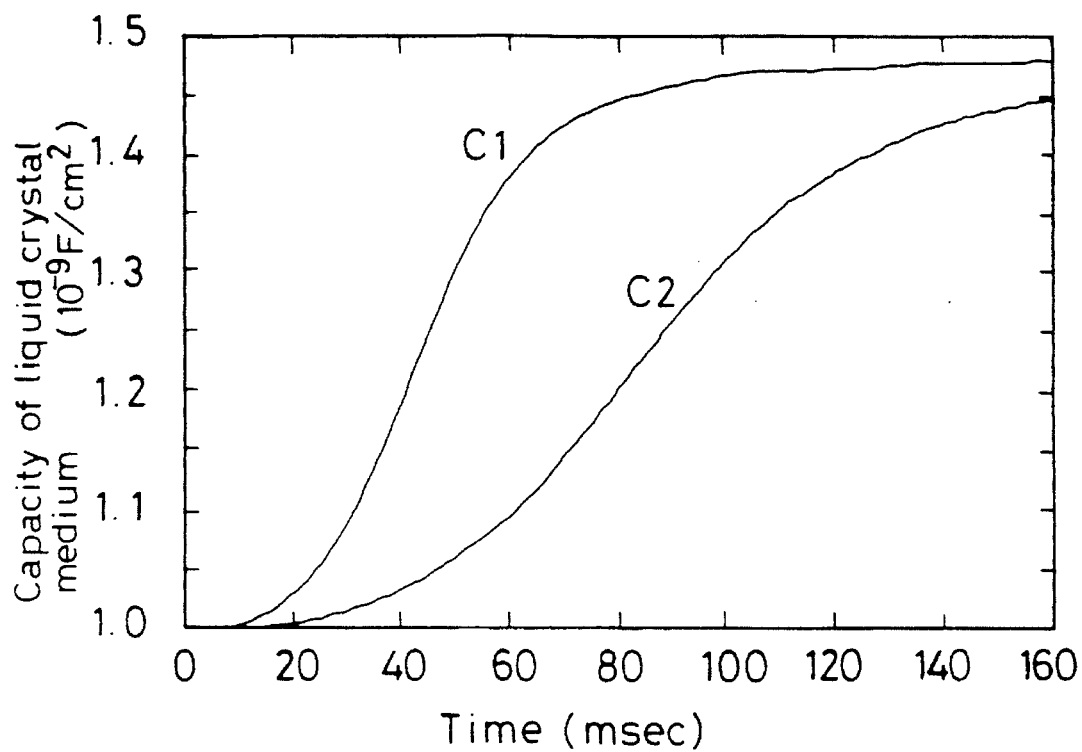
FIGS. 56(a)–56(b) are graphs showing the capacity changes of the exposed and unexposed portions.
Figure 56B:
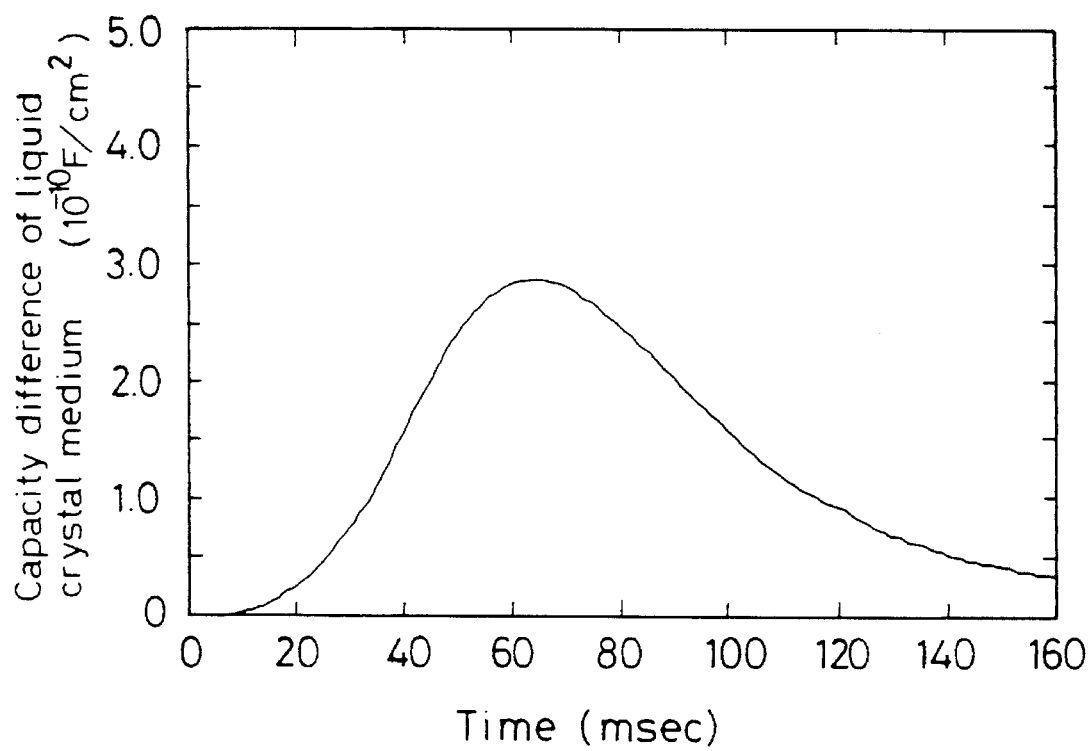

Shown in FIGS. 55(a) and 55(b) are the current characteristics A of the (exposed) portion when it is irradiated with light for 1/60 sec, the current characteristics B of the (unexposed) portion when it is not irradiated with light, and the difference (A–B) in the current value between the exposed and unexposed portions. Also shown in FIGS. 56(a) and 56(b) are the modulation (capacity changes C1 and C2 of the unexposed and exposed portions) of the liquid crystal medium, and the capacity difference (C1–C2) between the unexposed and exposed portions. These values are all rewritten with respect to unit area. Much more current flows through the exposed portion than through the unexposed portion, so that the liquid crystal portion can be modulated faster due to an excessive voltage applied thereon. As can be seen from FIG. 55(b), the difference in the current value between the exposed and unexposed portions increases from the initiation of the application of voltage to the completion of irradiation with light (time t1). Even after the completion of irradiation with light, the photo current continues to flow, but there is a decrease in the current difference between the exposed and unexposed portions. When the liquid crystal recording layer is thereafter modulated at the exposed portion, a current corresponding to the capacity change represented by the second term of Equation (9-8) flows through the liquid crystal recording layer, so that the current difference between the exposed and unexposed portions can again be changed to the increase phase (time t2). Moreover, when the liquid crystal layer starts to be modulated at the unexposed portion, the current difference starts to decrease because of the flow of a current in association with the capacity change (time t3).

Figure 57:
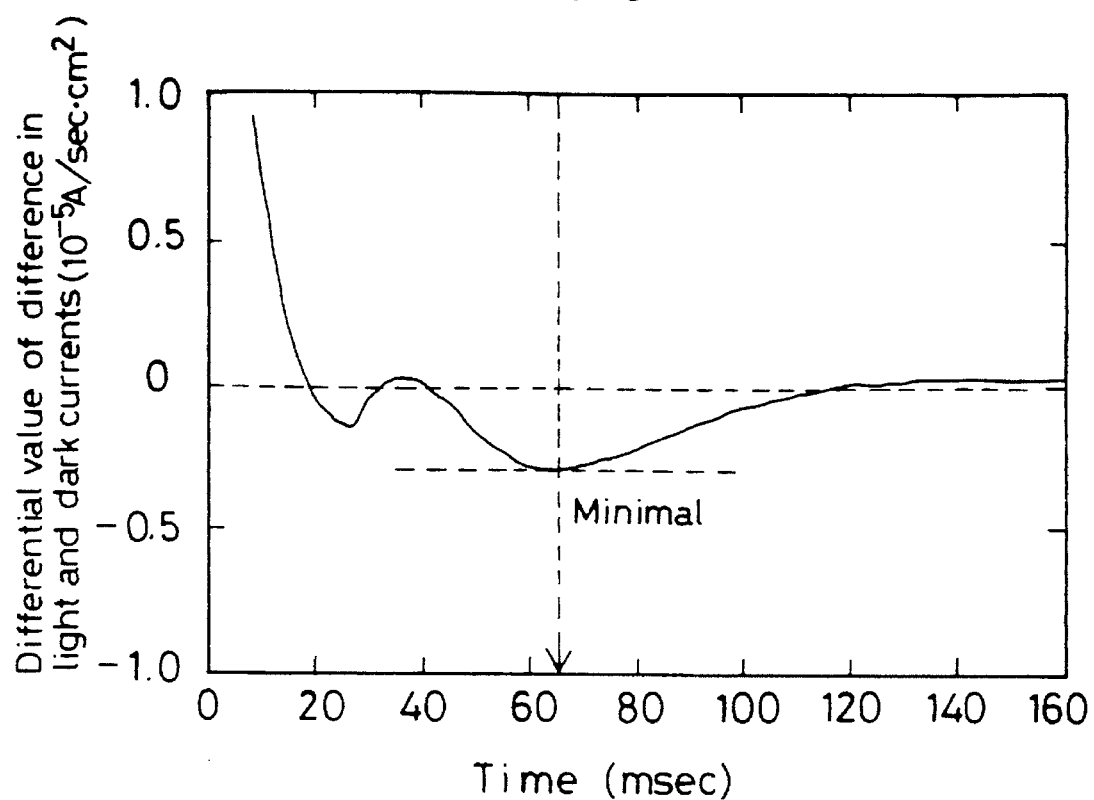
FIG. 57 is a graph showing the differential value of the current difference between the exposed and unexposed portions.

The differential values of the current difference between the exposed and unexposed portions are shown in FIG. 57.

Figure 58:
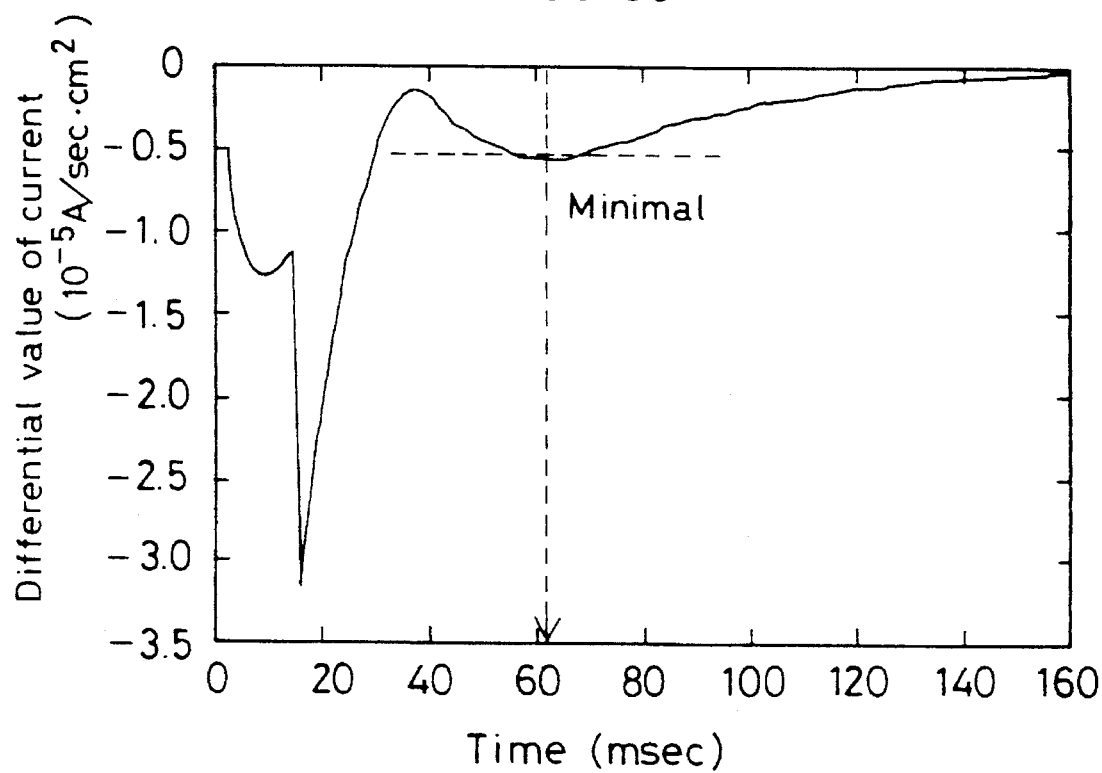
FIG. 58 is a graph showing the change-with-time of differentiation of the current value of the exposed portion.

From FIG. 56(b), it is found that the difference in modulation (or capacity) between the exposed and unexposed portion reaches a maximum when the voltage is put off in 55 to 70 msec, and this coincides with the time when the differential value of the current difference shown in FIG. 57 reaches a minimum. FIG. 58 shows the change in differentiation of the current value of the exposed portion with respect to time. From the fact that the minimal value in FIG. 57 coincides nearly with the minimal value in FIG. 58, it is understood that such a change depends on the operation of the liquid crystal recording layer at the exposed portion. That is, the liquid crystal recording layer at the exposed portion is not constant in terms of the quantity of the modulation change, and so is rapidly modulated to some extent, but then decreases in the rate of modulation. This appears to be the reason that such current characteristics are obtained.

Thus, the voltage can be put off at the timing at which the current difference between the exposed and unexposed portions or the differential value of the current of the exposed portion assumes a minimal value after the completion of exposure, and so the application of voltage can be stopped in a state where the rate of modulation of the exposed portion drops or the liquid crystals are almost completely oriented, thereby making image recording under the condition under which an image of a high contrast can be obtained. However, it is then not preferable to use light having too low an intensity for the purpose of exposure. It other words, it is preferable to measure the current value with respect to light, the intensity of which is at least 80% of the quantity of light corresponding to the maximum light exposure.

Reference will now be made to another method for measuring the current value to control the duration of the applied voltage, i.e., integrating the difference in the current value between the exposed and unexposed portions.

Figure 59:
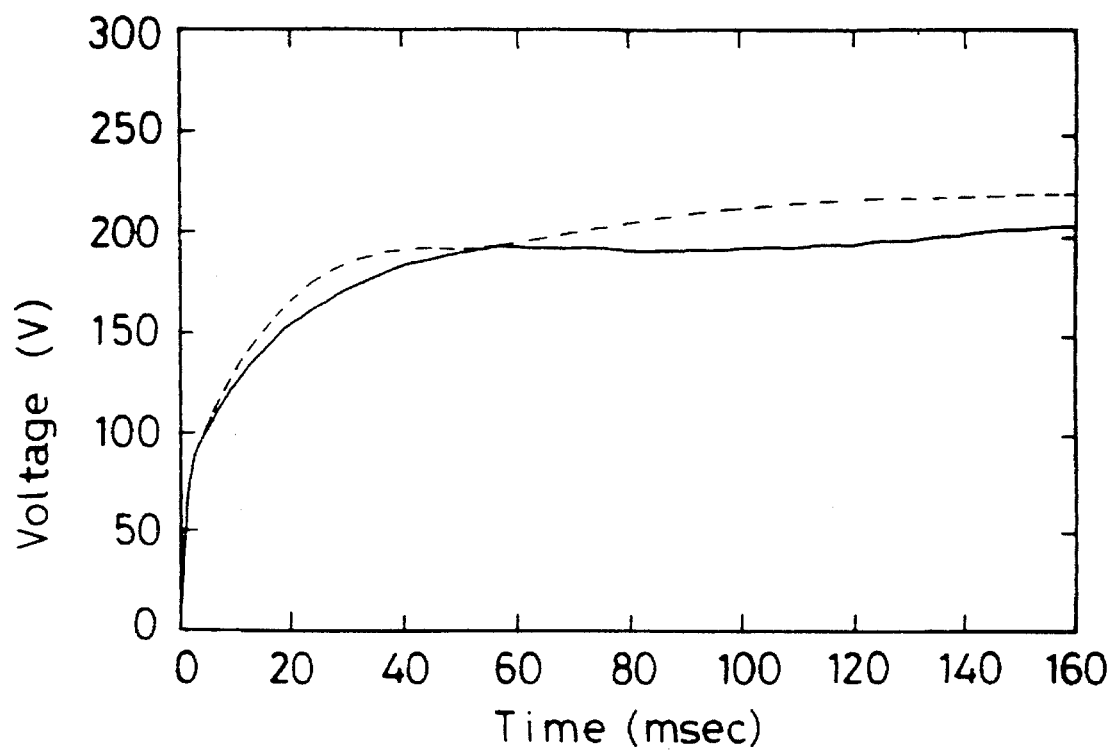
FIGS. 59(a)–59(b) are graphs showing the calculations of the voltage applied on the liquid crystal recording layer and the change-with-time of the potential difference of the unexposed portion.
Figure 59:
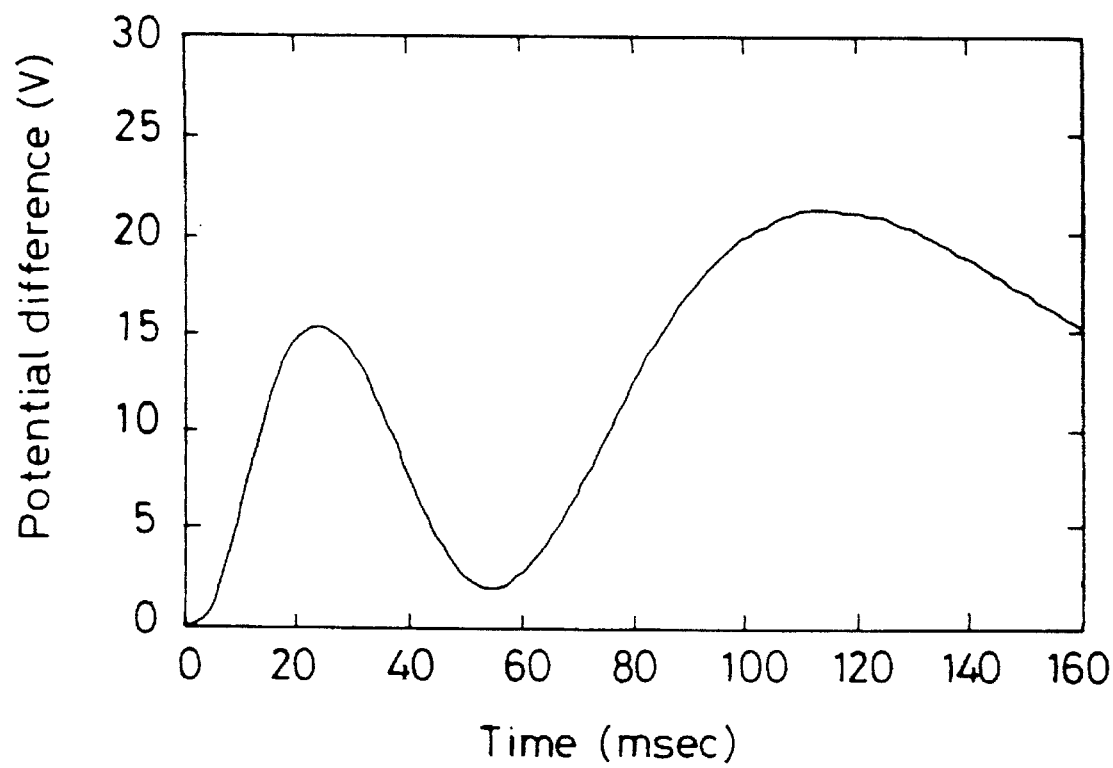

Shown in FIG. 59(a) are the results of the voltage applied on the liquid crystal recording layer, which was calculated from Equation (9-8) on the basis of the measurements shown in FIGS. 55 and 56, and shown in FIG. 59(b) is the change-with-time of the potential difference between the exposed and unexposed portions. As can be seen from FIG. 59(b), the potential difference between the exposed and unexposed portions increases initially, but decreases with a change in the capacity of the liquid crystal layer at the exposed portion due to its faster modulation, and eventually reduces to almost zero in the vicinity of the time at which the capacity difference between the exposed and unexposed portions reaches a maximum. At this time, the voltage of the liquid crystal recording layer at the exposed and unexposed portions is approximately equal to the threshold voltage, and so a difference in the quantity of charges on the liquid crystal recording layer between the exposed and unexposed portions is represented by $$\Delta Q = V_{TH} \Delta C \qquad \ldots (9\text{-}9)$$

where $\Delta C$ is the capacity difference between the exposed and unexposed portions, and $V_{TH}$ is the threshold voltage of the liquid crystal layer. Then, the relation between the current values of the exposed and unexposed portions and Equation (9-9) is represented by $$\int (I_{photo} - I_{dark}) dt - \int (\Delta V/R_L) dt = \Delta Q \qquad \ldots (9\text{-}10)$$

where $R_L$ is the resistance of the liquid crystal recording layer and $\Delta V$ is the potential difference between the exposed and unexposed portions.

Here the value of $\Delta Q$ on the right side of Equation (9-10) can be estimated from Equation (9-9) by measuring the intensity of light. For instance, the reason is that when the exposure intensity has a certain value, to what degree the exposed and unexposed portions are modulated can be presumed and so the threshold voltage can be found. Also, the second term of Equation (9-10), viz., a leakage from the resistance component of the liquid crystal recording layer can be pre-estimated. Therefore, if the application of voltage is stopped at the time when the cumulated value (quantity of charges) of the current difference between the exposed and unexposed portions is tantamount to a difference in the quantity of electrification at the time when the capacity difference between the exposed and unexposed portions reaches a maximum, it is then possible to obtain an image of a high contrast.

In this case, no critical limitation is on the intensity of light for the exposed portion. For instance, when measuring the current value of a portion irradiated with light in a quantity of 50% of the maximum quantity of light, a suitable reference value may be obtained by multiplying 50% of the capacity difference between the completely oriented liquid crystal layer and the non-oriented liquid crystal layer by the threshold value.

The intensity of light for the current-measuring portion need not be uniform all over the region to be measured; only an average quantity of light need be estimated, because the current value measured is obtained in the form of an average value. It is also not always required to provide the current-measuring portion separately from the image-recording portion. If an average intensity of light can be measured, it is then suitable to measure currents all over the image-recording portion.

Thus, the currents of the exposed and unexposed portions are monitored, so that the behavior of the liquid crystal recording layer can be monitored, and the voltage is put off after the lapse of a suitable duration of the applied voltage, so that a good image can be obtained. Here, too, the operation of monitoring the behavior of the liquid crystal recording layer by measuring the current, thereby finding the optimal duration of the applied voltage, is conducted with the use of a microcomputer or other control, so that the voltage can be put off by the microcomputer after the lapse of the optimal duration of the applied voltage.

Figure 60:
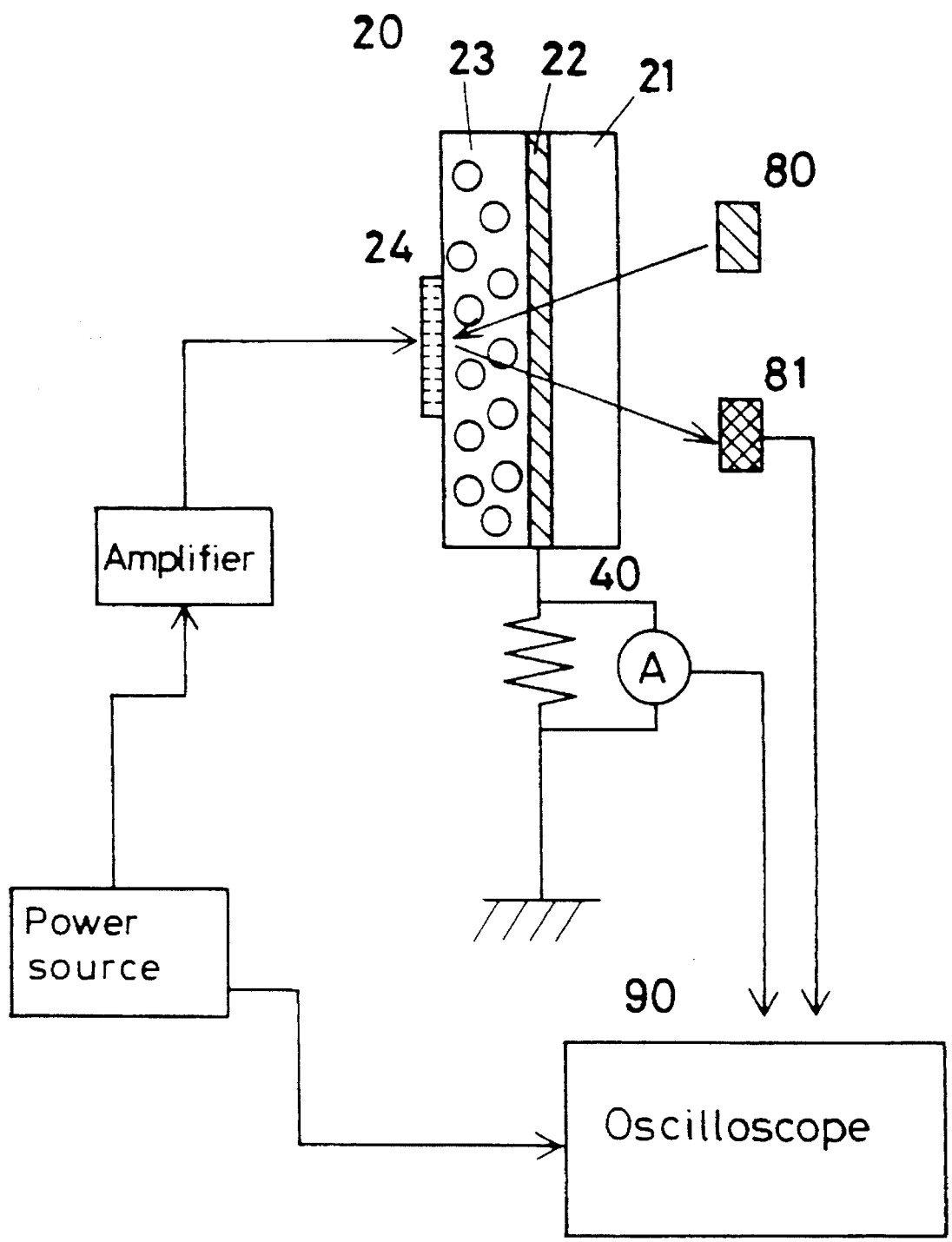
FIG. 60 is a schematic illustrating how to measure the capacity and transmittance changes of the liquid crystal recording layer.

Reference will now be made to how to measure the relation between the capacity and transmittance changes of the liquid crystal recording layer with reference to FIG. 60.

A gold electrode 24 is formed on the surface of a liquid crystal recording layer of a liquid crystal recording medium, and voltage is applied between the electrode 24 and a transparent electrode 22 via a pulse generator (operating as a power source in FIG. 60) and an amplifier. As in the arrangement shown in FIG. 50, an LED 80 and a photoelectric conversion element 81 are positioned such that, as illustrated, light from the LED is reflected by the gold electrode, and strikes on the photoelectric conversion element, so enabling a transmittance change of the liquid crystal recording layer to be monitored.

Applied on the liquid crystal recording layer is a slope form of voltage taking the following form:

$$V(t) = \alpha t \qquad \ldots (9\text{-}11)$$

Figure 61:
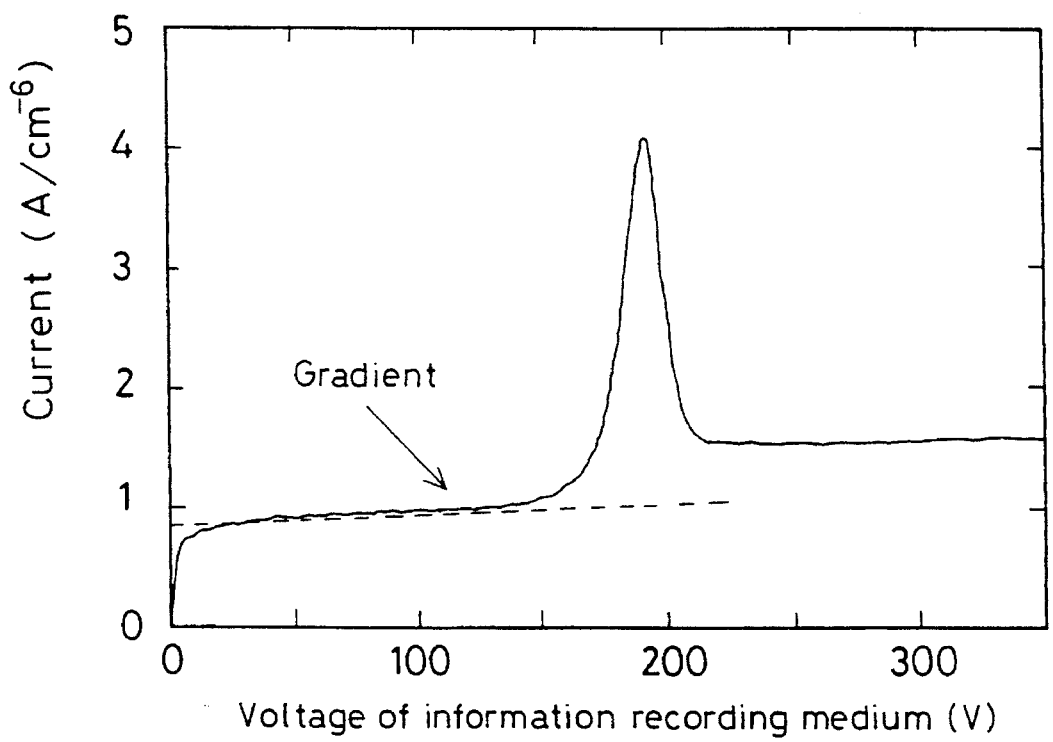
FIG. 61 is a graph showing the measurements of the current value obtained when a slope form of voltage is applied.

As a result of measuring the current value, such a current as shown in FIG. 61 is measured. The liquid crystal recording layer is considered to be a parallel circuit with a capacity and a resistance, and the current is given by $$I(t) = C_L (dV_L/dt) + V_L (dC_L/dt) + V_L/R_L \qquad \ldots (9\text{-}12)$$

From Equation (9-11), $$dV_L/dt = \alpha \qquad \ldots (9\text{-}13)$$

Also, the resistance $R_L$ of the liquid crystal recording layer can be estimated from the gradient of the current, so that the relation between the transmittance and capacity changes can be estimated from a comparison of the results of the current measured with the signals of the photoelectric element.

Figure 62:
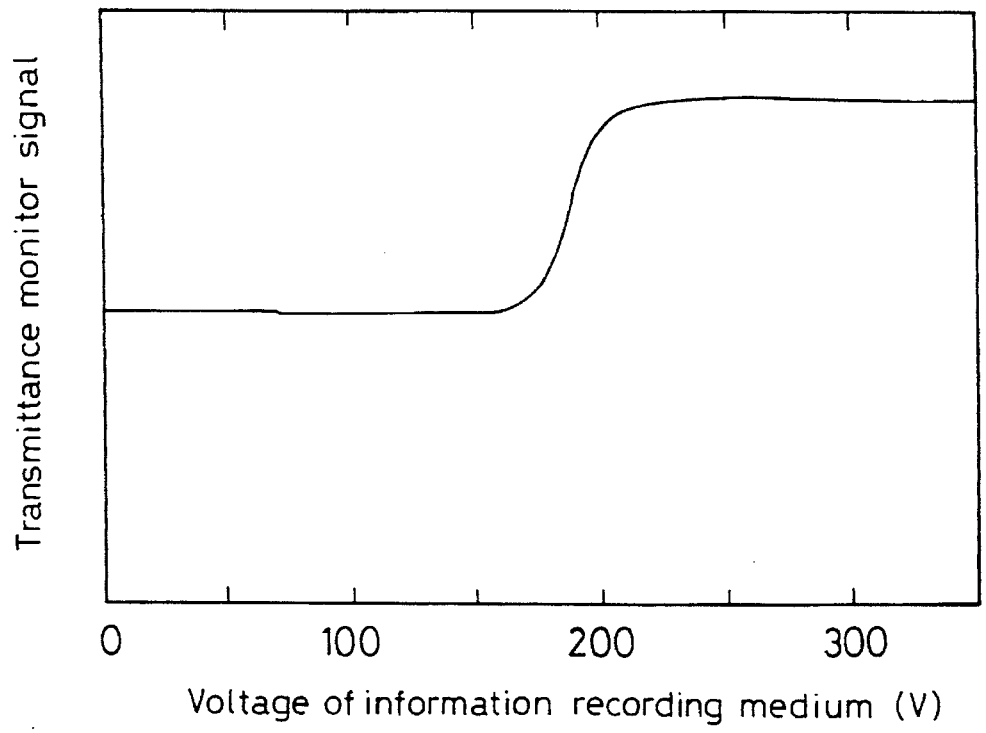
FIG. 62 is a schematic showing the waveform of the signal from the monitored photoelectric element.

FIG. 62 shows the signals of the thus monitored photoelectric conversion element. From a comparison of them with the current measured, a peak current is observed at the voltage at which the signals of the photoelectric element change (corresponding to the transmittance change). This shows that the transmittance and capacity changes of the liquid crystal recording layer are correlated with each other, and by comparing both it is possible to find the correlation between the capacity change and the transmittance-monitoring signals.

What we claim is:

1. A method for recording information by oppositely facing across an air gap a photoelectric sensor having a transparent electrode and a photoconductive layer formed on a transparent substrate in this order to a liquid crystal recording medium having a transparent electrode and a polymer dispersion type of liquid crystal recording layer formed on a transparent substrate in this order, and applying voltage between both the electrodes for exposure to image-carrying light, so that the liquid crystals are oriented to record the information, characterized in that the current flowing through said liquid crystal recording medium is monitored to calculate the voltage applied on said liquid crystal recording medium, and the duration of the applied voltage is controlled on the basis of the calculated voltage.

2. A method according to claim 1, characterized in that the duration of the applied voltage is controlled on the basis of the voltage of the unexposed portion calculated by monitoring the current.

3. A method for recording information according to claim 2, wherein voltage application is stopped at the time when the voltage on the unexposed portion calculated by monitoring electric current has reached the threshold value of the liquid crystal recording medium.

4. A method according to claim 1, characterized in that an electrode is formed on a part of said photoconductive layer, and an electric circuit element corresponding to said liquid crystal recording layer is connected to said electrode, so that when the voltage is applied, the current flowing through said electric circuit element is monitored to calculate the voltage applied on said liquid crystal recording layer, and the duration of the applied voltage is controlled on the basis of the calculated voltage.

5. A method for recording information according claim 4, wherein a pole is formed on a part of the photoconductive layer, an electric circuit element corresponding to the liquid crystal recording layer is connected to said pole, the electric current flowing through the electric circuit element when voltage is applied is monitored to calculate the voltage applied on the liquid crystal recording layer, and voltage application is stopped at the time when the calculated voltage has reached the threshold value of the liquid crystal recording medium.

6. A method for recording information by using an information recording medium in which a transparent electrode, a photoconductive layer and a liquid crystal recording layer are formed on a transparent substrate with a transparent electrode formed on said liquid crystal recording layer, or an integral type of information recording medium in which a transparent electrode, a photoconductive layer, a dielectric middle layer and a liquid crystal recording layer are formed on a transparent substrate in this order and an additional transparent electrode is provided, and applying voltage between both electrodes of said information recording medium for exposure to image-carrying light, so that the liquid crystals are oriented to record the information, characterized in that the current flowing through said liquid crystal recording layer is monitored to thereby calculate the voltage applied on said liquid crystal recording layer, and the duration of the applied voltage is controlled on the basis of the calculated voltage.

7. A method according to claim 6, characterized in that an electrode is formed on a part of said photoconductive layer, and an electric circuit element corresponding to said liquid crystal recording layer and dielectric middle layer is connected to said electrode, so that when the voltage is applied, the current flowing through said electric circuit element is monitored to calculate the voltage applied on said liquid crystal recording layer, and the duration of the applied voltage is controlled on the basis of the calculated voltage.

8. A method for recording information according to claim 7, wherein a pole is formed on a part of the photoconductive layer, an electric circuit element corresponding to the liquid crystal recording layer and to the dielectric intermediate layer is connected to said pole, the electric current flowing through the electric circuit element when voltage is applied is monitored to calculate the voltage applied on the liquid crystal recording layer, and voltage application is stopped at the time when the calculated voltage has reached the threshold value of the liquid crystal recording layer.

9. A method according to claim 6, characterized in that an electrode is formed on a part of said dielectric middle layer, and an electric circuit element corresponding to said liquid crystal recording layer is connected to said electrode, so that when the voltage is applied, the current flowing through said electric circuit element is monitored to calculate the voltage applied on said liquid crystal recording layer, and the application of the voltage is stopped when the calculated voltage reaches the threshold voltage.

10. A method for recording information according to claim 9, wherein a pole is formed on a part of a dielectric intermediate layer, an electric circuit element corresponding to the liquid crystal recording layer is connected to said pole, the electric current flowing through the electric circuit element when voltage is applied is monitored to calculate the voltage applied on the liquid crystal recording layer, and voltage application is stopped at the time when the calculated voltage has reached the threshold value of the liquid crystal recording layer.

11. A device for recording information by oppositely facing across an air gap a photoelectric sensor having a transparent electrode and a photoconductive layer formed on a transparent substrate in this order to a liquid crystal recording medium having a transparent electrode and a polymer dispersion type of liquid crystal recording layer formed on a transparent substrate in this order, and applying voltage between both the electrodes for exposure to image-carrying light, so that the liquid crystals are oriented to record the information, characterized by including a current-monitoring resistance connected between a power source for applying voltage between both said electrodes and said information recording medium, a means for monitoring the current flowing through said liquid crystal recording layer from the voltage applied on said resistance and for calculating the voltage applied on the liquid crystal recording medium, and a control means for controlling the duration of the applied voltage on the basis of the calculated voltage.

12. A device according to claim 11, characterized in that an electric circuit element corresponding to said liquid crystal recording layer is connected in series with a circuit comprised of a photoelectric sensor and a current-monitoring resistance.

13. A device according to claim 11, characterized in that a current-measuring circuit connected with a current-monitoring resistance is connected with a power source for applying a bias voltage corresponding to the discharge voltage of an air gap.

14. A device according to claim 11, characterized in that an electrode is formed on a part of the surface of said liquid crystal recording layer, and voltage is applied on said liquid crystal recording layer to measure the current, thereby measuring the electric properties of said liquid crystal recording layer.

15. A device according to claim 11, characterized in that a mask is formed on a part of the surface of said photoelectric sensor to be exposed to light, and the current value of the masked area is measured.

16. A device according to claim 15, characterized in that the electrode of said photoelectric sensor or said liquid crystal recording medium at the masked area is formed separately from the electrode of the portion exposed to light.

17. A device for recording information by using an information recording medium in which a transparent electrode, a photoconductive layer, and a liquid crystal recording layer are formed on a transparent substrate in this order, and an integral type of information recording medium in which a transparent electrode, a photoconductive layer, a dielectric middle layer and a liquid crystal recording layer are formed on a transparent substrate in this order and an additional transparent electrode is provided, and applying voltage between both the electrodes for exposure to image-carrying light, so that the liquid crystals are oriented to record the information, characterized by including a current-monitoring resistance connected between a power source for applying voltage between both said electrodes and said information recording medium, means for monitoring the current flowing through said liquid crystal recording layer from the voltage applied on said resistance and for calculating the voltage applied on the liquid crystal recording medium, and a control means for controlling the duration of the applied voltage on the basis of the calculated voltage.

18. A device according to claim 17, characterized in that an electric circuit element corresponding to said liquid crystal recording layer, or to said liquid crystal recording layer and said dielectric middle layer is connected in series with a circuit comprised of a photoelectric sensor and a current-monitoring resistance.

19. A method for recording information by oppositely. facing across an air gap a photoelectric sensor having a transparent electrode and a photoconductive layer formed on a transparent substrate in this order to a liquid crystal recording medium having a transparent electrode and a polymer dispersion type of liquid crystal recording layer formed on a transparent substrate in this order, and applying voltage between both the electrodes for exposure to image-carrying light, so that the liquid crystals are oriented to record the information, characterized in that the current flowing through said liquid crystal recording medium is measured to thereby monitor the orientation behavior of the liquid crystal of said liquid crystal recording layer and so control the duration of the applied voltage on the basis thereof.

20. A method according to claim 19, characterized in that the application of the voltage of the unexposed portion is calculated to reach the threshold of said liquid crystal recording medium.

21. A method according to claim 19, characterized in that the time at which the contrast between the light and dark portions reaches a maximum is monitored from the change-with-time of the current of the exposed portion to stop the application of the voltage.

22. A method according to claim 19, characterized in that the time at which the contrast between the light and dark portions reaches a maximum is monitored from the change-with-time of the current difference between the exposed and unexposed portions to stop the application of the voltage.

23. A method according to claim 19, characterized in that the area to be measured in terms of current is irradiated with light of a given intensity, and the application of the voltage is stopped when the difference in the integral value of the current between the exposed and unexposed portions reaches the quantity corresponding to the capacity change of said liquid crystal recording medium.

24. A method according to claim 19, characterized in that the behavior of said liquid crystal recording medium at the exposed portion is monitored by the differentiation of the current value of the unexposed portion to control the application of the voltage.

25. A method according to claim 19, characterized in that an electrode is formed on the surface of the liquid crystal recording layer of said liquid crystal recording medium, and voltage is applied on said liquid crystal recording medium prior to recording the information, so that the resistance value of said liquid crystal recording medium is measured from the current value.

26. A method according to claim 19, characterized in that an electrode is formed on the surface of the photoconductive layer of said photoelectric sensor, and voltage is applied on said photoelectric sensor prior to recording the information, so that the current value is measured.

27. A device for recording information by oppositely facing across an air gap a photoelectric sensor having a transparent electrode and a photoconductive layer formed on a transparent substrate in this order to a liquid crystal recording medium having a transparent electrode and a polymer dispersion type of liquid crystal recording layer formed on a transparent substrate in this order, and applying voltage between both the electrodes for exposure to image-carrying light, so that the liquid crystals are oriented to record the information, characterized by including a current-monitoring resistance connected between a power source and said photoelectric sensor, means for monitoring the value of the current flowing through a circuit from the voltage applied on said resistance, a means for calculating the value of the current flowing through a circuit from the voltage applied on said resistance and for monitoring the orientation behavior of the liquid crystal of said liquid crystal recording layer, and a control means for controlling the duration of the applied voltage on the basis of the monitored result.

28. A device according to claim 27, characterized in that a spacer is located between said photoelectric sensor and said liquid crystal recording medium to keep the air gap constant, and a current-detecting electrode is formed on a part of said photoelectric sensor or said liquid crystal recording medium on which said spacer is not found.

29. A device according to claim 27, characterized in that a mask is formed on a part of the surface of said photoelectric sensor to be exposed to light, and the current value of the masked area is measured.

30. A device according to claim 27, characterized in that the electrode of said photoelectric sensor or said liquid crystal recording medium at the masked area is formed separately from the electrode of the portion exposed to light.

31. A device according to claim 29 or 30, characterized in that a current-monitoring area is formed on the portion to be exposed to light, and current-monitoring resistances are connected to the masked area and the portion exposed to light.

32. A device according to claim 31, characterized in that an optical system is provided for irradiating the current-monitoring area of said photoelectric sensor exposed to a given quantity of light.

33. A device according to claim 31, characterized in that the values of the current-monitoring resistances connected to the masked area and the portion exposed to light are preset at those for correcting the difference in area between said electrodes.

34. A device according to claim 33, characterized in that an electrode to be formed on the photoelectric sensor or said liquid crystal recording medium at the current-monitoring area of said photoelectric sensor exposed to light is separated from the portion exposed to light.

35. A device according to claim 33, characterized in that said optical system is comprised of a half mirror for separating a part of said image-carrying light and a lens element for condensing the light from said half mirror.

36. A device according to claim 33, characterized in that said optical system is one separate from the exposure system for emitting light corresponding to the quantity of light of the subject.

* * * * *